United States Patent [19]

Yoshizawa et al.

[11] Patent Number: 5,216,746
[45] Date of Patent: Jun. 1, 1993

[54] ERROR ABSORBING SYSTEM IN A NEURON COMPUTER

[75] Inventors: Hideki Yoshizawa; Hiroki Iciki; Hideki Kato, all of Tokyo; Kazuo Asakawa, Kanagawa; Yoshihide Sugiura, Tokyo; Hiroyuki Tsuzuki, Kanagawa; Hideichi Endoh, Kawasaki; Takashi Kawasaki, Kawasaki; Toshiharu Matsuda, Kawasaki; Hiromu Iwamoto, Yokohama; Chikara Tsuchiya, Machida; Katsuya Ishikawa, Kawasaki, all of Japan

[73] Assignee: Fujitsu Limited, Kanagawa, Japan

[21] Appl. No.: 486,647

[22] Filed: Feb. 28, 1990

[30] Foreign Application Priority Data

Feb. 28, 1989 [JP] Japan .................. 1-45208
Mar. 7, 1989 [JP] Japan .................. 1-52974
Mar. 7, 1989 [JP] Japan .................. 1-54671

[51] Int. Cl.⁵ .................................. G06F 15/18
[52] U.S. Cl. .................................. 395/24
[58] Field of Search ............. 307/353, 493; 364/513; 395/24

[56] References Cited

U.S. PATENT DOCUMENTS

| | | | |
|---|---|---|---|
| 4,807,168 | 2/1989 | Moopenn et al. | 364/602 |
| 4,885,545 | 12/1989 | Sanielevici | 307/353 |
| 4,906,865 | 3/1990 | Holler | 307/353 |
| 4,914,319 | 4/1990 | Hashimoto | 307/353 |
| 4,950,923 | 8/1990 | Garuts | 307/353 |
| 4,962,342 | 10/1990 | Mead et al. | 307/201 |
| 4,973,975 | 11/1990 | Yamazaki et al. | 341/122 |
| 4,974,169 | 11/1990 | Engel | 364/513 |
| 4,987,323 | 1/1991 | Fujita | 307/351 |
| 4,988,891 | 1/1991 | Mashiko | 307/201 |
| 5,131,072 | 7/1992 | Yoshizawa et al. | 395/24 |

OTHER PUBLICATIONS

Furman et al., "An Analog CMOS Backward Error-Propagation LSI", First Annual INNS Symposium, Sep. 1988.
Bailey et al., "Why VLSI Implementations of Associative VLCNs Require Connection Multiplexing", IEEE 2nd Intl. Conf. on Neural Networks, 1988, pp. II-17-3-II-180.
Mead et al., Analog VLSI Implementation of Neural Systems, Kluwer Academic Publ., 1989, pp. 135-169.
Eberhardt et al., "Design of Parallel Hardware Neural Network Systems from Custom Analog VLSI 'Building Block' Chips", IJCNN, Jun. 1989, vol. 2, pp. II-183-II--190.

Primary Examiner—Michael R. Fleming
Assistant Examiner—Robert W. Downs
Attorney, Agent, or Firm—Nikaido, Marmelstein, Murray & Oram

[57] ABSTRACT

An error absorbing system for absorbing errors through a weight correction is provided in a neuron computer for receiving an analog input signal through a first analog bus in a time divisional manner, performing a sum-of-the-products operation, and outputting an analog output signal to a second analog bus. The error absorbing system includes a dummy node for producing a fixed voltage to an analog bus in a test mode. The dummy node is connected to the analog bus of the neural network. An error measuring unit compulsorily inputs 0 volts to the first analog bus through the dummy node in a first state of a test mode and detects an offset voltage produced in an analog neuron processor through the second analog bus. A weight correcting unit, in a second state of the test mode, determines a temporary weight between the dummy node and the neuron processor. The temporary weight is multiplied by the fixed voltage produced by the dummy node, based on an offset voltage of respective neuron processors. The weight correcting unit calculates a correct weight using a gain based on the detection output voltage output from the second analog bus. A weight memory stores the weight corrected by the weight correcting unit.

28 Claims, 69 Drawing Sheets

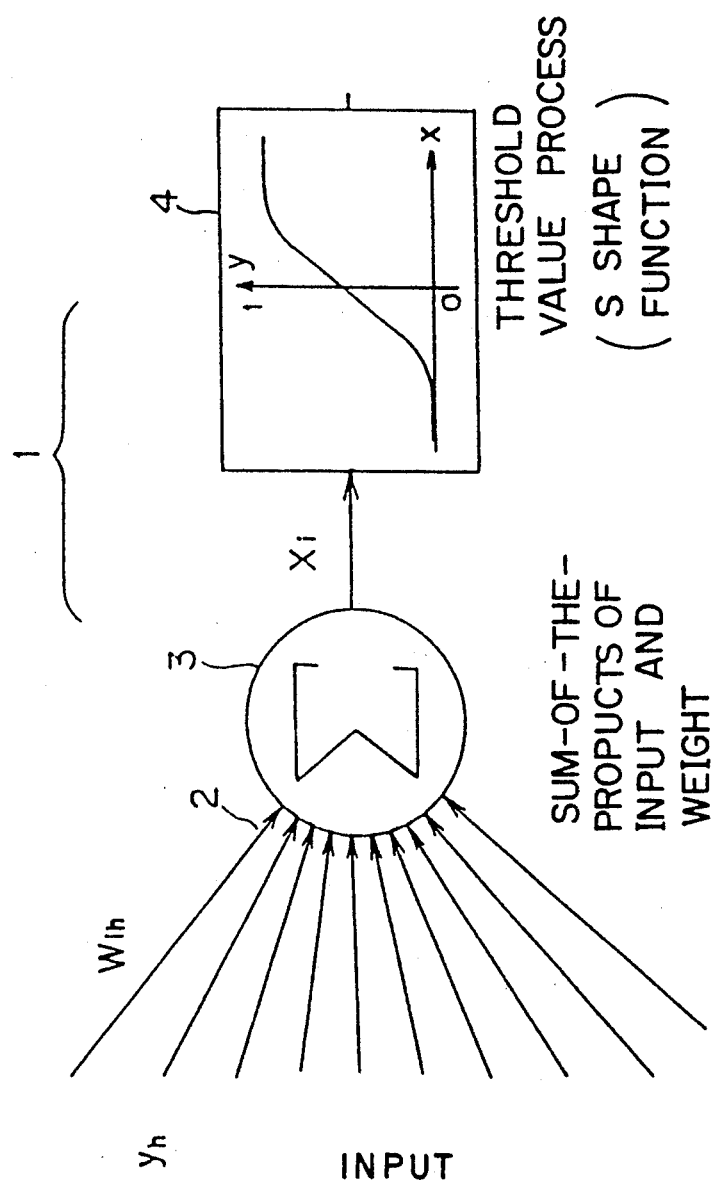

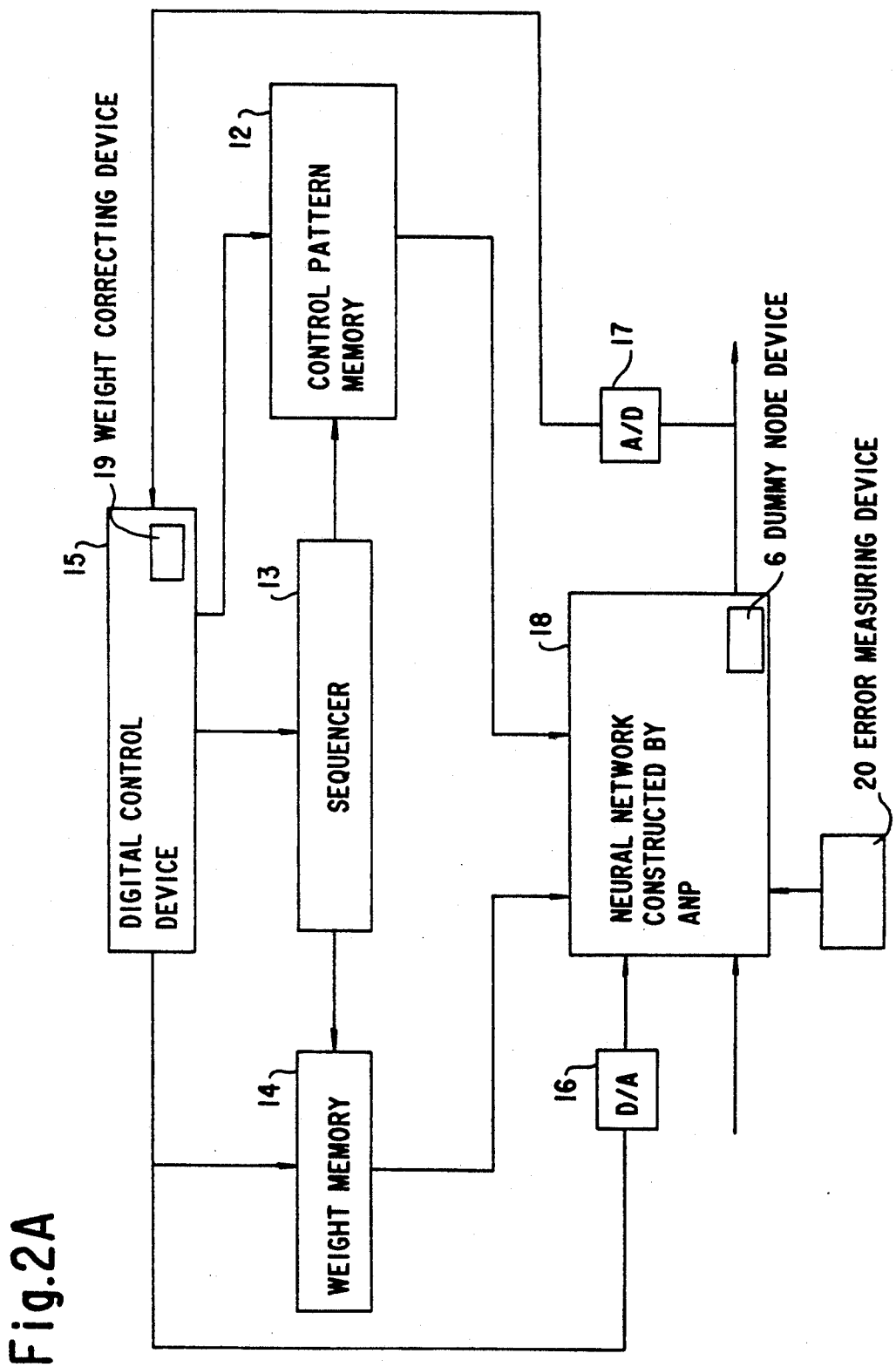

ERROR ABSORBING SYSTEM IN A NEURON COMPUTER

BACKGROUND OF THE INVENTION

The present invention relates to a neuron computer realized by connecting an analog neuron chip through an analog time divisional transmission path and more particularly to an error absorbing system realized by using a weight correction, expanding the dynamic range of weight data expressed in the fixed decimal point method, and using a variable-width integration pulse.

In a conventional sequential processing computer (Neuman type) it is difficult to control a data process function in accordance with a variation in the usage method or environment. Therefore, an adaptive data processing method utilizing a parallel distribution system and a layered network is proposed. The back propagation method (D. E. Rumelhart, G. E. Hinton, and R. J. Williams, "Learning Internal Representations by Error Propagation", PARALLEL DISTRIBUTED PROCESSING, Vol.1, pp. 318-364, The MIT Press, 1986) receives particular attention because of its high practicality.

The back propagation method utilizes a layered structure network comprising a node called a basic unit and internal connection having weights. FIG. 1A shows the structure of a basic unit 1. Basic unit 1 carries out a process similar to a continuous neuron model. It comprises a multiple-input single-output system and further comprises a multiplication unit 2 for multiplying a plurality of inputs ($Y_h$) by respective weights ($W_{ih}$) of the internal connections, an accumulating unit 3 for adding all the multiplied results, and a threshold value processing unit 4 for outputting final output $X_i$ by applying a nonlinear threshold value process to the added values.

FIG. 1B shows a conceptual view of the structure of a layered neural network. Many basic units (1-h, 1-i, 1-j) are connected in layers as shown in FIG. 1B and the output signal patterns corresponding to the input signal patterns are output.

Upon learning, the weights ($W_{ih}$) of connections between respective layers are determined in order to minimize the difference between the output patterns and a target teacher pattern. This learning is applied to a plurality of input patterns and then multiplexed. Upon an association operation, even if the input pattern contains information which is slightly incomplete upon the learning and therefore different from the complete information input upon the learning, the output pattern close to the teacher pattern provided upon learning is provided, thereby enabling a so-called associating process. To realize a neuron computer with such a structure, a transmission and reception of the data between basic units constituting a layered network is conducted by as small a number of wires as possible. This is a problem which should be solved when a complex data process is realized by forming multi-layers of the network structure and increasing the number of basic units.

However, the data process system explained above requires a large number of wires between the two layers, which prevents it from being made small when the system is formed into a chip. For example, consider a complete connection in which the number of adjacent layers is made the same and all the basic units 1 are connected to each other. In this case, the number of wires increases in proportion to the second power of the number of basic units, thereby resulting in a rapid increase in the number of wires. Further, its reliability cannot be increased when the data process system is manufactured into a chip, because the data process system includes an offset error and a gain error. If the data is expressed by a fixed decimal point method in which the decimal point exists next to the most significant bit, a number more than 1 cannot be expressed. Thus, the dynamic range of the data cannot be broadened.

SUMMARY OF THE INVENTION

An object of the present invention is to provide an error absorbing apparatus in a data process system capable of transmitting and receiving data between basic units and being formed with a minimum number of wires.

Another object of the present invention is to absorb an offset or gain error by controlling dummy node weight data.

A further object of the present invention is to provide a neuron computer with a broadened dynamic range of the fixed decimal point method.

A still further object of the present invention is to avoid a saturation of the added value by changing the addition execution period in the adding portion in the analog neuron computer operated in a time divisional manner.

A feature of the present invention resides in an error absorbing system for absorbing errors through a weight correction in a neuron computer comprising a neural network for receiving an analog input signal through a first analog bus in a time divisional manner, performing a sum-of-the-products operation, and outputting an analog output signal to a second analog bus a dummy node device produces a fixed voltage to an analog bus in a test mode. The dummy node device is connected to the analog bus of the neural network. An error measuring device compulsorily input 0 volts to the first analog bus through the dummy node device in a first state of a test mode and detects an offset voltage produced in an analog neuron processor through the second analog bus. A weight correcting device, in a second state of the test mode, determines a temporary weight between the dummy node device and the neuron processor. The temporary weight is multiplied by the fixed voltage produced by the dummy node device, based on an offset voltage of respective neuron processor and calculates a correct weight using a gain based on the detection output voltage output from the second analog bus. A weight memory stores the weight corrected state from the weight correcting device; and a control device controls the operation of the neural network.

BRIEF DESCRIPTION OF THE DRAWINGS

FIG. 1A shows a principle structure of a basic unit of a neuron model,

FIG. 2A is a principle block diagram of the first embodiment in which a weight value is corrected by using a dummy node device after detecting the error by using the error measurement device.

DETAILED DESCRIPTION OF THE PREFERRED EMBODIMENT

Figure 1B:
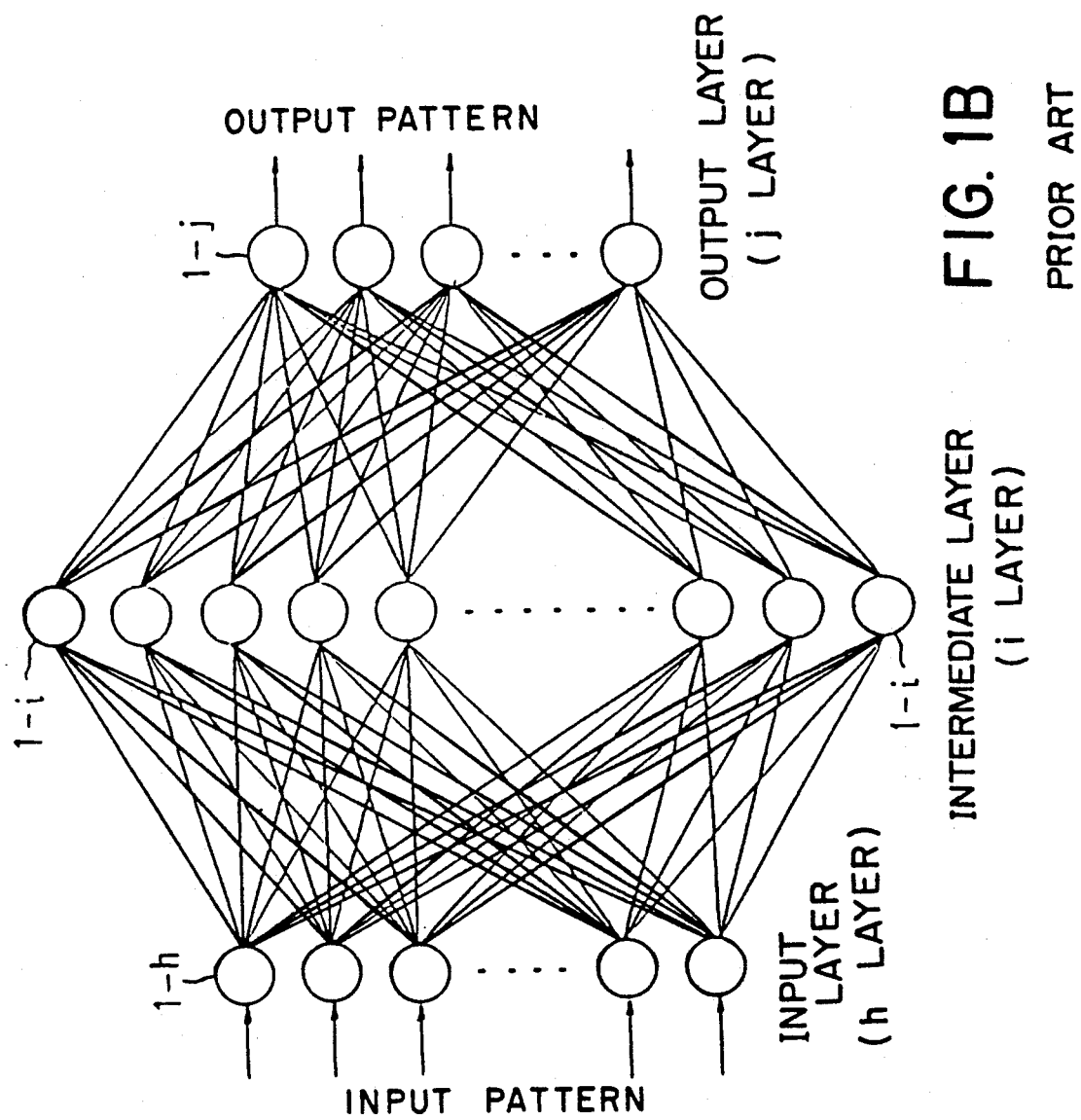
FIG. 1B shows a conceptual view of a structure of a layered type neural network.

FIG. 2A shows a principle system block diagram of a first embodiment of a neuron computer of the present invention.

Neural network 18 receives analog input signals from the common first analog bus provided to the input sides of respective layers in a time divisional manner, carries the sum of the products by using digital weight data, and provides analog output signals to the second common analog bus provided to the output side of respective layers, thereby forming a set of analog neuron processors (ANPs).

Control pattern memory 12 stores control signal pattern of the neural network. Weight memory 14 stores weight data. Sequencer 13 produces an address of control pattern memory 12 and weight memory 14. Digital control 15 comprises a general purpose processing unit including an MPU (microprocessing unit) and a main storage. It is connected through network 18 and D/A and A/D converters 16 and 17 and further controls the neural network, control pattern memory sequencer and weight memory. Thus, the invention forms a neuron computer system on a printed board.

Dummy node 6 is connected to an analog bus of neural network 18 and produces a fixed voltage to the designated analog bus upon the test mode. Error measurement device 20 inputs "0" volts compulsorily to the first analog bus through dummy node 6 in the first state of the test mode and detects an offset voltage produced by the analog neuron processor, through the second analog bus. Weight correcting device 19 provided in digital control 15 determines a temporary weight to be multiplied by the fixed voltage produced by dummy node 6 in a second state of the test mode, based on the offset voltage of respective neuron processors. Weight memory 14 stores the weight corrected by the weight correction device.

An analog input signal is input to an analog neuron chip in a time divisional manner and the products of the signal and the weight data are added to provide a sum-of-the-products signal. This signal is then output through a nonlinear function circuit. A plurality of analog neuron chips forms a layered-type or a feedback-type neural network 18 which receives an output from control pattern memory 12, when the address of control pattern memory 12 is provided by sequencer 13. The weight data obtained from a learning is supplied to neural network 18 from weight memory 14. Neural network 18, control pattern memory 12, sequencer 13 and weight memory 14 are controlled and managed by a digital signal from digital control 15. The MPU in digital control 15 executes a learning algorithim and checks the output signal of neural network 18. Therefore, an analog neuron computer system is characterized by a time divisional analog input signal and a time divisional analog output signal.

Figure 2B:
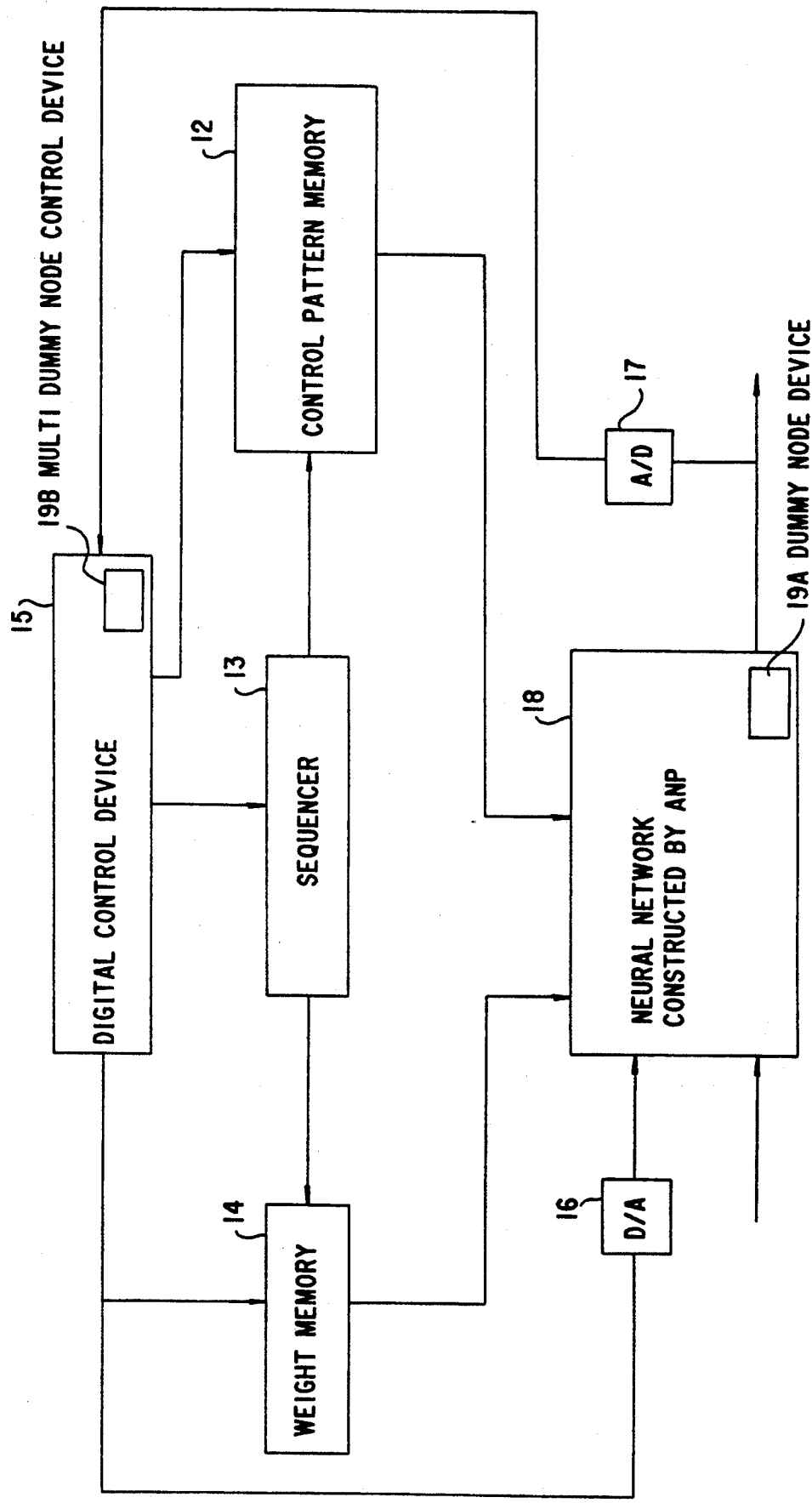
FIG. 2B shows a principle block diagram of the second embodiment in which a multi-dummy node is used to correct the weight data by using an error measurement devices.

FIG. 2B shows a principle system block diagram of a second embodiment of a neuron computer of the present invention.

Neural network 18 receives analog input signals from the common first analog bus provided to the input side of respective layers in a time divisional manner, carries the sum of the products by using digital weight data, and provides the analog signal to the second common analog bus provided to the output side of respective layers, thereby forming a set of analog neuron processors (ANP).

Control pattern memory 12 stores a control signal pattern of the neural network. Weight memory 14 stores weight data. Sequencer 13 produces an address of control pattern memory 12 and weight memory 14. Digital control 15 comprises a general purpose processing unit including an MPU and a main storage. It is connected through network 18 and D/A and A/D converters 16 and 17 and further controls the neural network, control pattern memory sequencer and weight memory. Thus, the invention forms a neuron computer system.

Dummy node 19A and multi-dummy-node control 19B are also provided. Thus, even if the weight data for the dummy node is more than "1", it can be expressed as the sum of a plurality of weight data.

Weight data of more than "1" for a dummy node may be divided into weight data for a plurality of dummy nodes. Thus, it is expressed by a fixed decimal point method. As a result, the dynamic range of this weight data can be expanded.

Figure 2C:
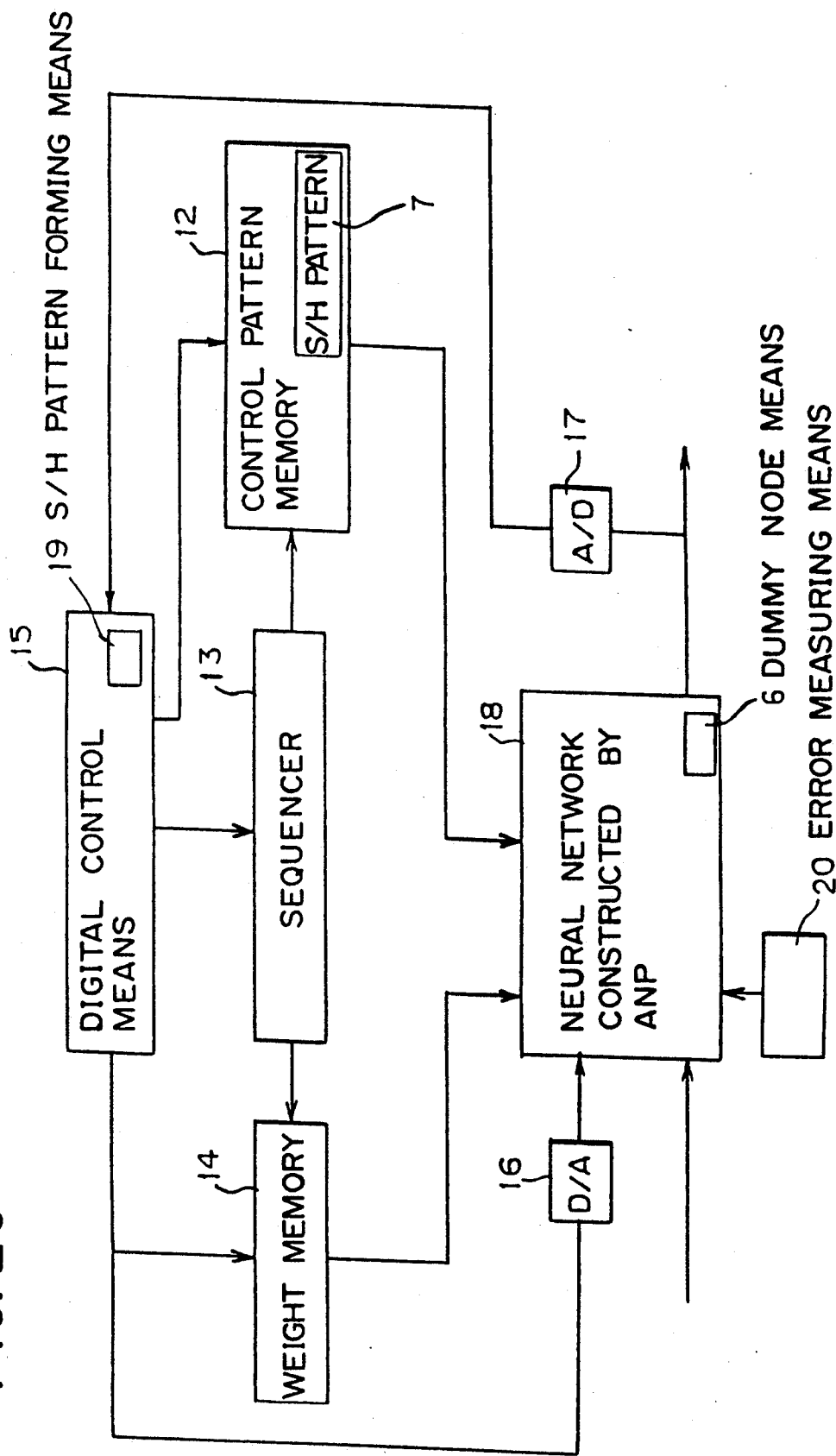
FIG. 2C is a principle block diagram of the third embodiment in which a S/H (sample/hold) pattern for storing an input signal in a capacitor in an analog neuron processor (called ANP hereinafter) is changed based on the measurement of the error.

FIG. 2C shows a principle system block diagram of a third embodiment of a neuron computer of the present invention.

This embodiment operates in the same manner as recited in the embodiments shown in FIGS. 2A and 2B except that error measurement device 20 makes the output of the dummy node zero in order to measure the offset voltage and determines a sample/hold (SH) period of an integrator provided in an ANP by enabling S/H pattern forming device 19 to detect an offset voltage error and a gain error.

Then the period during which the smple/hold (S/H) signal is high is varied by changing S/H pattern 7 within a control pattern memory 12 using S/H pattern forming device 19 provided in digital control 15, thereby controlling the time period in which a capacitor provided in an adding unit in an analog neuron chip is charged.

For example, if there are many neurons in the previous stage, a high level period of a sample/hold signal is shortened and the charge stored in a capacitor is not increased by each input of the analog input signal from each of the neurons in the previous stage. As a result, a capacitor can obtain a sum of many analog input signals. Therefore, the present invention can avoid the problem of the output signal becoming saturated due to an increase in the number of input analog signals.

Figure 3B:
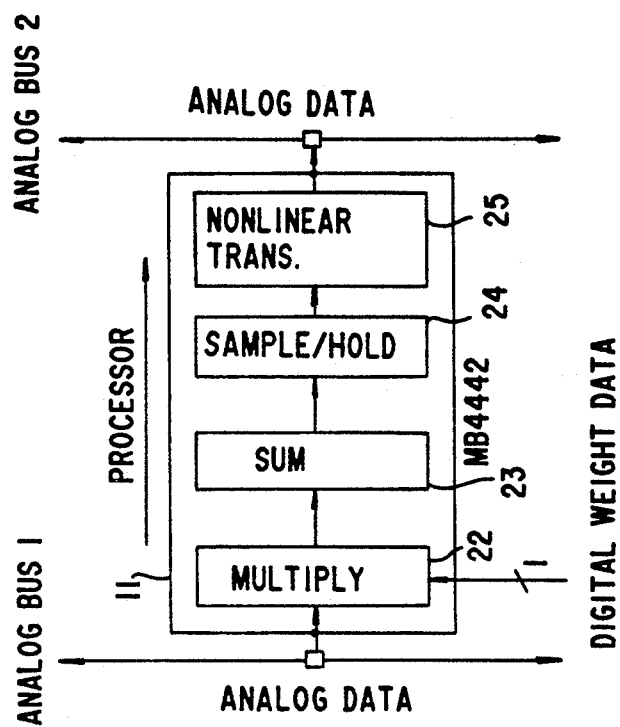
FIG. 3B shows the internal structure of the ANP of the present invention.
Figure 3A:
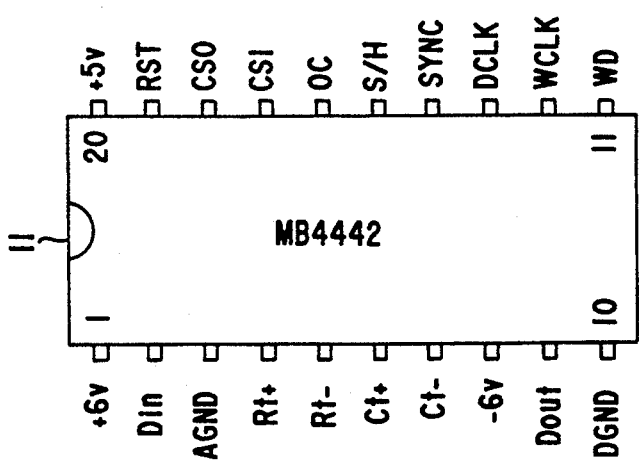
FIG. 3A is a view of a package comprising an ANP of the present invention.

FIG. 3A is a schematic view of a dual-inline package of an analog neuron processor (ANP) 11 formed by a neuron chip provided by the present invention. This package, called MB4442, carries out neuron model processes. The internal threshold value processing unit is obtained by performing a sigmoid function. The analog neuron chip comprises an ANP for inputting and outputting analog data. Respective terminals of ANP 11 shown in FIG. 3A are as follows. The internal structure of ANP11 comprises an analog circuit unit and a digital circuit unit. Plus-6-volt and minus-6-volt terminals are connected to a power source in an operational amplifier of an analog circuit unit. Terminals $D_{in}$ and $D_{out}$ are for respectively inputting and outputting analog signals. Terminal AGND is for the ground of the analog circuit unit. Terminals Rt+ and Rt− are for a resistor R provided externally to form an integral circuit in the analog circuit unit and terminals Ct+ and Ct− are for a capacitor provided externally to form an integral circuit. Terminal DGND is for the ground of a digital circuit unit. The plus-5-volt terminal is for the power source of the digital circuit unit. The RST terminal is for receiving reset signals for resetting the charge of the capacitor in the integral digital circuit. Terminals CSI and CSO are for respectively inputting and outputting daisy chain control signals. Terminal OC is for receiving offset cancelling control signals. Terminal SH terminal is for receiving sample/hold control signals. Terminal SYNC is for receiving signals for synchronizing processes of respective layers. Terminal DCLK is for receiving basic clock signals for processing the analog input signal. Terminal WCLK is for a clock for obtaining digital weight data. Terminal WD is for receiving digital weight data for inputting data in bit serial form.

FIG. 3B is a schematic view of the internal structure of an ANP of the present invention. As shown, ANP 11 is connected to analog bus B1 and analog bus B2. Analog processor ANP 11 comprises analog multiplying unit 22 for providing the product of the input analog signal and the weight, analog adder unit 23 for providing the sum of the products, sample/hold unit 24 for storing the sum, and nonlinear function unit 25 for outputting the value of the sigmoid function.

Figure 3C:
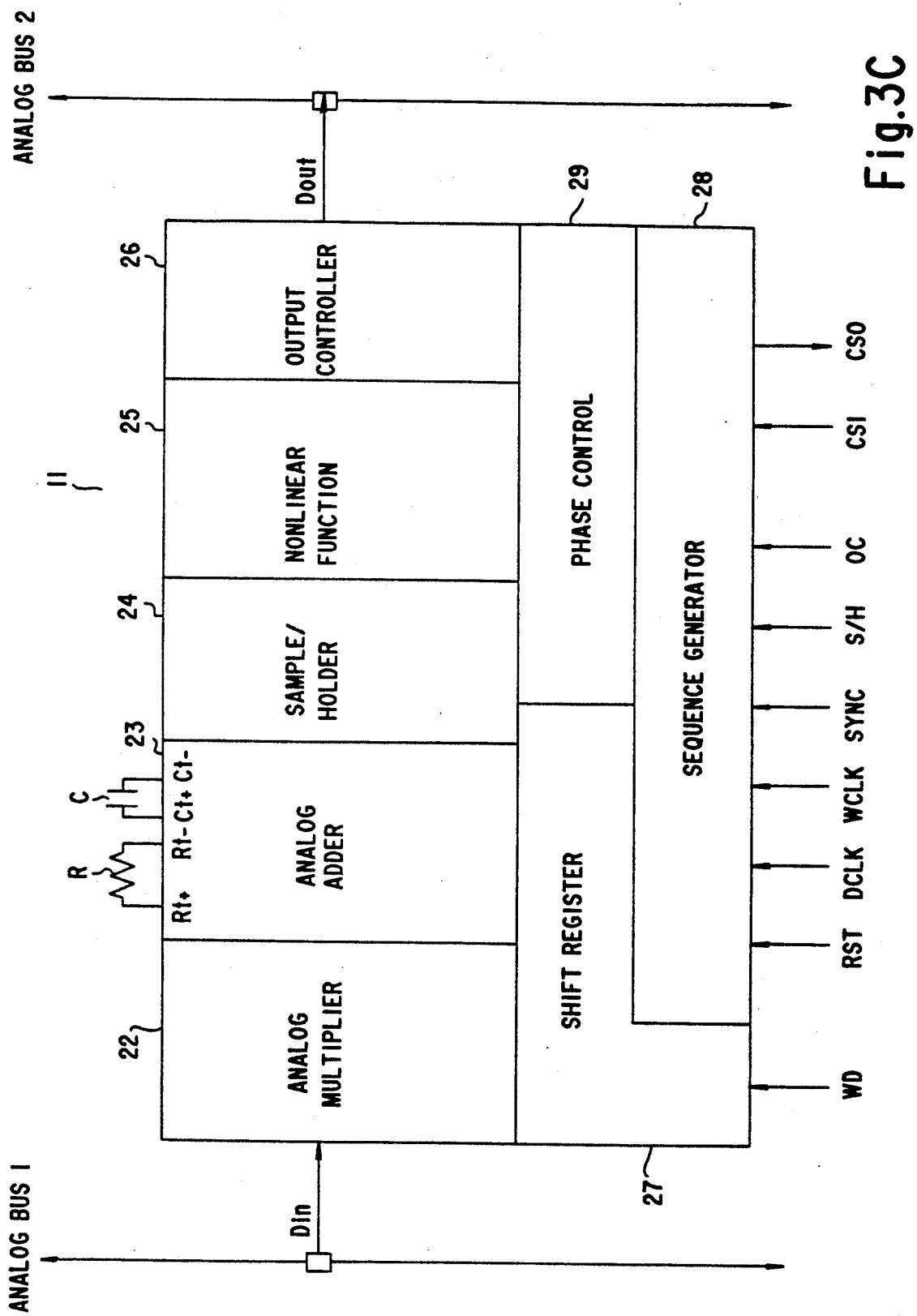
FIG. 3C shows the principle structure of the ANP of the present invention.

FIG. 3C shows the structure of an analog neuron processor (ANP) of the present invention.

Analog input signals transmitted in a time divisional manner from separate ANP's are input to analog multiplier unit 22 in ANP11 through analog bus B1. Analog multiplier 22 multiplies the analog input data by the digital weight data WD which is received in bit serial form from shift register 27 and is then subjected to a serial-to-parallel conversion, thereby providing a product signal representing the product of the analog input signal and the digital weight data. Analog adder 23 comprises a mirror integrating circuit containing an external resistor R and a capacitor C, and obtains the sum of the respective product signals obtained from the analog input signal transmitted in a time divisional manner from a plurality of ANPs (the position in which each of the ANPs exists is called a node) provided at the previous stage and connected to analog bus B1, and obtained from the analog input signal for a threshold value transmitted from a dummy node. Next, the product signals are held by sample-hold unit 24 for the desired time period and the sampled/held output is converted through non-linear type function unit 25. Output control unit 26 delays the output of non-linear function unit 25 for a predetermined time period under the control of sequence generator 28. The analog output signal DOUT is then output to analog bus B2. Sequence generator 28 produces a control signal to be supplied to the inside of this computer system. Phase control unit 29 controls the phase of a control signal to ensure that the switches connected to the analog circuit portions within the ANP and digital circuit portions are turned on and off. In particular, when the first switch is turned on and the second switch is turned off, the phase of the control signal is controlled to prevent both first and second switches from being turned on simultaneously.

Sequence generator 28 receives signals RST, DCLK, WCLK, SYNC, and CSI from a later described master control block and outputs a CSO, thereby forming a control signal within the ANP.

Neural networks are required to perform high speed operations using parallel processing. The present invention uses time divisional data, but respective ANPs normally perform parallel pipe-line processing. An ideal neural network needs connecting wires for connection between respective neurons. Thus, the above structure would require a lot of wires. The present invention deals with time divisional data. Thus, the time required to process a sum of products in respective ANPs becomes a little long. However, respective ANPs are arranged vertically, namely, in the direction of one layer in parallel with each other, thereby performing parallel processing of ANPs provided within one layer and thus decreasing processing time. In addition, a pipeline process is possible between layers, which also decreases total processing time. When inputs, are received simultaneously and in parallel by, for example, three ANPS connected to an analog bus, the respective ANPs produce products of analog inputs and weights. These products are maintained as electric charge in capacitors of integrators in respective ANPS. In the next time period, respective ANPs produce products of analog inputs from the same analog bus and weights. These products are added to those determined in the previous time period in the capacitors of the integrators. When the sum of the products of the analog input signals from all the ANPs in the previous stage with the weight are produced, the sum is sampled/held. Thereafter, the sample/hold signal is output through a sigmoid function upon an input of a CSI control signal. Upon completion of the output, the CSI falls down. A CSO then rises after a predetermined delay, thereby providing the use right of the output bus to the ANP of the adjacent neuron chip within the same layer.

Figure 3D:
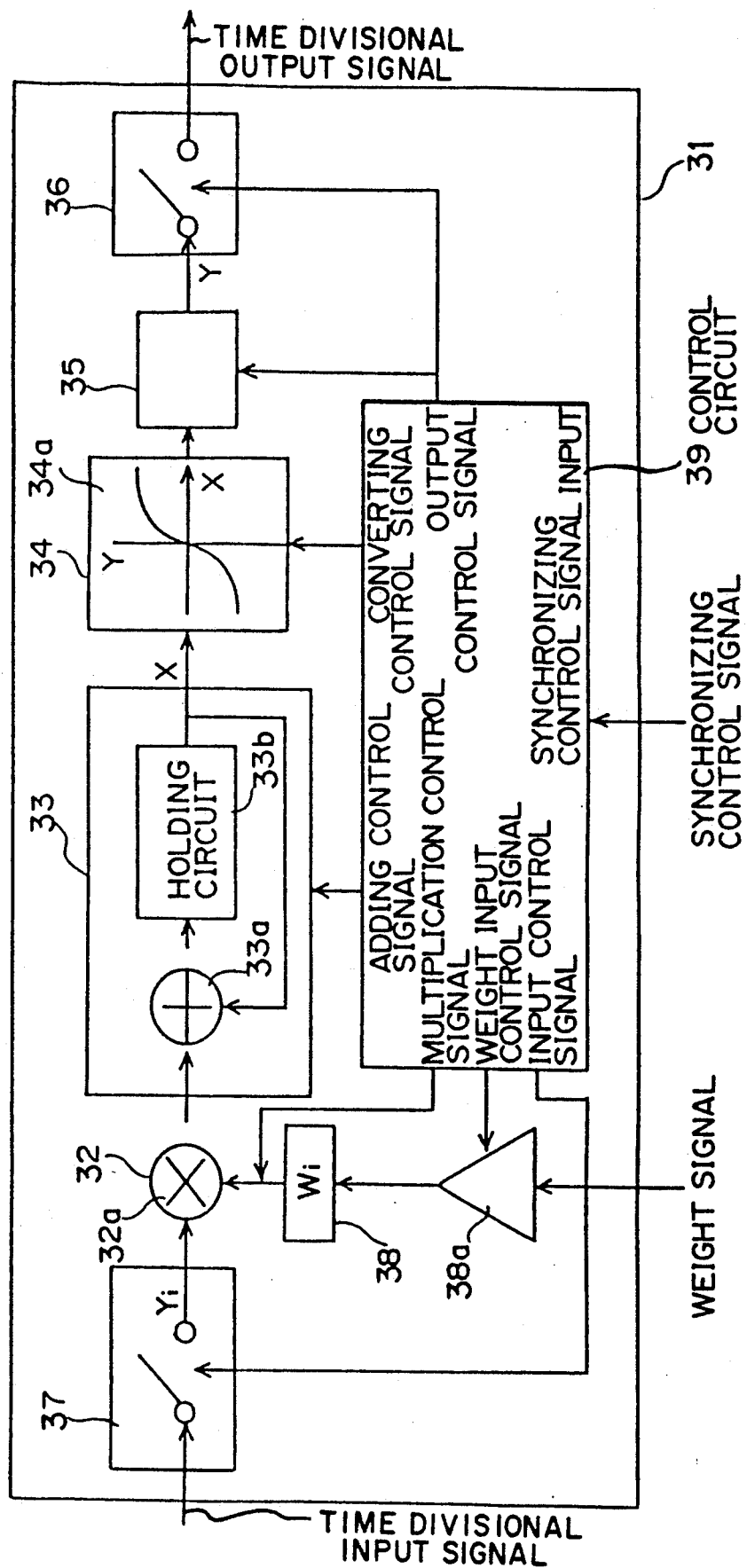
FIG. 3D is a block diagram of an embodiment of the basic unit according to the present invention.

FIG. 3D shows a block diagram of the first embodiment of the basic unit of the neuron chip (ANP). Multiplying unit 32, adding unit 33 and threshold value process unit 34 constitute an execution unit of a continuous neuron model. Output holding unit 35 is also provided. Where a plurality of inputs connected to basic unit 31 is expressed as Yi and the weight determined corresponding to respective connections as Wi, multiplying unit 32 calculates $$Y_i \cdot W_i$$

Adding unit 33 calculates $$X = \Sigma Y_i \cdot W_i - \theta$$

where $\theta$ is a threshold value. Where a final output from threshold value unit 34 is Y, the following equation is calculated.

$$Y = 1/(1 + exp(-X)) \qquad (1)$$

The weight "$-\theta$" is multiplied by the value "$+1$" input from the dummy node. The result "$x-\theta$" is then output from adding unit 33. Therefore, threshold value unit 34 performs a conversion by using an S character curve.

Multiplying unit 32 comprises multiplying type D/A converter 32a. An analog signal (input through input switch 37) from basic unit 31 in the previous layer or a later described dummy node circuit is multiplied by the weight information (input through the later described weight holding unit 38) of the digital signal and the resulting product is output as an analog signal. Adding unit 33 comprises analog adder 33a (composed of an integrator) and holding circuit 33b (for holding the added result of analog adder 33a). Multiplying type D/A converter 32a receives an analog input signal at a reference voltage terminal of D/A converter 32a and respective bits of the weight at respective digital input terminals as the digital input signal, and multiplies the analog input signal by the weight. Analog adder 33a adds the resulting product output from multiplying type D/A converter 32a to the added value obtained at the previous timing and held in holding circuit 33b, thereby providing a new added value. Holding circuit 33b holds the added value obtained by analog adder 33a and feeds back the held value to analog adder 33a as the previous added value. These adding processes are carried out in synchronization with the adding control signal output from control circuit 39. Threshold value unit 34 is composed of non-linear type function generating circuit 34a comprising an analog function generator. It outputs a non-linear type signal such as a sigmoid function in response to the input. When the accumulation of the multiplied result is completed, including addition of the threshold value ($-\theta$), an operation process of the sigmoid function shown in equation (1) is performed by adding the threshold value ($-\theta$) to the added value x held in holding circuit 33b, thereby providing the analog output value Y. Output holding unit 35 comprises a sample/hold circuit and holds that output value Y of the analog signal from non-linear type function generator 34a which constitutes an output to basic unit 31 in the following stage layer.

The output switch 36 is turned ON for a predetermined period upon receiving an output control signal from control circuit 39. The final output is maintained in output holding unit 35 and processed to be output on analog bus B2. An input control signal from control circuit 39 turns ON input switch unit 37 when an analog output is transmitted from the final output of basic unit 31 in the previous stage layer. Weight holding unit 38 comprises a parallel out shift register. It maintains the weight signal as a bit parallel weight for multiplying unit 32 when the weight signal is bit serially transmitted from the weight memory and passes the gate on opening it (when the weight input control signal is turned on by controlling circuit 39). The bit-parallel weight data is provided to a multiplying un it when the multiplication control signal is provided. Control circuit 39 in the digital circuit unit produces a synchronizing signal for use inside the circuit based on an external synchronization signal and carries out a function of the analog process of the inside of the circuit.

As constructed above, the input and output signals of basic unit 31 with the signal process structure shown in FIG. 3D can be realized by using the analog signal. Multiplying type D/A converter 32a may receive the weight data of the digital signal in parallel or may convert the weight data into parallel data after receiving them as serial data. If the weight data is formed of the analog signal, the analog multiplying circuit may be used instead of the multiplying type D/A converter 32a.

Figure 4:
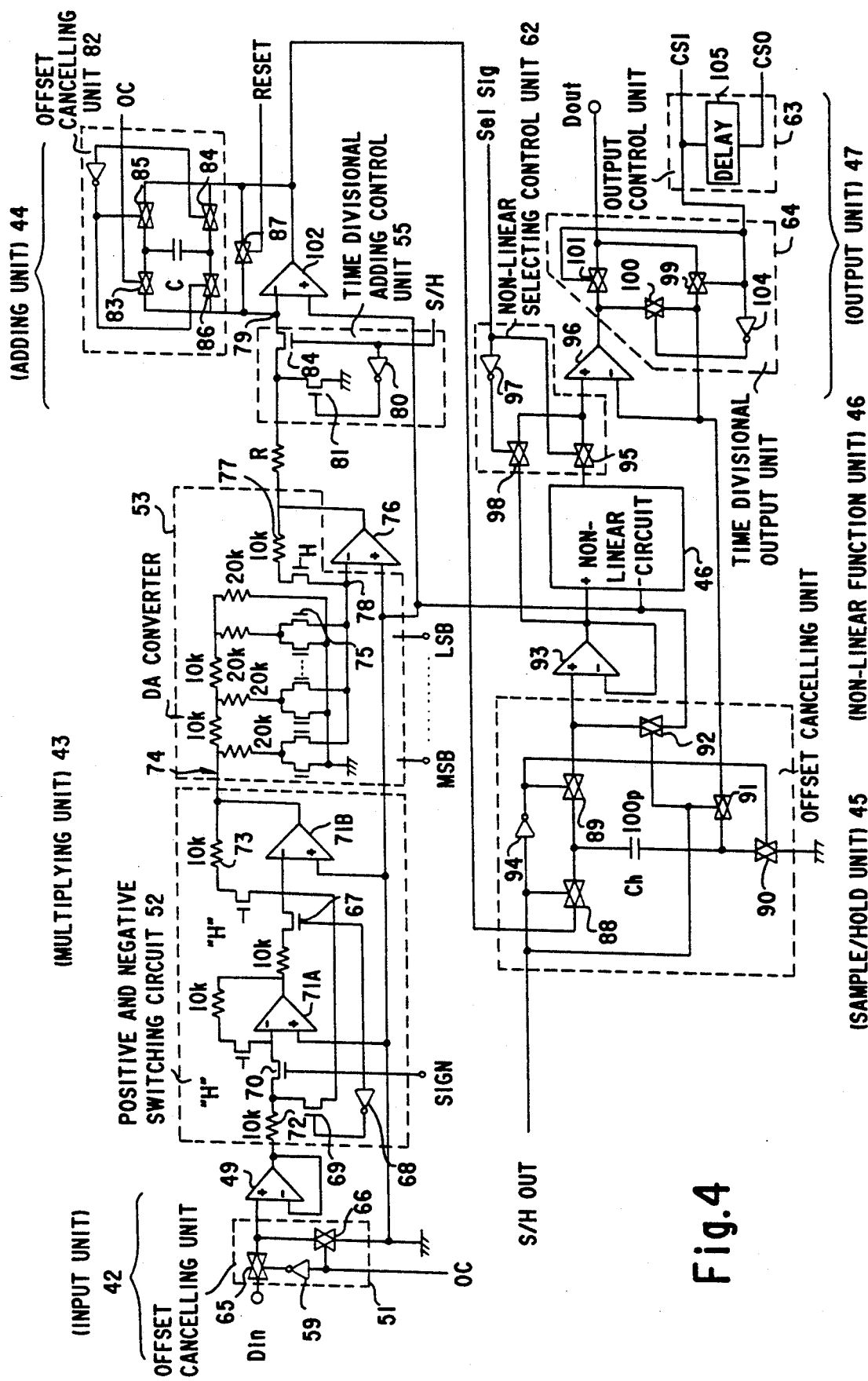
FIG. 4 is a detailed circuit diagram of an embodiment of the basic unit used for the present invention.

FIG. 4 is a circuit diagram of the embodiment of the neuron chip or analog neuron processor (ANP) of the present invention.

The neuron unit of the present invention comprises input unit 42, multiplying unit 43, adding unit 44, sampling/holding unit 45, non-linear function unit 46 and output unit 47.

Input unit 42 comprises offset cancelling producing circuit 51 and unity gain buffer 49. The output of the operational amplifier is fed back to its minus terminal by unity gain buffer 49 and input voltage is applied to its plus terminal. The data input Din receives a time division analog pulse signal from a common bus B1, as shown in FIG. 3C. OC represents an offset control signal. When it is "1" the analog switch 66 is turned on and "0" volts is compulsorily applied to unity gain buffer 49, that is, to the neuron unit, thereby cancelling the offset voltage produced in the output of the operational amplifier of the circuit in the following stage or the output of the operational amplifiers provided up to the output of the multiplier. However, when offset control signal OC is "0", the analog switch 66 is turned off and another analog switch 65 is turned on, and the data is input to unity gain time buffer 49. Analog switches 65 and 66 control the switching of the OC signal in the positive and negative phases, respectively. A phase control circuit prevents the circuits from being turned on simultaneously. Hereinafter, this will be referred to as OC being subjected to phase control.

Positive and negative switching circuit 52 is formed by combining two amplifying blocks in cascade form. The amplifying block comprises an input resistor (10 $k\Omega$) and a feedback resistor (10 $k\Omega$) to provide a 10/10=1-time reversed voltage. The sign of the analog voltage is determined depending on whether the signal passes through one or two stages of the amplifying block. The control voltage is a sign bit(SIGN) of the digital weight data and this sign bit is connected to the gates of MOS switches 47 and 70. The control signal of sign bit(SIGN) is also subjected to a phase control. When the sign bit(SIGN) is 1, the input voltage from the input block is reversed by the amplifying block containing amplifier 71A in the first stage as switch 70 turns on. It then passes through the amplifying block containing amplifier 71B in the following stage as the switch 67 is turned on, thereby providing a positive phase signal. Where the sign bit(SIGN) is 0, switch 69 is turned on by reverse circuit 68. Then, as switches 67 and 70 are turned off, the input signal from the input block is applied to the minus terminal of operational amplifier 71B in the post stage through switch 69. Therefore, an operational amplifier with resistor 72 in the previous stage and resistor 73 for feedback of the operational amplifier constitute an amplifying block which is a unity gain inverter. Namely, the input of the input unit is negative when the sign bit is negative, and vice versa. This provides a voltage according to whether the synapse connection is excited or suppressed. An output from the positive and negative switching circuit 52 is supplied to a point, namely, a reference voltage terminal 74 of R-2R-resistor circuit network of D/A converter 53.

The D/A converter of the R-2R system will now be explained. The internal switch is turned on or off depending on the digital weight data from MSB (most significant bit) to LSB (least significant bit). When the digital value is 1, the current flows through switch (transistor) 75 into an imaginary ground 78 of operational amplifier 76. This imaginary ground is maintained at the same voltage as the plus terminal of amplifier 76. The plus terminal of amplifier 76 is grounded, so that imaginary ground 78 is imaginary 0. In a D/A converter, R represents 10 $k\Omega$ and 2R represents 20 $k\Omega$. A current flows in resistor 2R regardless of the state of the switch. Whether or not the weight current flowing through resistor 2R (20 $k\Omega$) flows toward imaginary ground 78 is determined by the value of the digital data. When the current flowing through the right-most resistor 2R is determined to be I, the vertical current flowing in 2R corresponding to LSB located second from the right is provided as $(2R \times I)/2R = I$ by dividing the voltage applied to the right-most resistor 2R by 2R. Therefore, the current 2I flows in the horizontal right-most resistor R. The voltage $2R \times I + R \times 2I$ is applied to the vertical resistor 2R third from the right and the voltage is divided by 2R to provide the current 2I. Similarly, the currents through the vertical resistor 2R (20 $k\Omega$) become 4I, 8I, 16I, or higher powers of 2 multiplied by I. The data from MSB to LSB determines whether or not the weight current of the second power of 2 multiplied by I flows into the minus terminal of the operational amplifier 76. Therefore, the current corresponding to the digital weight data flows into the imaginary ground 78 with an amplitude of the second power of 2 times I. As the input impedance of the operational amplifier is infinite, and the current flowing toward the imaginary ground 78 flows through a feedback resistor 77 of operational amplifier 36, the output voltage Vout of the D/A converter is given by, $$V_{out} = -(E_s/2n) \times (D0 + 2 \times D1 + 2^2 \times D2 + \ldots + 2^{n-1} \times Dn-1)$$

where Es is the input voltage, D0 is the LSB and Dn-1 is the MSB. That is, the output of the multiplying unit 43 is the value obtained by multiplying the input voltage by a weight. The weight coefficient is controlled by the digital value from MSB to LSB.

Adding unit 44 uses a Miller integrator in a time divisional manner, to carry out an accumulation and an adding operation on respective products of the time divisional multiplexing analog signal and the digital weight data. Sampling/holding unit 45 performs sampling/holding of the addition result.

Adding unit 44 is an integrator comprising resistor RT and capacitor CT. The input unit of adding unit 44 contains time division adding control unit 55 and when the sample/hold signal is 1, the output of multiplying unit 43 is input to an imaginary ground 79 of operational amplifier 102. When the S/H signal is 0, inverter 80 turns on switch 81 and the output of multiplying unit 43 is connected to ground through resistor RT. Thus, the input is not added to capacitor CT of adding unit 44 when the S/H signal is 1. The output voltage of multiplying unit 43 is input to the minus terminal of operational amplifier 102 through a resistor RT. The current obtained by dividing the input voltage by resistor RT 38 is input to capacitor CT through an imaginary ground 79 to perform an integration. Thereafter, when the S/H signal becomes 0 and multiplying unit 43 is disconnected from adding unit 44, multiplying unit 43 can multiply the next signal by the weight data. Offset cancelling unit 82 of an integration circuit containing capacitor CT is provided with an offset cancelling function by using four switches. When the sampling hold signal is 0 and the offset control signal OC is 1, switches 83 and 84 are turned on and switches 85 and 86 are turned off, thereby reversing the voltage stored in the capacitor CT. When the offset control signal OC is 0, an input voltage is applied to the data input terminal of data input unit 2 and the corresponding output of multiplying unit 43 is applied to capacitor CT through resistor RT. Then, switches 85 and 86 are turned on and capacitor CT has a minus polarity on the side connected to minus terminal 79 of operational amplifier 102 and has a positive polarity on the side connected to the output of operational amplifier 102. When the offset control signal OC becomes 1, the capacitor which stores the voltage including the offset voltage is reversed. Thus, data input is compulsorily made 0. In this case, if an offset does not exist, even if the input signal is transferred through positive and negative switching circuit 52 and multiplying unit 43, the output of the D/A converter becomes 0. However, as the operational amplifiers are used and the offset voltage is activated, the offset voltage is added to capacitor CT with a reversed voltage and is consequently stored. This is different from the case where offset control voltage OC is 0, switches 83 and 84 are turned on and the polarity of capacitor C is reversed. Therefore, the offset voltage produced upon receipt of the input signal is controlled by making the offset control signal OC "1" and changing the polarity of the capacitor CT. As a result the offset voltage is cancelled. The offset voltage occurring after the capacitor CT receives the input signal is cancelled by changing offset control signal OC to "1" to change the polarity of capacitor CT. When offset control signal OC is 0, input voltage is applied to data input Din and the corresponding output from the multiplying block is applied to capacitor CT through resistor RT. The present invention achieves an equivalent offset cancelling function by reversing the polarity of capacitor CT. After the offset is cancelled, offset control signal OC becomes 0 and the capacitor returns to its original state. Switch 87 is controlled by a reset signal. When the reset signal is received, the voltage of capacitor CT is made 0 and the output of the adding block is compulsorily 0 as it is a resetting operation. This offset control signal OC is also subjected to phase control.

The output of adding unit 44 is supplied to sample holding unit 45 and stored in capacitor Ch through switch 88 when the phase-controlled sample hold control signal S/H out is 1. When the S/H$_{out}$ signal is 1, the control signal of switch 90 is turned to 0 by inverter 94 and if one terminal of capacitor Ch is not grounded, the signal of the final output data is applied to capacitor Ch through switch 91. That is, the final output signal at that time is fed back to the lower side of capacitor Ch. Thus, capacitor Ch stores the voltage obtained by subtracting the final output data from the output of adding unit 44. At this time switch 92 is turned on and a plus terminal of operational amplifier 93 is compulsorily made 0, thereby causing the final output data to be an offset voltage. Therefore, capacitor Ch stores the voltage obtained by subtracting the offset voltage from the output of adding unit 44 beforehand. On the other hand, when the $S/H$out signal is 0, switches 89 and 90 are turned on and the lower side of capacitor Ch is grounded. As a result, the voltage stored in capacitor Ch is applied to the plus terminal of unity gain operational amplifier 93 through switch 89. The offset component is already subtracted from the output signal and thus the offset component is cancelled. The output of operational amplifier 93 is input to sigmoid function unit 46 through operational amplifier 93. As described above, when the S/H control signal is turned to 1, switch 88 is turned on and capacitor Ch receives the difference between the output value from the adding unit and the final output value. Since, at this time, switch 92 is turned on, 0 volts are compulsorily applied to operational amplifier 93. Then, Dout produces an offset voltage ΔV. The offset voltage is applied to the lower side of capacitor Ch through switch 51 through sigmoid function unit 46, operational amplifier 96 and analog switch 100. Therefore, when the $S/H$out control signal is 0, namely, when switch 89 is turned on and switch 92 is turned off, the voltage stored in capacitor Ch is finally output through amplifier 93 and sigmoid function unit 46 as the value obtained by subtracting offset voltage data *V from the output of adding unit 44. When the S/H$_{out}$ signal is turned to 1, the offset voltage formed at this timing becomes ΔV. As a result, the offset voltage is cancelled.

The non-linear functional unit 46 for forming a sigmoid function block comprises non-linear selection circuit 62. The phase control SEL SIG signal is turned to 1, switch 95 is turned on and the output of sigmoid function unit 46 is applied to operational amplifier 96. However, when the SEL SIG signal is 0, it forms the control signal of switch 98, made 1 through inverter 97, and the output of the sigmoid function is cut. The output voltage of sample and hold unit 45 is directly input to operational amplifier 96 without having a sigmoid function applied to it. In this case, the neuron unit shown in FIG. 4 can be used as an adaptive filter or as a linear neuron network and further it becomes easy to test its operational characteristics. Operational amplifier 96 is basically a unity gain operation amplifier for directly feeding back the output to the minus terminal, and is operated as a buffer. It acts as a buffer in making the output impedance 0. Output block 47 is connected to time division output unit 64 and output control unit 63. When $CS_{in}$ is "1", switches 99 and 91 are turned on. The final output operational amplifier 96 outputs the final output at data output DATA-OUTPUT. This output is then fed back to the minus terminal of operational amplifier 96 and simultaneously input to sample/hold unit 45. On the other hand, when $CS_{in}$ is 0, switch 100 is turned on and switch 101 is turned off. Therefore, the output of amplifier 96 is not produced on a Dout data line. However, as switch 100 is turned on to provide unity gain buffer voltage, the following operation of operational amplifier 96 is not disturbed, but is carried out. Output control circuit block 63 determines whether the output pulse voltage is transmitted by control signal $CS_{in}$ for a daisy chain operation. $CS_{in}$ is then output as $CS_{out}$ through a delay circuit 105 and the timings of the output analog signals to the other adjacent neuron unit in the same layer is determined. Therefore, the present invention transmits an analog signal in a time division manner from output unit 47 to common bus B2 shown in FIG. 3C. This does not conflict with other output signals from other neuron units.

Figure 5:
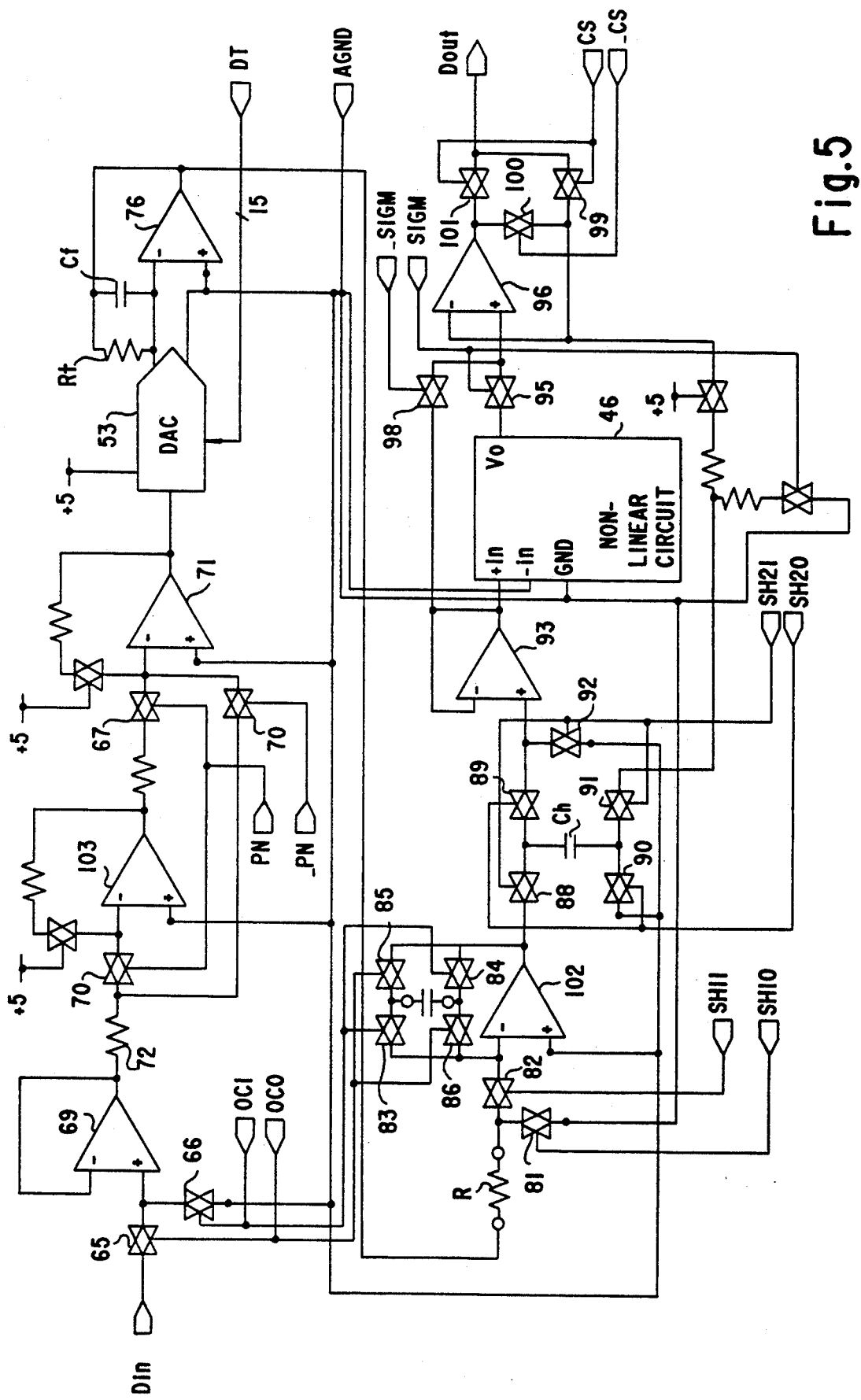
FIG. 5 is a detailed circuit diagram of another embodiment of the basic unit used for the present invention.

The phase control shown in FIG. 5 is realized by forming offset cancellation OC; sign SIGN; sample hold S/H; sample hold $S/H_{out}$; sigmoid selection signal SEL SIG; daisy chain signal CSI in FIG. 4 by two signals, namely, OC0 and OC1; PN and minus PN; SH11 and SH10; SH21 and SH20; minus SIGN and SIGN; and CS and minus CS; respectively. One control signal is formed by two signals comprising a positive phase and a negative phase, and is shifted by shifting the phase of respective signals so that the positive phase of the control signal does not turn the switch on at the same time as the negative phase of the control signal turns on a different switch. The Rf connected to the output terminal of D/A converter 53 makes the feedback signal from operation amplifier 76 match the operation speed of D/A converter 53, and D/A converter 53 receives digital input from the DT terminal. Parts in FIG. 5 which are the same as those in FIG. 4 are given the same numbers. Therefore, their explanation is omitted.

Figure 6:
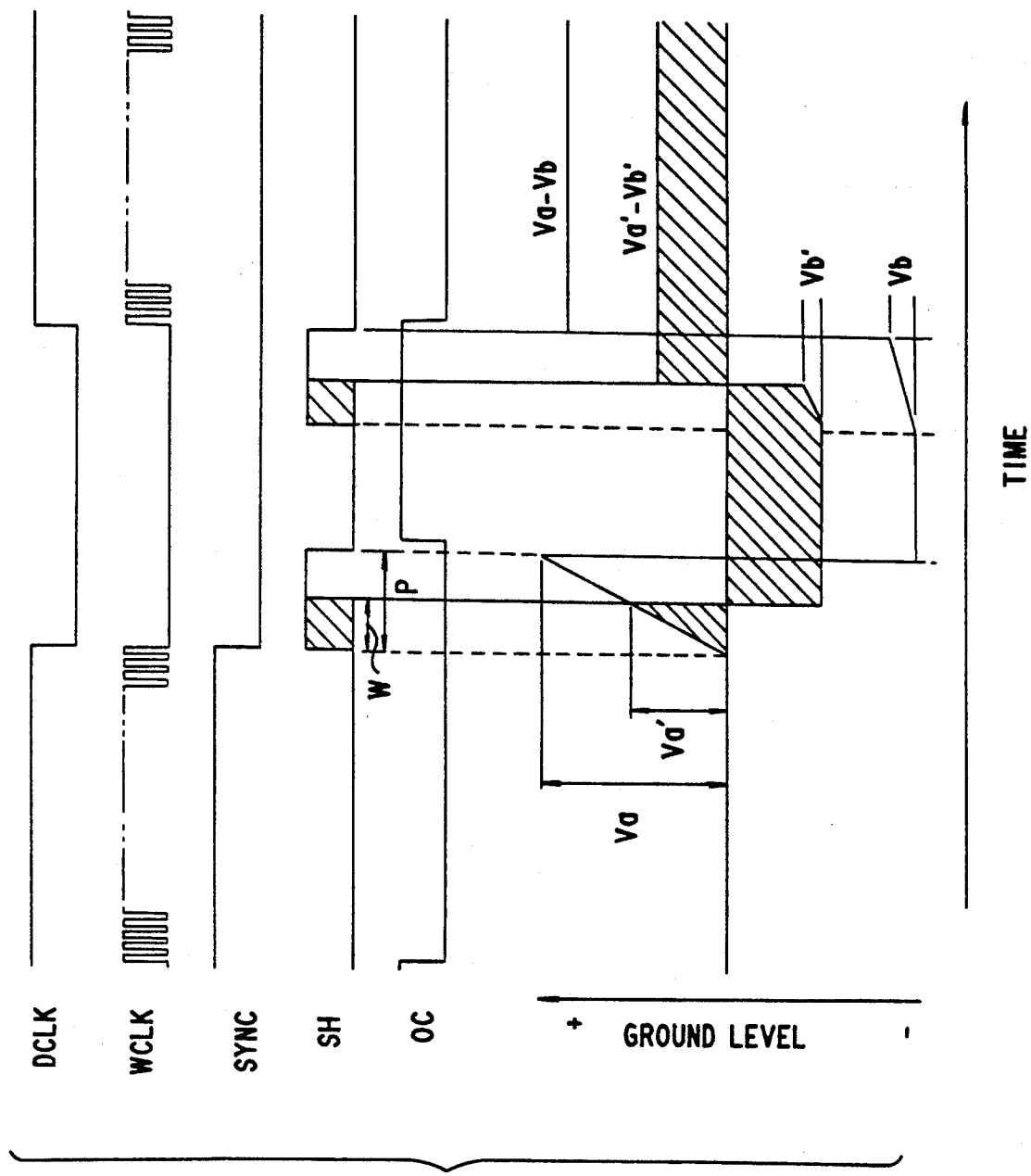
FIG. 6 shows a view for explaining the timing of an integrator used in the basic unit in the present invention.

FIG. 6 shows a timing chart for an integrator operated based on an error absorbing system for correcting a weight in accordance with the present invention. Data clock DCLK and weight clock WCLK are basic operation clocks. When data clock DCLK is high, a high-speed weight clock WCLK is outputted during a half period of the data clock DCLK. Weight clock WCLK is a synchronizing clock for inputting serial weight data to the integrator. Data clock DCLK is a basic clock for processing an analog input signal. Synchronizing signal SYNC can achieve synchronization of respective analog neuron units within respective layers. The operation of the output voltage of the integrator is shown by a triangular waveform in the lower part of the drawing. The integrated waveform is controlled by a pulse signal of sample/hold control signal S/H. During the period of high sample/hold S/H control signal, an integration is carried out. Namely, a charge is applied to capacitor CT of the integrator path. During the period in which the sample/hold control signal S/H pulse is high, this charge is gradually accumulated in the capacitor CT in order to increase the voltage. When the sample/hold S/H control signal pulse is low, the charging operation is terminated. Therefore, only the charged quantity during the scope of the integration time is important. Thus, the pulse width of the sample/hold control signal is controlled to expand or compress the scope of the integration period. Therefore, even if the input signal is the same, the output of the integrator becomes charge voltage Va when the sample/hold control signal S/H has a pulse width P and it becomes charging voltage Va' when the sample/hold control signal S/H has a pulse width W.

When sample/hold control signal S/H is low and offset control signal OC is high, the polarity of capacitor CT of the integrator is changed and the integration output, to which an offset component is added, is reversed. When offset control signal OC is high and sample/hold control signal S/H is also high, offset voltage Vb (Vb') is added to capacitor CT. When the S/H signal becomes low again, and the off-set set cancelling signal becomes low, the polarity of the capacitor is again reversed to have an original polarity and the integral output value Va Vb (Va'-Vb'), in which the offset component is cancelled, is subjected to a sample/hold operation. After the output of the integrator has been reversed the polarity of the integrator's output is returned to its original state.

The integration time should be made variable, for example, for the following reasons. The multiplier in the ANP of MB4442 is a D/A converter with a fixed decimal point arithmetic operating system. The fixed decimal point arithmetic operation has a fixed position for the decimal point and can only express a number with a limited number of digits. When the fixed decimal point method is adopted, for example, the decimal point is positioned in the left-most digit position of a 10-bit numerical value. Thus, numbers greater than "1" cannot be expressed. That is, the multiplier cannot multiply the input voltage by a number greater than "1", and thus cannot produce an output obtained by multiplying the input voltage by 2. Thus, such multiplier increases the input voltage but cannot make it greater than "1". If the position of the decimal point is lowered, only numbers up to and including 2 can be expressed. Therefore, it is necessary to control the gain of an integrator in accordance with the position of the fixed decimal point. If there are many input voltage numbers, and these input voltage numbers are added sequentially, then the integrator overflows. Thus, the integrator may control the integration time period. Namely, when the integrator cannot operate efficiently depending on the weight data, the S/H pulse is controlled to change the integral time period and the gain of the integration is changed adaptively in an equivalent manner. Therefore, it is possible to prevent the overflow of the integration and it becomes possible to increase the number of bits of the weight data equivalently.

When the ANP receives an analog input voltage and the number of neurons on the receiving side is large, the number of weight data increases. Namely, when the number of neurons in the previous layer is large, the weights are determined for respective and individual neurons in the previous stage. Thus, the number of weight data becomes equal to the number of neurons observed in the previous stage. However, sometimes the number of neurons which can be observed in the previous stage is not always equal to the number of weight data because of the special structure in which a dummy node for producing "1" to control the threshold voltage exists. By providing the weight to the dummy neuron, the non-linear function may be slid horizontally. If a dummy node is provided in the previous stage, the number of input voltages is counted including the number of dummy nodes when the number of input voltages is observed by the following layer.

Therefore, when the method of changing the time period of the integration is utilized in the present invention, overflow of the analog integration may be avoided.

The following also becomes possible. As the time constant RC of the integrator itself can be manufactured by an external part, the accuracy of elements such as R and C may vary. Thus, even with the same integration time period, these variations cause a different voltage to be produced from different neuron chips. This voltage difference must be eliminated. The present invention intentially extends or shortens the pulse of a sample/hold control signal S/H so that all the neuron chips have the same integration gain. For example, when the same input is applied to different neuron chips, the contents of their control pattern memories are controlled by the digital control means to produce integration outputs of the same voltage, thereby making the pulse width of the sample/hold control signal S/H controlled or adjusted properly.

In the present invention, voltage errors resulting from variations in the neuron chips can be absorbed and serious problems caused by the saturation of the analog voltage can be avoided. The weight data is determined based on the consideration of the network as a whole and errors in local parameters other than the above may be absorbed within or near the ANP chip itself.

Figure 7A:
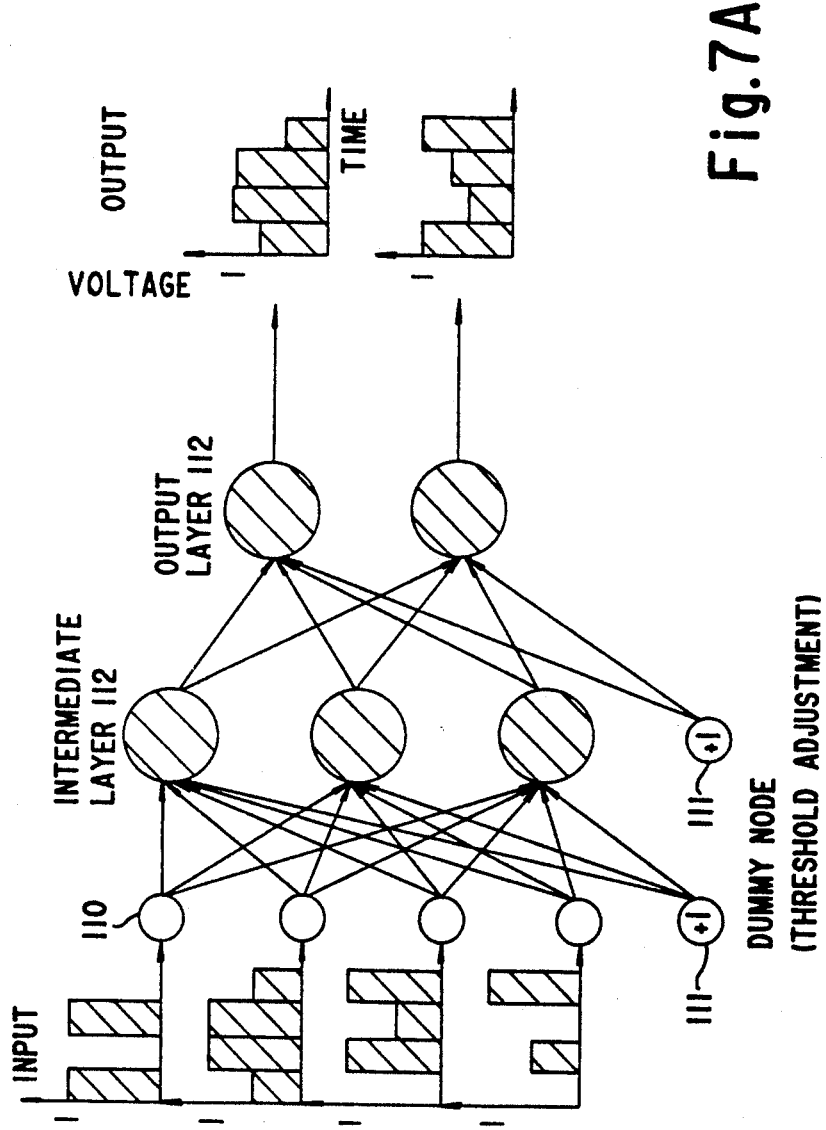
FIG. 7A shows a conceptual view of a layered type network.
Figure 7B:
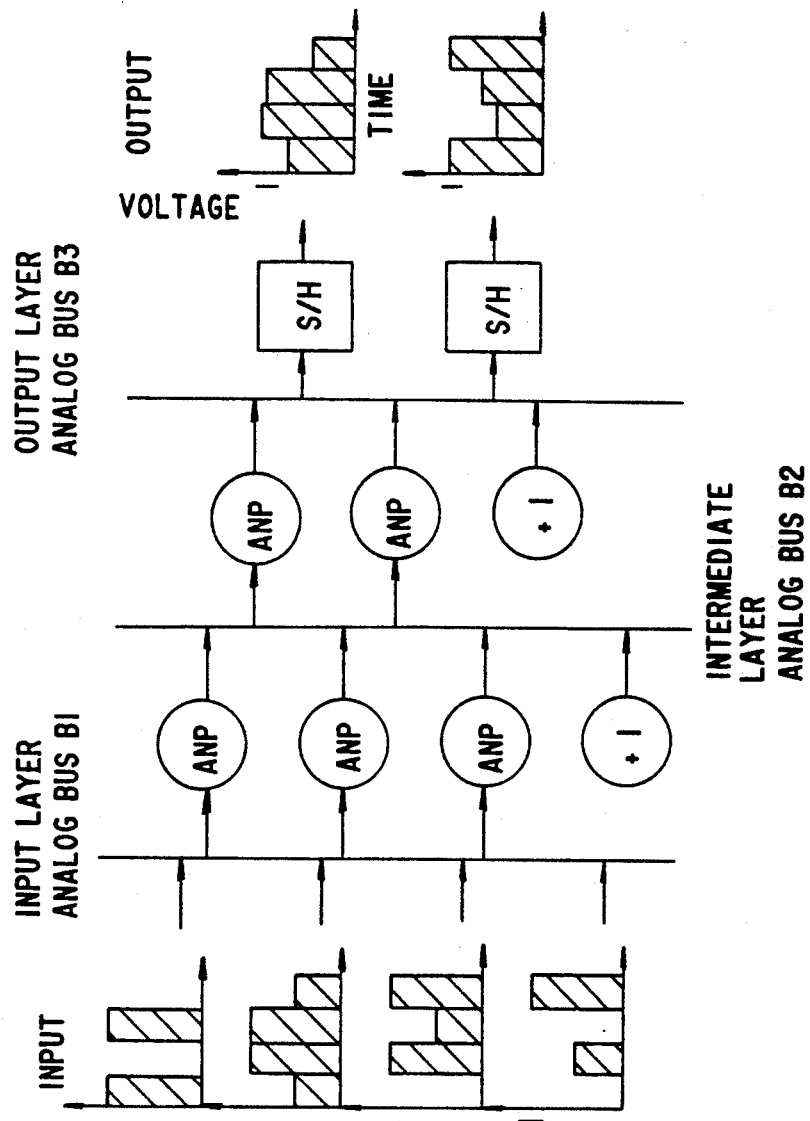
FIG. 7B shows a conceptual view of a layered type neural network in a slightly different manner from that of FIG. 7A.

Next, a layered type neural network is explained. FIG. 7A is a conceptual view of a layered type network. In this network, the input data enters input node 110 of the input layer on the left side and is sequentially processed in the rightward direction. Respective neurons 112 of the intermediate or hidden layer receive output from the previous layer including dummy node 111, forming a complete connection between two layers. If there are four input nodes 110 in the input layer, one dummy node 111 is added to it. Thus, it is observed from respective neurons 112 in the hidden layer that the input layer has five neurons. Dummy node 111 controls the threshold value and adds the constant value "$-\theta$" to the value x obtained by the result of the sum of the product and included in the following sigmoid function, and then shifts a waveform defined by the following equation in a positive direction along the x axis, thereby providing the function $f(x-\theta)$.

$$f(x) = \frac{1}{1 + \exp(-X)}$$

This is equivalent to a change in the weight corresponding to dummy node 111 within the neuron and the constant value $\theta$ is produced by the later described maximum value node circuit. Therefore, if the weight corresponding to the dummy is prepared, the threshold value may be expressed by the weight. Thus, it is observed by neuron 113 in the output layer that the intermediate layer has four neurons. The input data applied to the input layer is subjected to the sum-of-the-products arithmetic operation by using the weight data in intermediate layer neuron 112 and output layer neuron 113, resulting in the production of the output data.

The layered structure shown in FIG. 7A is expressed by using the ANP of the present invention. Independent analog buses B1, B2 and B3 are provided between respective layers, namely, between the input layer and the intermediate layer, and between the intermediate layer and the output layer, and at the output layer. All the vertical ANPs operate in parallel. A sample hold circuit S/H is provided at the output of the output layer.

Figure 8:
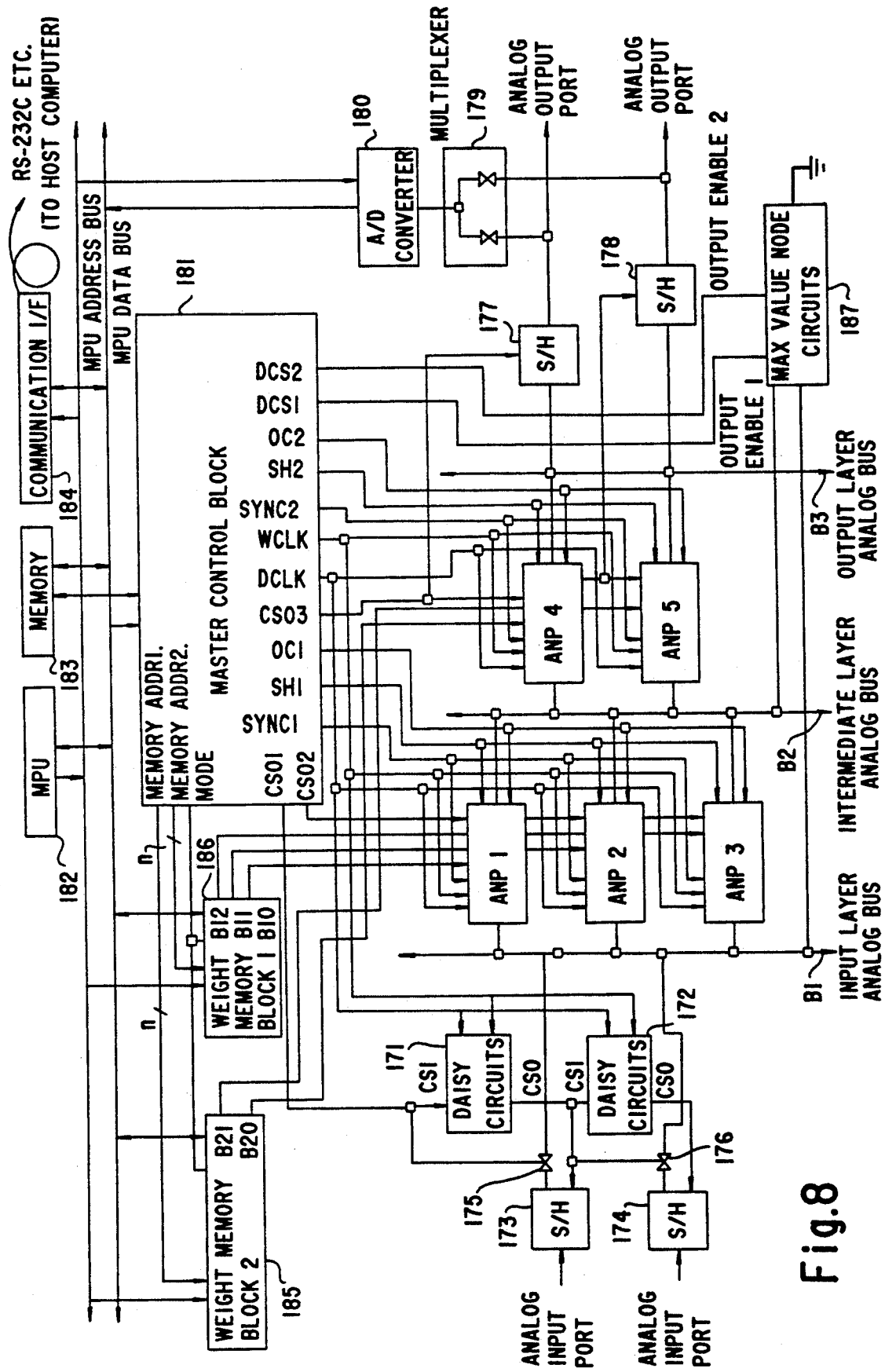
FIG. 8 is a detailed block diagram of an embodiment realized by a layered type neural network by using the ANP of the present invention.

FIG. 8 is a block diagram of the layered neuron network of the neuron computer of the present invention. Analog neuron processors ANPs 1 to 5 comprising neuron chips, are provided in parallel in respective layers and analog buses B1, B2 and B3 are independently provided between two layers. In FIG. 8, the intermediate layer is formed by ANPs 1, 2 and 3 and the output layer is formed by ANPs 4 and 5. The input state does not have any ANPs, but has daisy circuits 171 and 172 for inputting the analog input signal in good timing. The circuits designated by S/H are sample/hold circuits 173 and 174. ANPs 1 to 5 need logic signals for control and many control signal lines are connected to respective layers from master control block (MCB) 181. Data clock DCLK is applied to daisy circuits 171 and 172 at the input side of all the ANPs and constitutes a basic clock for analog processing. A weight clock WCLK is applied to all the ANPs and daisy circuits 171 and 172 at the input side. This provides a high speed clock for the weight data. The weight data is input to respective ANPs 4 and 5 and ANPs 1, 2 and 3 from weight memory block 185 and 186 in synchronization with the weight clock WCLK. The synchronization clock SYNC1 is applied to the ANPs in the intermediate layer and the synchronization signal SYNC2 is applied to the ANP at the output layer for the synchronization clock. SH1 and OC1 represent the sample/hold control signal and offset control signal, respectively, for the ANPs in the intermediate layer, and SH2 and OC2 represent these signals for the ANPs in the output layer.

Daisy circuits 171 and 172 of the blocks on the left side are the input side circuits corresponding to the input layer. In order to realize the input node, namely, the neurons in the input layer, the analog input signal applied to the analog input ports 0 and 1 should be applied to the daisy circuits in a time divisional manner at the same timing as an ANP produces the analog signal. Namely, a basic operation is constructed when ANPs 4 and 5 in the output layer receive analog signals from ANPs 1, 2 and 3 in the previous intermediate layer in a time divisional manner through analog bus B2. The relationship described above exists between the intermediate layer and the input layer. This relationship should be such that the ANPs in the input layer exist before the ANPs in the intermediate layer. Therefore, the output should be provided to analog bus B1 from analog input ports 0 and 1 upon receiving the analog input signal at the same time as the ANPs in the intermediate layer output the analog signal to analog bus B2. In other words, the input signals from the analog input ports 0 and 1 are applied to analog bus B1 in a time divisional manner. The analog signal from the analog input port 0 is applied to the analog bus B1 at an appropriate timing. The next analog input signal from analog input port 1 is applied to the analog bus B1 after the analog signal from analog input port 0 is applied to the same analog bus B1. In order to achieve the above synchronization, the input control signal CSI output at a constant timing is applied to daisy circuit 171 and after a certain period, daisy circuit 171 produces output control signal CSO. The CSI is produced by CS01 of master control circuit 181. Daisy circuits 171 and 172 form a kind of delay circuit. When daisy circuit 171 receives input control signal CSI from master control unit 181 it transmits the CSO signal to the vertically lower adjacent daisy circuit 172 so that the analog output signal is output from analog input port 1 to the analog bus of the input layer. This operation is called a daisy control.

When the output CS01 of master control circuit 181 rises, switch 175 is turned on and the analog input signal of analog input port 0 held in sample/hold circuit 173 is applied to analog bus B1. As CS01 is the CSI of daisy circuit 171, a CSO rises a predetermined time after the fall of the CSI. This CSO is the CSI for daisy circuit 1 72, a nd simultaneously turns switch 176 on. Thus, the analog input signal of analog input port 1 held in sample/hold circuit 174 is applied to bus B1. The present layered structure needs such daisy control. That is, the analog input signal is applied to analog bus B1 through the analog input port 0 and sample hold circuit 173. The next analog input signal is output to the same analog bus B1 through the analog input port 1 and the sample hold circuit 174. From the viewpoint of respective neurons in the hidden layer, the analog input signal of analog input port 0 and the following analog input signal from analog input port 1 are sequentially input in a time divisional manner.

Daisy circuits 171 and 172 output the output control signal CSO by delaying the input control signal CSI by a predetermined period to avoid a bus competition on the analog bus B1.

When ANP1 for receiving the output control signal CS02 from master control block 181 as CSI provides the analog signal, CSO is applied to ANP2 as CSI and thereafter ANP2 outputs CS0. ANP3 which receives CSO of ANP2 as CSI next produces the analog signal. In summary, ANPs 1, 2 and 3 produce outputs in turn, thus completing the daisy operation in the intermediate layer. In parallel with this operation, master clock control block 181 for managing all the operations provides CS03 to ANP4 in the output layer and then ANP4 produces the output. After completion of the output, ANP4 provides CSO to ANP5 and ANP5 produces the output.

Outputs from ANPs 4 and 5 in the output layer are subjected to a sample/hold operation by sample/hold circuits 177 and 178, respectively, under the control of CS03 from master control block 181 and daisy chain output control signal CSO. The output voltage is output as the analog output signal from analog output ports 0 and 1 and selected by analog multiplexer 179. An A/D conversion is thus applied to the output of multiplexer 179 by A/D converter 180 and then the output of A/D converter 180 is transmitted to digital control circuit means comprising MPU182, memory 183 and communication interface 184. The output signal is compared to a teacher signal stored in the MPU during learning to determine whether or not the output signal is the desired one. The weight data of the later described weight memory is changed based on this comparison. Maximum value node circuit 187 applies dummy node control signals DSC1 and DSC2 from master control block 181 to output enables 1 and 2 and the output terminal is connected to analog buses B1 and B2.

Figure 9A:
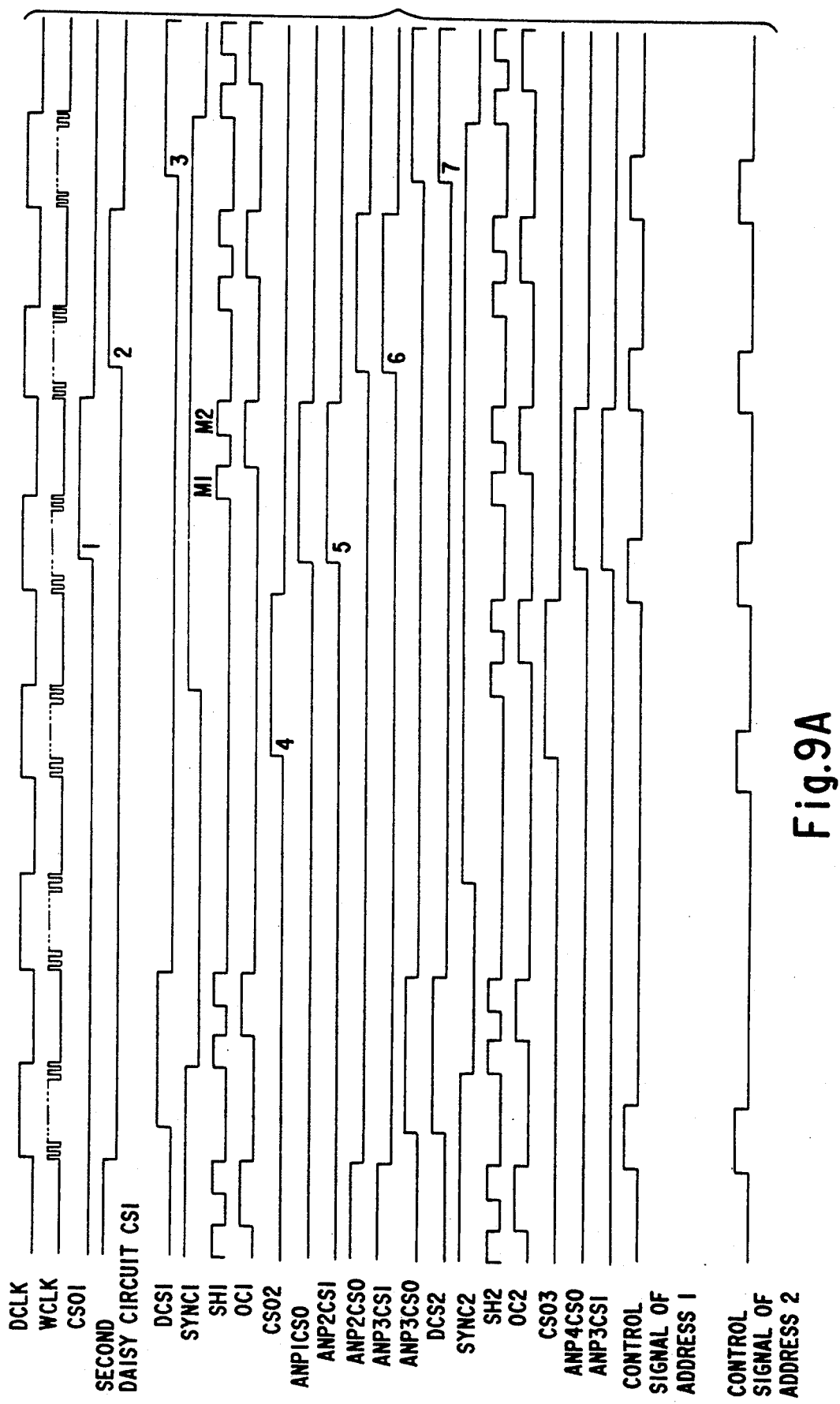
FIGS. 9A and 9B show a timing chart of the signal process shown in the detailed circuit shown in FIG. 8.

FIG. 9A shows a timing chart of a layered neuron computer according to the embodiment shown in FIG. 8. A control signal line is extracted every layer. The data clock DCLK, i.e., the basic operational clock, and weight clock WCLK are simultaneously applied to daisy circuits 171 and 172 on the input sides of all ANPs in the same layer.

Weight clock WCLK is a serial synchronizing pulse for transmitting the serial digital weight and for reading the weight from the weight memory block. The control signal determines at which timing the input data is received. In the timing chart of FIG. 9A, CS01 is a busy daisy chain control signal outputted from the master control block 181, namely, the daisy chain control signal CSI applied to daisy circuit 171. In daisy circuit 171, CSI outputs the first analog input signal to analog bus B1 through analog input port 0 and sample/hold circuit SH173. In the timing chart shown in FIG. 9A, at time ①, the analog signal is output to analog bus B1. At this moment, the voltage is applied to analog bus B1 and ANP1, ANP2 and ANP3 perform a parallel sum-of-the-products operation for this analog signal. The CSO passes daisy circuit 171 and the next CSI rises at timing ②, a predetermined time after CSO falls. The next CSI is a control signal applied to second daisy circuit 172 in the input layer. During the high period of CSI, the analog input signal is applied to ANP1, ANP2 and ANP3 through sample/hold circuit SH174, thereby executing a sum-of-the-products operation. DSC1 from master control block 181 is a control signal to be applied to a dummy node. Respective layers receive signals from the dummy node as well as input signals. The number of nodes is equal to the number of neuron nodes plus one. Therefore, the input layer has two inputs, although it seems to have three inputs when observed from the ANPs provided in respective intermediate layers. Therefore, a control signal block comprises two CSIs and one DCS1. The input cycle starts from the initial CSI and ends at the input to the dummy node DSC1. The dummy node is provided by the maximum value node circuit 187 and the circuit outputs a threshold value voltage fixed on the analog bus while CSI is being inputted. As shown at time ③, from the beginning of the rise of DSC1 and while the output voltage is being output, respective ANPs in the intermediate layer perform the sum-of-the-product operations as for the ordinary input. The fixed value voltage of a high CSI signal is added to the sum of the products of the previous two analog input signals, thereby enabling an addition to be conducted after multiplication. SYNC1 becomes high at a falling edge of DCLK before the rise of CS01 and thus becomes low at the falling edge of the following DCLK after the rise of DSC1. SYNC1 is a synchronizing signal for the input layer. When WCLK is input, the analog input is multiplied by the weight data. Sample/hold signal SH1 input to the ANP at the intermediate layer, provides two high portions M1 and M2 and the product is obtained a little before the first high portion M1 and the sum is produced during the high portion M1 and then held. At the next high portion M2, the offset voltage Vb is subtracted from the held voltage (as indicated in FIG. 6) and that is subjected to a sample/hold operation. This process is repeatedly conducted on the analog signal to be inputted, thereby computing the sum of the products. In this case, respective ANPs in the intermediate layer perform the sum-of-the-products operation three times, including the one for the dummy node. Thus, the processes of respective ANPs in the intermediate layer are completed and the addition of the products for three inputs is completed.

In the timing chart shown in FIG. 9A, when DCLK is high immediately after the fall of DCSC1, the result of the sum-of-the-products operation of three signals obtained from analog input ports 0 and 1, and the dummy node is held in capacitors (Ch in a sample/hold unit 45 in FIG. 4) of respective ANPs 1, 2 and 3. This operation is basically repeated. The rise in the CS02 signal determines when the output signal of ANP1 is output to the analog bus B2 provided between the intermediate layer and the output layer.

Offset control signal OC1 shown below SH1 performs an offset cancel within ANP. Respective ANPs use analog signals including an operational amplifier therein and thus the circuit itself has an offset which is cancelled by the control signal of the OC1 signal. As shown by OC1, every time one sum-of-products operation is carried out, one pulse is output to perform an offset cancelling inside the ANP. In the timing chart, as shown by time ④ when CS02 rises, the signal held in ANP1 is outputted to the analog bus B2 and ANP4 in the output layer forms a sum-of-the-products operation during the high period of CS02. The rise of CS02 shown by time ④, designates a timing when the sum-of-the-products result obtained as a result of the preceding input signal is output.

Figure 9B:
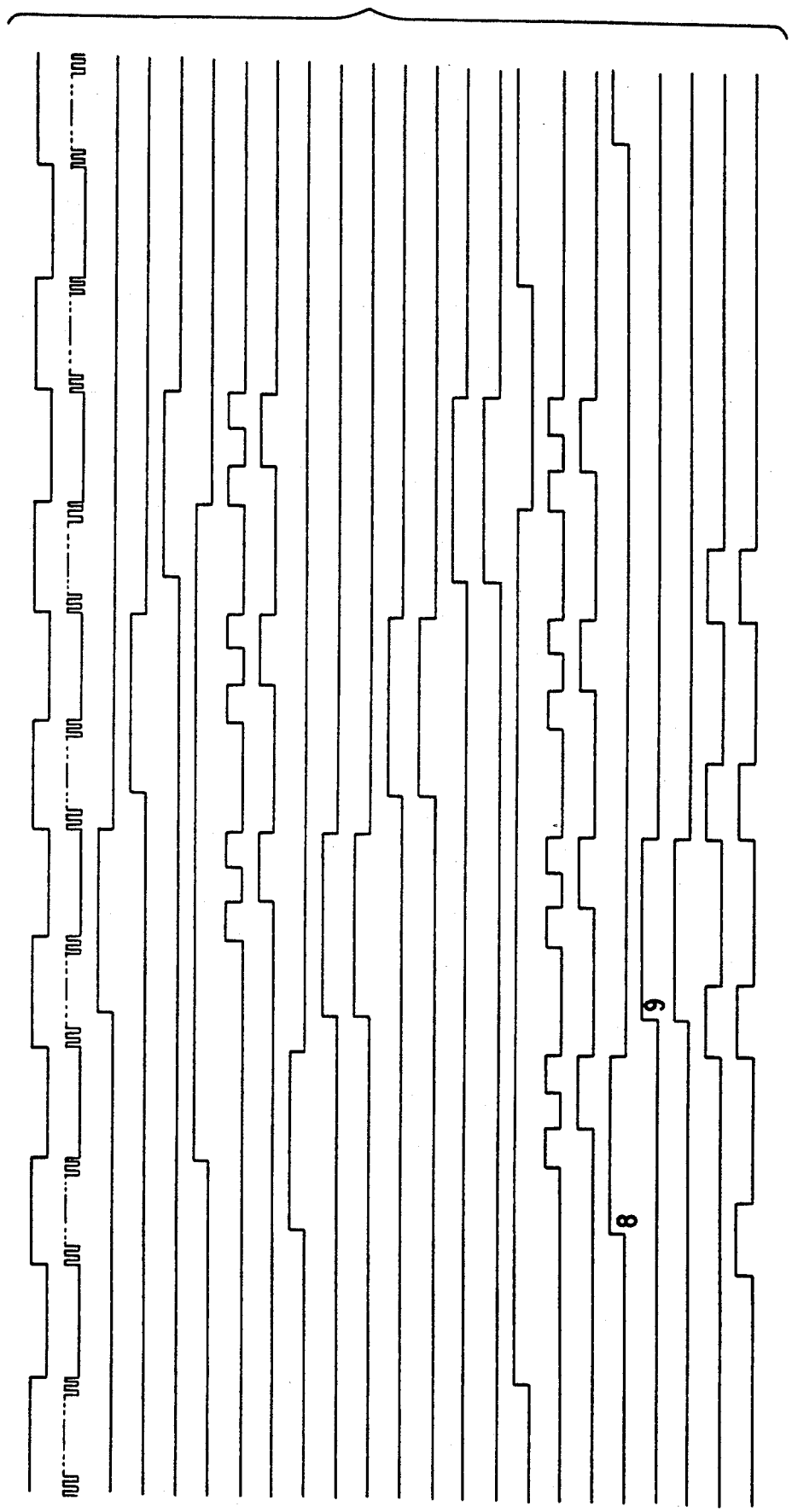

The timings in the intermediate layer and the output layer are explained by referring to FIGS. 9A and 9B. The analog signal is produced in synchronization with outputs ④, ⑤, ⑥, and ⑦, of the daisy chain control signal from the hidden layer and outputs ⑧ and ⑨ from the output layer and it is produced on the analog bus as the result of the previous process cycle for the analog signal in accordance with the daisy chain control signal outputs ①, ② and ③ from the input layer. The execution of the pipeline process is explained later. Upon the rise of CS02, shown by time ④ in the timing chart, ANP1 produces the output. Two pulses are output as shown by the signal SH2. Signal SH2 is input to the first ANP4 in the output layer in the block diagram shown in FIG. 8. Namely, one sum operation in ANP4 is carried out on two high portions of the SH2 signal. Three neurons comprising ANPs 1, 2 and 3 are shown in the intermediate layer. In addition, the dummy node is added to it by maximum value node circuit 187, thereby providing four neurons in total. Accordingly, a pulse comprising two high portions of SH2 signal is produced four times starting at time ④. The analog signal in the hidden layer is inputted to ANP4 in timings of four pairs of high portions of the SH2 signal to perform the sum-of-the products operation. This operation is naturally conducted simultaneously with the timing when the ANP in the hidden layer perform the sum-of-the-products operation to the input signal, thereby conducting pipeline processing. The CSO signal for ANP1 provided in the intermediate layer is shown below CS02 and is CSI for ANP2 in the same intermediate layer. This is shown by the portion designated by time ⑤. The CSO for ANP2 is shown below ANP2, CSI and the CSI for ANP3 is shown below ANP2, CSO and the CSI for the dummy node is shown below the CSI for ANP3, and DCS2, output from the master control block, becomes high at time ⑦. The CSI is input to ANP1, ANP2 and ANP3 in the intermediate layer and max inner value node circuit 187 for the dummy node, in the sequence of times ④, ⑤, ⑥ and ⑦. During this period, signal SH2 produces four pulses each having two high portions. The neuron of ANP4 provided in the output layer adds the products of input analog signals and weights four times. At time ④, when CSI is input to ANP1, the analog signal from ANP1 is output to the analog bus between the intermediate layer and the output layer and is input to ANP4. At the same time, corresponding weight data is input to ANP4 and the multiplications are carried out and the products are added to each other at the first high portion the SH2 signal and is subjected to a sample/hold operation at the second high portion. Upon completion of the calculation, the CSO signal from ANP1 rises, thereby providing CSI of ANP2 at time ⑤. Then, the weight data is multiplied by the analog data, so that the sum can be calculated. A predetermined period after the fall of the state shown by time ⑤, the CSI to ANP3 becomes high and the sum-of-the-products operation is carried out by ANP4, as shown by time. The fixed voltage output from the maximum value node circuit 187 is then input to ANP4 and added to the result accumulated up to this point through the sum-of-the-products operation.

The above operation is applied in parallel to ANP5 in the output layer, thus realizing simultaneous processing.

When CS03 output from master control block 181 rises, the result of the sum-of-the-products operation calculated by ANP4 is output to analog bus B3 connected to the output layer. The control signal according to which max value node circuit 187 provides the output to analog bus B2 is DCS2 and this corresponds to time ⑦. The operation up to DCS2 shown in the timing chart of FIGS. 9A and 9B is for outputting the calculation result from the hidden layer. The same operation will be applied to the signal designated below DCS2 in the timing chart. This signal defines the operation of the output layer side connected in cascade to the intermediate layer. Upon a rise of CS03, the result of the sum-of-the-products operation calculated by ANP4 is output. ANP4 and ANP5 in the output layer produce the output. For example, the rise in CS02 at time ④ enters ANP1 and this rise is delayed from DCLK. This is because, where the multiplication of the analog input signal and the digital weight data is performed, the digital data read by WCLK is serial. This serial data is converted to parallel data and thus the rise in CS02 is delayed by the time required to convert the serial data to parallel data and the time taken for the analog input signal to arrive at the D/A converter, namely, the multiplying process unit. That is, the rise in CS02 is delayed from the rise in the DCLK by the time required to read the serial data. When some data, for example, 16 cycles of WCLK pass after the rise of the DCLK, data set is completed. When 8 cycles of WCLK pass after the rise in CS02, the analog multiplication starts.

Figure 10:
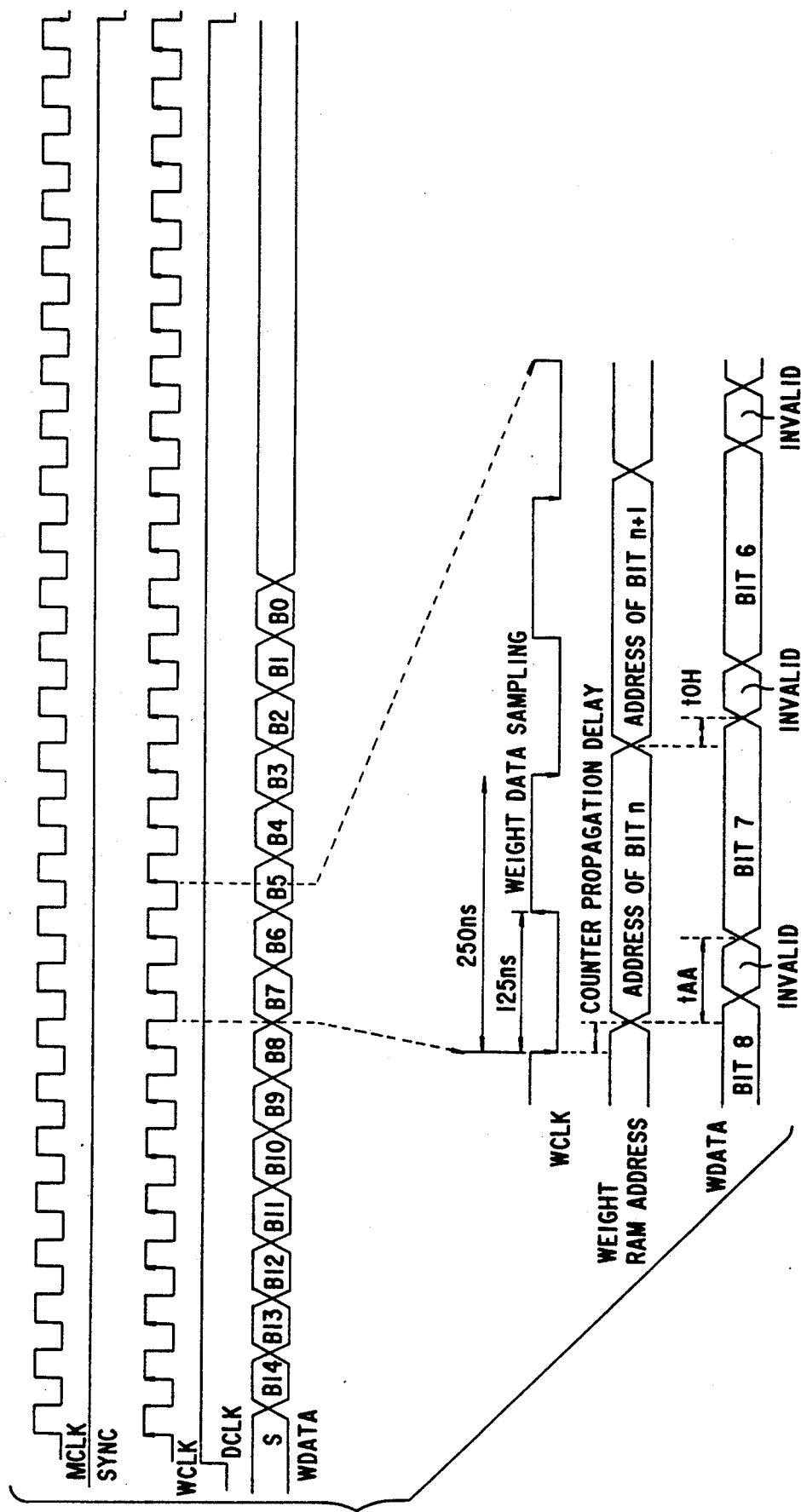
FIG. 10 shows a timing chart of the process upon reading the digital weight data.

FIG. 10 shows a timing chart designating a reading of the digital weight data. It shows the master clock MCLK, synchronizing signal SYNC, weight clock WCLK, data clock DCLK and actual weight data WDATA. The weight data WDATA is read out from the weight memory in a bit serial manner and 16 bit data is input serially. S indicates a sign bit and B14 to B0 show numerical value bits. In FIG. 10, the portions B7, B6 and B5 of the weight data WDATA are shown in the lower part of FIG. 10 to indicate their relation with the weight clock WCLK. The period of weight clock WCLK is 250 nsec and the duty ratio is 50%. After the propagation delay of a counter for updating the address provided in the sequencer passes from the fall of WCLK the address is provided to the weight memory. The address of bit n of the weight memory (RAM) stores bit 7 of weight data WDATA. When period tAA has passed after the determination of this address, bit 7 is read out. The change from bit 7 to bit 6 is determined by the change in the clock to the next period and bit 6 is read from the weight memory at the next period. 16 bits of weight data are input to ANP and the product of the 16-bit weight data and the analog voltage input to ANP are calculated by the internal D/A converter. The input of the analog voltage starts after the rise of the data clock DCLK. Therefore, it takes time for the analog input voltage to reach the D/A converter. It is necessary to control this time and the time required for setting the digital weight data and to input the analog voltage so that the arrival time of the analog voltage complies with that of the weight data.

For example, the analog input voltage complies with that of the weight data,

For example, the analog input voltage rises at bit 7 of the weight data and at bit 0 of the weight data. Thereafter, all the weight data are determined. The multiplication of the weight data and the analog value starts and the addition can be conducted during the period and DCLK becomes low at the next timing.

Operational timing of ANP is defined by SYNC signal, WCL, and data DCLK. There is an error in time when the analog input voltage is transmitted from an input terminal of the ANP to the D/A converter and CSI rises after DCLK rises, taking into account the possible difference in rising time between CSI and DCLK.

Figure 11A:
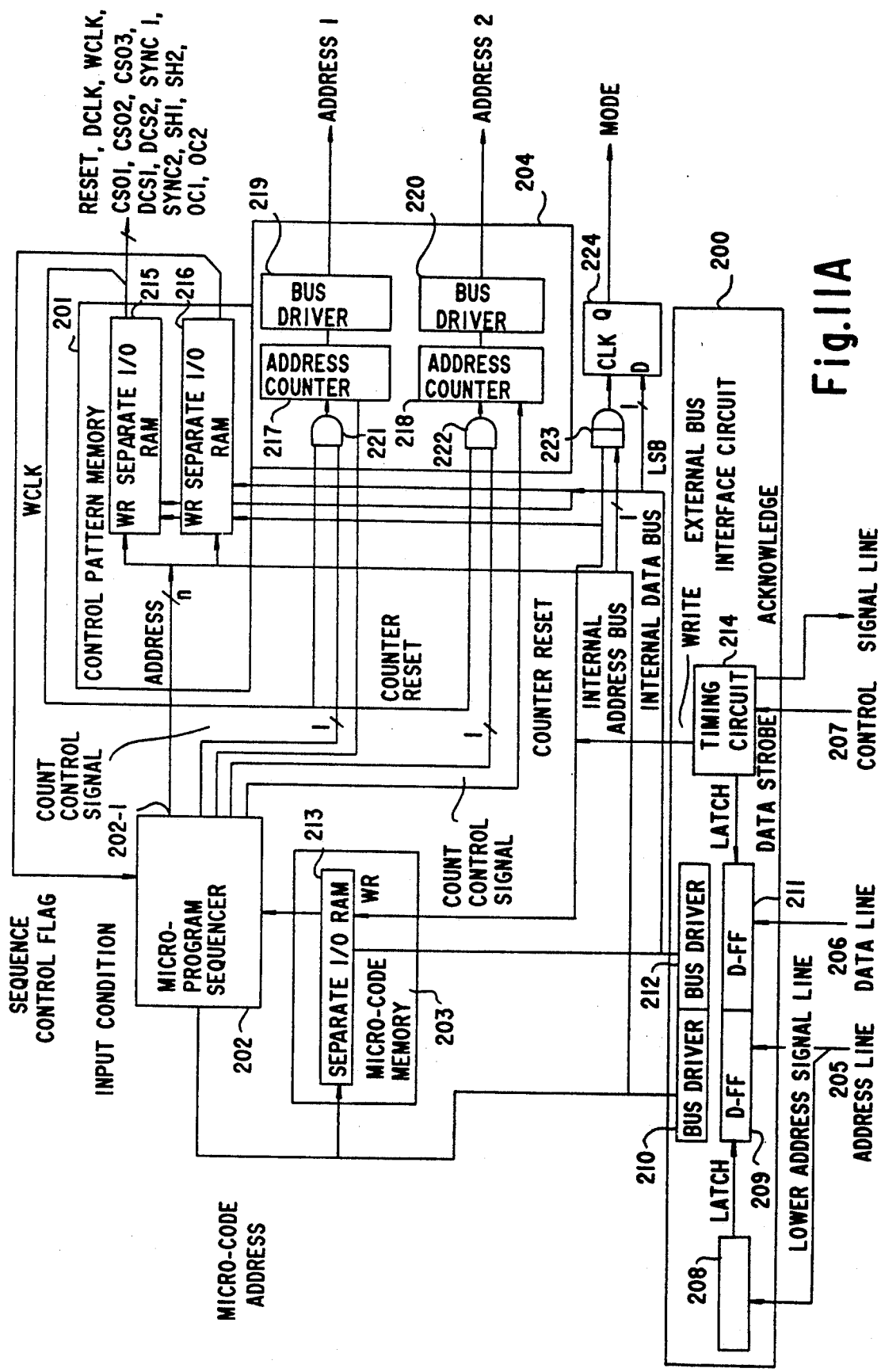
FIG. 11A shows a detailed circuit diagram of a master control block used in the embodiment shown in FIG. 8 of the present invention.

FIG. 11A shows the structure of master control block 181, which controls all the control signals. The main structure element comprises external bus interface circuit 200, control pattern memory 201, micro-program sequencer 202, micro-code memory 203 and address forming unit 204. External bus interface circuit 200 is connected to address line 205, data line 206 and control signal line 207 through an interface connected to the MPU. Upper address comparing circuit 208 and D-FF 209 of the register in external bus interface circuit 200 decodes the upper address given by the MPU. When the upper address is the same as the predetermined one, the lower address and data are set in D-FFs 209 and 211 by using a latch signal from timing circuit 214 as a trigger. The address and data are input through respective bus drivers 210 and 212, and through the internal address bus and the internal data bus. The address is used to refer to micro-code memory 203 and to write micro-code into micro-code memory 203 from the MPU side through the data bus. The lower address is applied to micro-program sequencer 202 through bus driver 210 and the MPU can refer to control pattern memory 201 by using a predetermined address.

The data from the MPU main memory is latched by D-FF 211 to data line 206 and is applied to separate I/O RAM 213 in micro-code memory or separate I/O RAMs 215 and 216 in control pattern memory 201 through bus driver 212. The data strobe signal from the MPU or the memory is added to timing circuit 214 through control signal line 207 and the acknowledge signal is returned, thereby controlling the transmission and receiving the address and data. Timing circuit 214 controls a latch timing to D-FF 211 and D-FF 209 and controls the writing timing to micro code memory 203 and control pattern memory 201 through the WR signal.

One period of each of the "1" and "0" patterns of a control signal given to the neuron chip, as shown in the timing charts of FIGS. 9A and 9B, are stored in control pattern memory 201 and read out from control pattern memory 201 in accordance with the control of microprogram sequencer 202, thereby producing one period of the patterns. For example, reset signal RESET, data clock DCLK, weight clock WCLK, CS01, CS02, CS03, SYNC1, SYNC2, SH1, SH2, OC1, OC2 are read from the first separate I/O RAM 215 and the control information accompanied by the pattern, namely, the sequence control flag, is read from second separate I/O RAM 216. Where the pattern "1000110001" is stored in control pattern memory 201, the address of control pattern memory 201 is controlled to repeat the bit comprising "1 and 0" and the repeated pattern is read out from control pattern memory 201. As the control signal patterns are extremely complex, they are prestored in separate I/O RAM 215 and the bit pattern is sequentially output by designating the address of separate I/O RAM 215 under control of micro-program sequencer 202. Thus, a plurality of the same patterns is repeated, as determined by the address control. One pattern period is called an original pattern. In order to repeat the original pattern, specific information is fed back to microprogram sequencer 2 from control memory 201. The sequencer control flag within the second separate I/O RAM 216 is input to micro-program sequencer 202, which causes the address so that the addressing is returned to the head address in which the original pattern is stored in the first I/O RAM 215. Thus, the original pattern is repeated. Micro-program sequencer 202 transmits an address signal to separate I/O RAM 215 through general purpose port output line 202-1 until the required condition is satisfied. Normally, the address is incremented but the address signal is returned to the head address in which the original pattern is stored. As a result, a predetermined control pattern is repeatedly output from separate I/O RAM 215.

Figure 11B:
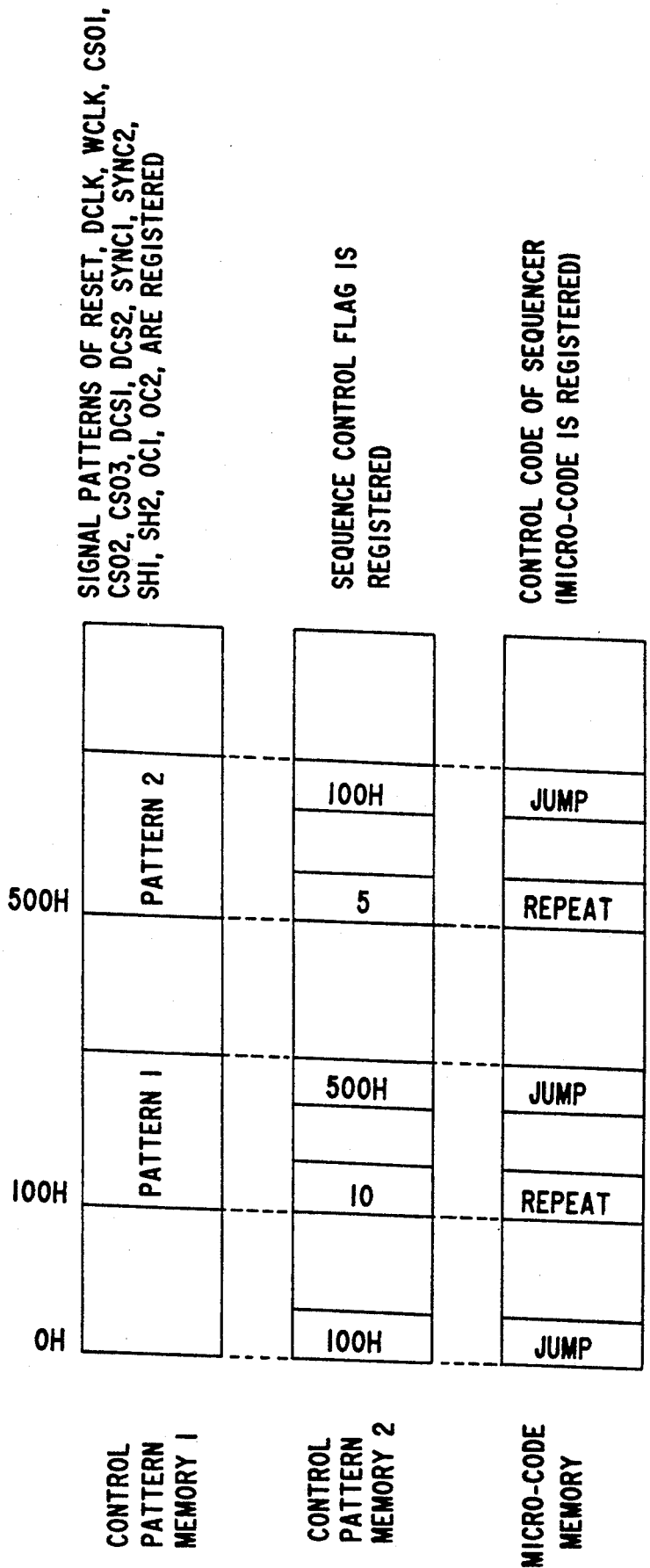
FIG. 11B shows a structure of a control pattern memory and micro-code memory.

FIG. 11B shows the relationship between the information of memories 201 and 203 for controlling master control block 181. In FIG. 11B, control pattern memory 1 corresponds to the first separate I/O RAM 215 and control pattern memory 2 corresponds to the second separate I/O RAM 216. The control code of sequencer 202 is stored in micro-code memory 203, which stores mainly jump commands and repeat commands. Repeat commands are stored in a predetermined address and the number of the control pattern repetition in the control pattern memory is stored in the corresponding address of control pattern memory 2 in accordance with the repetition command. When this number reaches "10", ten repetitions are carried out. In this way, the address increases until it reaches a jump command in micro-code memory 203 and the address jumps to 500H by the second jump in micro-code memory 203, thereby producing pattern 2. These addresses jump to "100H" again, the third jump within the micro-code memory 203, thereby outputting pattern PAT1. Thus, the original pattern is repeated and read out from control pattern memory 1.

WCLK is formed in synchronization with the reading clock of the address referred to by control pattern memory 201 and information is read out from weight memories 185 and 186 in sychronization with WCLK. The addresses of weight memories 185 and 186 are accessed by the address signal output from addresses 1 and 2 of address forming unit 204. Addresses 1 and 2 are separated, address 1 being for the hidden layer and address 2 being for the output layer. The weight data applied to the ANP in the hidden layer is read out from weight memory 185 designated by address 1. The weight data applied to the ANP in the output layer is read out from weight memory 186 designated by address 2. The content of weight memories 185 and 186 are stored bit by bit in the increasing direction of the address and it is necessary to apply a count control signal to address counters 217 and 218 from micro-program sequencer 202. Incrementing addresses are applied sequentially to weight memories 185 and 186 through bus drivers 219 and 220 from address counters 217 and 218. A plurality of weight data is read out from weight memories 185 and 186. WCLK from the first separate I/O RAM 215 and a counter control signal from micro-program sequence 202 are applied to AND circuits 221 and 222 in address forming unit 204. When the counter control signal is high, the address counter is updated by WCLK. Address counters 217 and 218 are incremented from 1 to 16 bits of WCLK. The remaining 17 to 26 bits of WCLK are inhibited by turning the counter control signal low and stopping incrementing address counter 217 and 218. A counter reset signal is transmitted to AND circuits 221 and 222 from micro-program sequencer 202 in synchronization with SYNC1 and SYNC2 and reset address counters 217 and 218. The address is returned to the head address of weight memories 185 and 186. The mode signal outputted from master control block 181 comprises a mode designating an ordinary use of the weight memory, namely, separating the weight memory from the MPU data bus to apply the weight data to the ANP and a mode in which the weight memory is connected to MPU data bus and is referred to by the MPU.

The LSB of the data from the MPU to flip-flop 224 is used by a trigger signal and an AND signal is output from AND circuit 223 when a bit of the lower address and write signal WR from timing circuit 214 are applied to AND circuit 223. When the mode signal is 0, the weight memory is for an ordinary use.

Write signal WR and a bit of the internal address bus are input to a clock terminal flip-flop 224 through AND circuit 223 and the LSB of the internal data bus is input to the data terminal of flip-flop 224. The upper address signal is input to comparing circuit 208 and it is determined whether master control block 181 is selected. If it is, the lower address and data are applied to DFFs 209 and 211. This interface operation is applied to the other devices connected to the MPU and the weight memory supplies the weight data to the ANP during a normal period, and if the weight memory is directly connected to the data bus of the MPU, bus competition is caused. To prevent this, the mode is determined as 1 when LSB of the data bus is supplied to the flip-flop, thereby preventing the weight memory from being chip-selected and producing the data on the data bus from weight memory. The internal address bus designates the addresses of either micro-code memory 203 or control pattern memory 201 by using the internal address bus. The desired data is written into the accessed address to the internal data bus. Thus, the program stored in micro-program sequencer 202 is selected, and the programs stored in micro-code memory 203 and separate I/O RAM 216 are changed and the control pattern stored in separate I/O RAM 215 is changed.

Figure 12A:
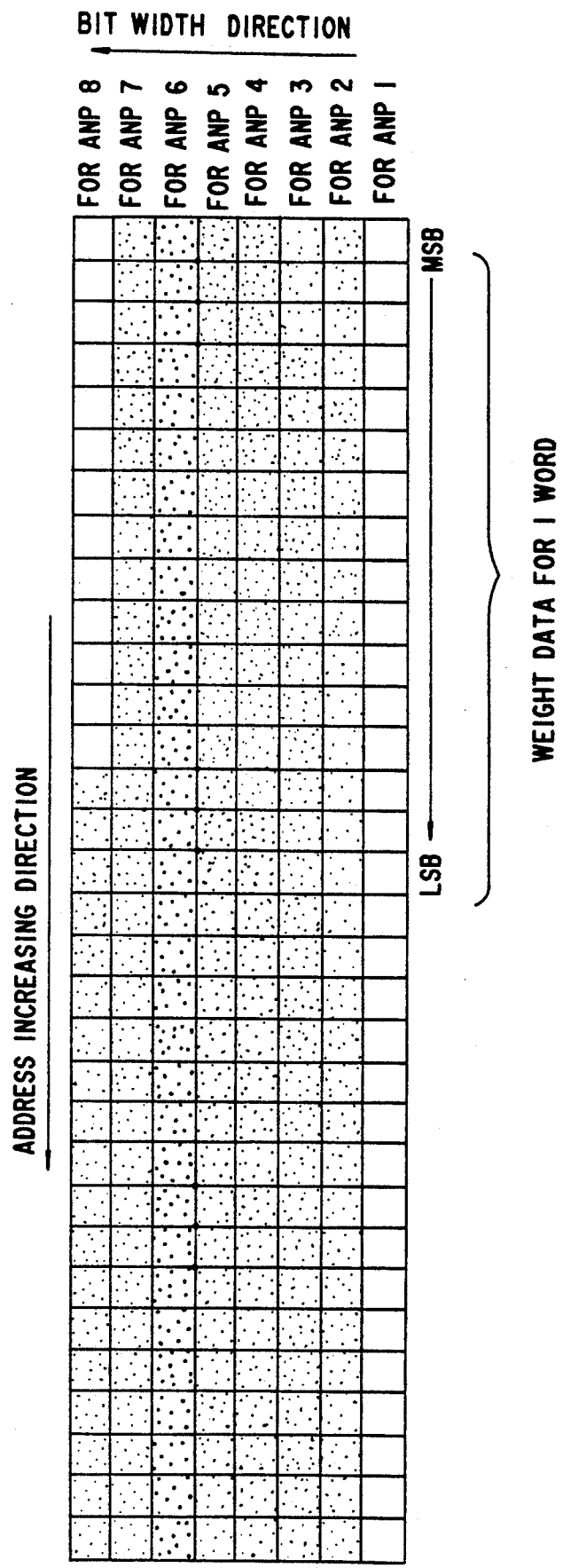
FIG. 12A shows a manner of storing the data into the weight data memory.

FIG. 12A shows the data storage structure of weight data memory 230. The 8 bits in a column direction are the 8-bit data stored in the same address and thus, bits 1, 2 . . . 8 are for ANP1, ANP2 . . . and ANP8, respectively. In the row direction, the addresses are different and increase from right to left. The weight data comprises 16 bits including the sign bit and these bits are stored in addresses from the small address value to a large address value. MSD is the sign bit and the other 15 bits are numerical value bits. When the address provided by micro-program sequencer 202 increments in synchronization with WCK, one word of the weight data, namely 16 bits, is read out from MSB to LSB, and is thereby applied simultaneously to 8 ANPs. As the data is stored in an increasing direction of the address, the address count is conducted for the weight data. Namely, one word of weight data from MSB to LSB are counted then one item of weight data is provided under the control of the weight data memory. Control is also conducted by micro-program sequencer 202.

Figure 12B:
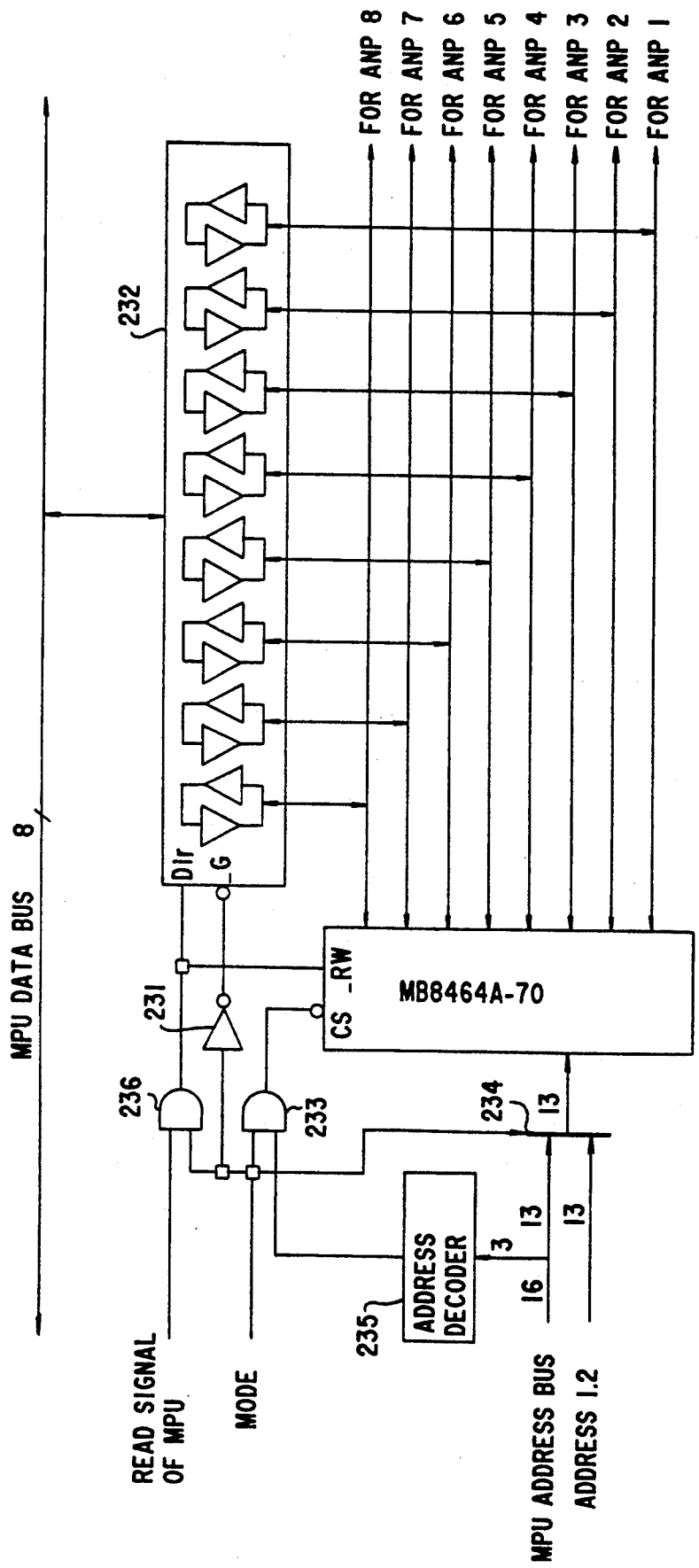
FIG. 12B shows the detailed circuit structure of the weight data memory.

FIG. 12B shows a circuit of weight memory blocks 185 and 186. Memory 230 comprises a RAM named MB8464A-70. The output comprises 8 bits corresponding to ANP1 to ANP8. Basically, either the bus signal line viewed from the MPU bus or addresses 1 and 2 viewed from master control block 181 are used. Addresses 1 and 2 are the same as addresses 1 and 2 in FIG. 11A. They are input, incrementing in synchronization with WCLK. 8-bit data is simultaneously read out and respective bits are simultaneously applied to ANP1 to ANP8.

When the mode signal is 0, weight memory 230 is chip selected through AND gate 233. Addresses 1 and 2 from micro-program sequencer 202 become effective at the multiplexer 234. The weight data from weight memory 230 are transmitted to ANPs 1 to 8. On the other hand, the output of the reverse circuit 231 is high, thus enabling tri-state bus transceiver 232 and preventing the weight memory 230 from being output to the MPU. If the data is outputted to the MPU, the mode signal is turned to 1 and memory 230 is chip selected through address decoder 235 according to appropriate address information from the MPU and memory 230 receives an address signal from the MPU. When the mode signal is 1, memory 230 is chip selected through address decoder 235 by appropriate address information from the MPU. When the mode signal "1" is read by the MPU bus or written in RAM memory 230 of the bus, the direction of the read and write is determined by that read signal on the data line transmitted from the MPU through AND gate 236.

The learning algorithm will now be explained.

Figure 13A:
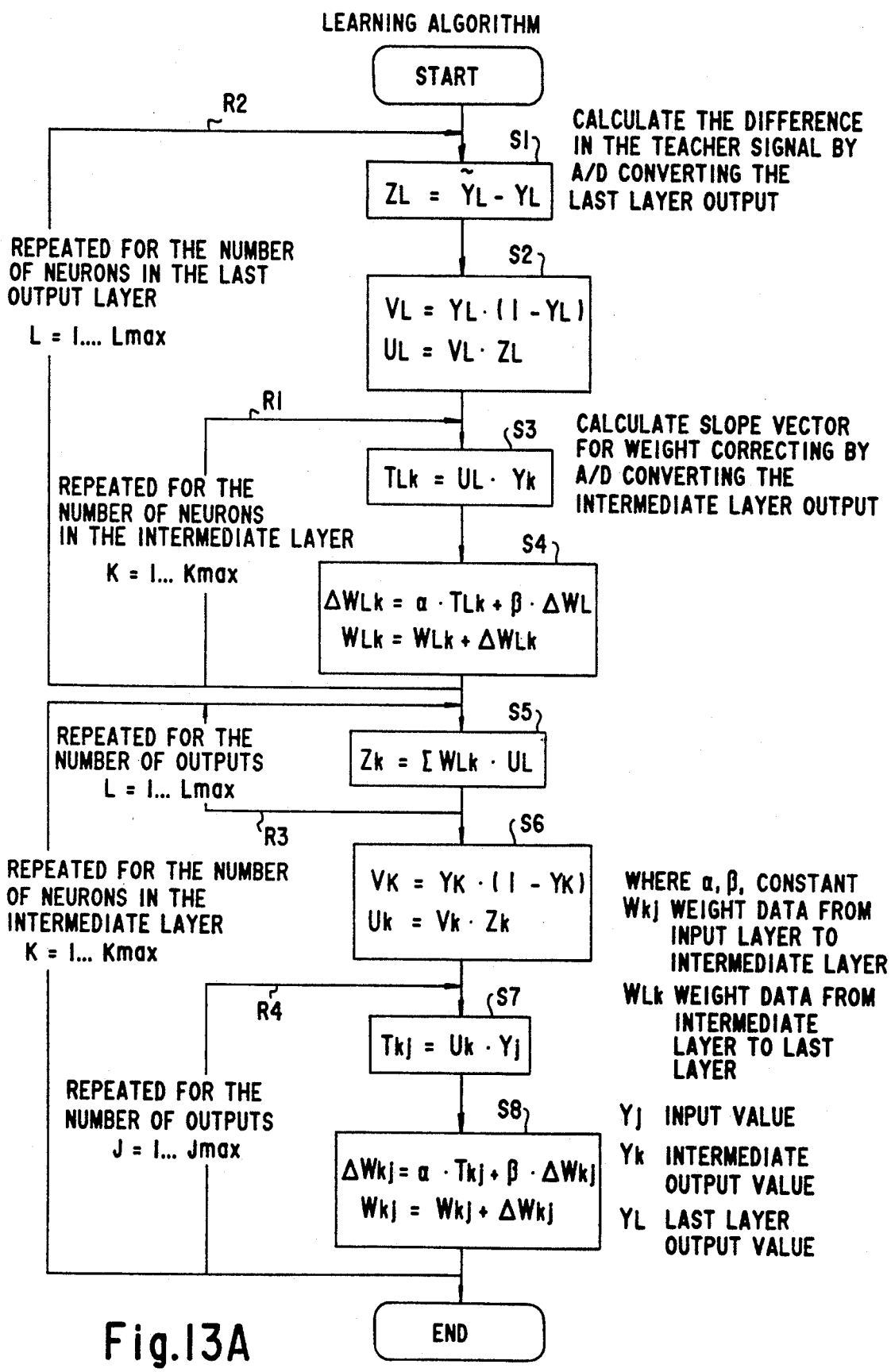
FIGS. 13A and 13B show flowcharts designating a learning algorithm according to the present invention.
Figure 13B:
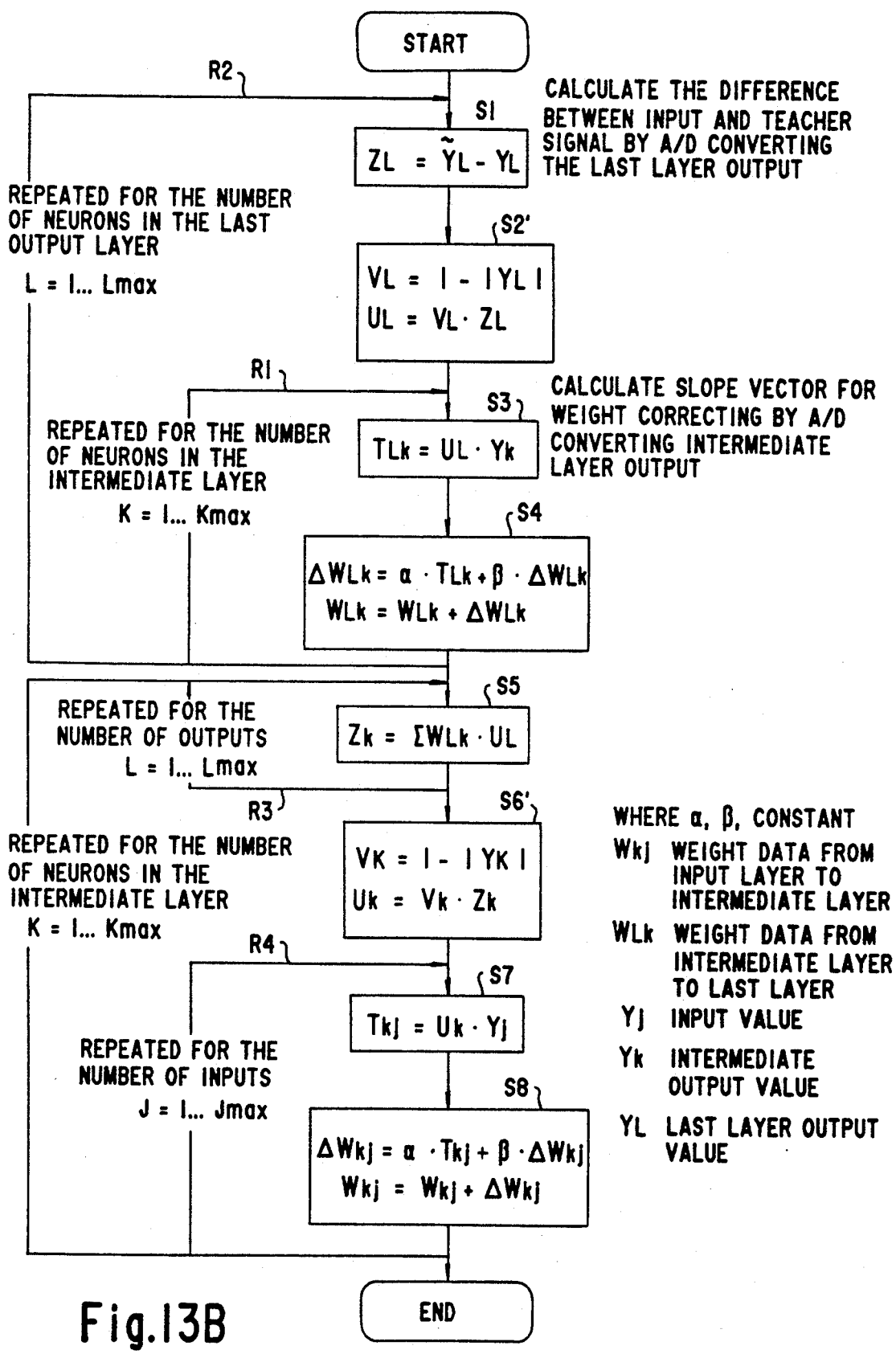

FIG. 13A shows a flowchart of a learning algorithm using a back propagation utilized in the present invention. The learning is conducted as follows. All the information to be learnt is input to a neural network, namely, a layered type network constituted of ANPs, through an input control circuit, not shown, from the MPU. The input signal is provided at the network output through the input side circuit, the hidden layer and the output layer. It is further applied to the MPU through an A/D converter. The learning algorithm exists in the main storage on the side of the MPU. The teacher signal is obtained from main storage and transmitted to the MPU and the error between the output of the network and the teacher signal is examined. If the error is large, the MPU changes the weight data representing the strength of the network's connection to a direction such that the right output is produced by the network. The weight data is applied to ANPs in respective layers through weight memory 230.

When the weight data is updated in accordance with the learning algorithm, the learning process is carried out in accordance with the learning algorithm of the back propagation shown in FIG. 13A. When the learning algorithm starts, the MPU obtains the error between the teacher signal YL and the current output YL at the L-th neuron ANPL in the output layer and inserts it into ZL. The output YL is the output of the neuron ANPL if the sigmoid function is used as a non-linear element. The output YL is provided as the output value of a non-linear function. Therefore, in the neuron ANPL, error ZL must be propagated into the input side of the non-linear function. When this error propagation is conducted, the energy function, namely, the second power of the error signal multiplied by $\frac{1}{2}$, provides the following energy equation. $\epsilon_L = \frac{1}{2}(Y_L - \bar{Y}_1)^2$ The partial differentiation of the non-linear type function input $X_L$ is as follows.

$$\delta = -\frac{\partial E_L}{\partial X_L}$$

The above equation can be changed to the following equation.

$$\delta = -\frac{\partial E_L}{\partial X_L} = -\frac{\partial E_L}{\partial Y_L} \cdot \frac{\partial Y_L}{\partial X_L}$$
$$= (\bar{Y}_L - Y_L) \cdot f(X_L)$$

If non-linear function $f(X_L)$ is a sigmoid function, it is expressed as follows.

$$f(X_L) = \frac{1}{1 + e^{-X_L}}$$

The differentiation $f'(X_L)$ of the sigmoid function yields the following equation.

$$f'(X_L) = Y_L(1 - Y_L)$$

This is equal to VL shown in S2 in the flowchart. Accordingly, $\delta$, namely, the partial differentiation of non-linear function input XL, is VL x XL. This provides UL shown in step S2. The error 6 for the non-linear function input of the energy is back-propagated to the hidden layer.

The k-th neuron in the hidden layer is designated as AK.

The output of AK is YK. Linear function input XL of neuron ANPL in the output layer is expressed by the sum of the products obtained by multiplying the output (Y1 ... YKMX) of the neuron in the hidden layer by the respective weight WLK. Accordingly, the partial differentiation of XL with regard to WLK is output.

$$\frac{\partial X_L}{\partial W_{LK}} = \frac{\partial}{\partial W_{LK}} \cdot \sum_K W_{LK} Y_K = Y_K$$

On the other hand, the change in the weight WLK for energy EL is provided by the following equation.

$$-\frac{\partial E_L}{\partial W_{LK}} = -\frac{\partial E_L}{\partial X_L} \cdot \frac{\partial X_L}{\partial W_{LK}} = U_L \cdot Y_K$$

Namely, TLK at step S3 expresses the following item.

$$-\frac{\partial E_L}{\partial W_{LK}}$$

This is the partial differentiation of the energy with regard to the weight. Accordingly, $T_{LK}$ may be determined as the variation $\Delta W$ of the weight and in order to speed up the conversion, the following recurrence formula is used. This corrects the weight by adding the second term of the first equation shown in step S4.

$$\Delta W_{LK} = \alpha T_{LK} + \beta \cdot \Delta W_{LK}$$
$$W_{LK} = W_{LK} + \Delta W_{LK}$$

, where $\alpha$ and $\beta$ are constants. A special neuron ANP in the output layer is noted and all the neurons in the hidden layer are supposed to be corrected. Thus, it is necessary to repeat k from 1 to kmax with regard to respective ANPLs. This is conducted by a repetition shown by R1 in the flowchart and it is necessary to repeat k, the number of repetitions being equal to the number of the neurons kmax in the hidden layer. When this repetition is ended, the back propagation for the special neuron ANPL is completed. Accordingly, the above operation should be applied to all the neurons (ANP1, ANP2...ANPLmax) in the output layer. Thus, as shown by R2 in the flowchart, L is repeated from 1 to Lmax. Therefore, the process is repeated, the number of repetitions being equal to the number Lmax of the neurons in the output layer.

Next, the learning is conducted from the hidden layer to the input layer. The algorithm is almost the same as that described above, but the error signal cannot be expressed by the difference between the teacher signal and the output voltage and can be shown at step S5. Namely, ZK is the k-th neuron in the hidden layer and corresponds to the output error signal AK. This is clarified by the following equation.

$$-\sum_L \frac{\partial E_L}{\partial X_L} \cdot \frac{\partial X_L}{\partial Y_K} = -\sum_L \frac{\partial E_L}{\partial X_L} \cdot \frac{\partial}{\partial Y_K} \sum_K W_{LK} Y_K$$
$$= -\sum_L \frac{\partial E_L}{\partial X_L} \cdot W_{LK}$$
$$= \sum_L W_{LK} \cdot U_L$$

Accordingly, the process is repeated from 1 to Lmax to obtain the index error of $Z_k$ at step S5 and is therefore repeated through a route R3, the number of repetitions being equal to the number of outputs. Thus, the error signal $Z_K$ is in the hidden layer. Thereafter, the algorithm is the same as that between the hidden layer and the output layer. First, the differentiation value VK of the sigmoid function is output and UK, namely, a change for the non-linear function input of the energy, is obtained at step S6. At step S7, the product $T_{KJ}$ of the UK and the output YJ of the input layer is obtained. As the main portion of the change in weight, the second term is added to speed up the conversions, as shown in step S8. ΔWKLJ is obtained and added to the of WKJ, thereby providing a new WKJ. This is a process for updating the weight. This process is repeated, the number of repetitions being equal to the input number Jmax (R4), namely, the process is repeated from J equals 1 to J equals Jmax and the weight between the input layer and hidden layer is updated. Zk of step S5 corresponds to the error signal of the output from the hidden layer and this ZK can be expressed in a manner such that the partial differentiation UL of the energy of the output layer for the function input value is expressed and WLK is finally determined in the hidden layer and in the output layer. Namely, the calculation for the updating of the weight starts from neuron ANPL at the output layer and moves to neuron ANPK in the hidden layer. The weight change Δ W cannot be calculated at neuron ANPK in the hidden layer if Δ W in the previous stage cannot be obtained. This is called the back propagation method as the learning becomes possible only when the process goes back to the input layer.

In the back propagation method, the learning data is input as complete information. It includes a forward operation for outputting the result of the learning and a backward movement for strengthening all the connections to minimize the error.

This forward operation is also necessary. The analog neural network unit of the present invention can be effectively utilized in the forward operation. The back propagation of the output value is carried out by the MPU. If the non-linear function is different from the sigmoid function, the differential value of the non-linear function is different from that of sigmoid function. For example, for the function tanH(X), the learning algorithm is as shown in FIG. 12D and the differential result of the non-linear function can be expressed as VL=1-YL in the output layer S2' and VK=1-YK (S6') in the hidden layer.

As the process is designated by the same reference numbers as in FIG. 12C, the explanation is omitted.

Figure 14A:
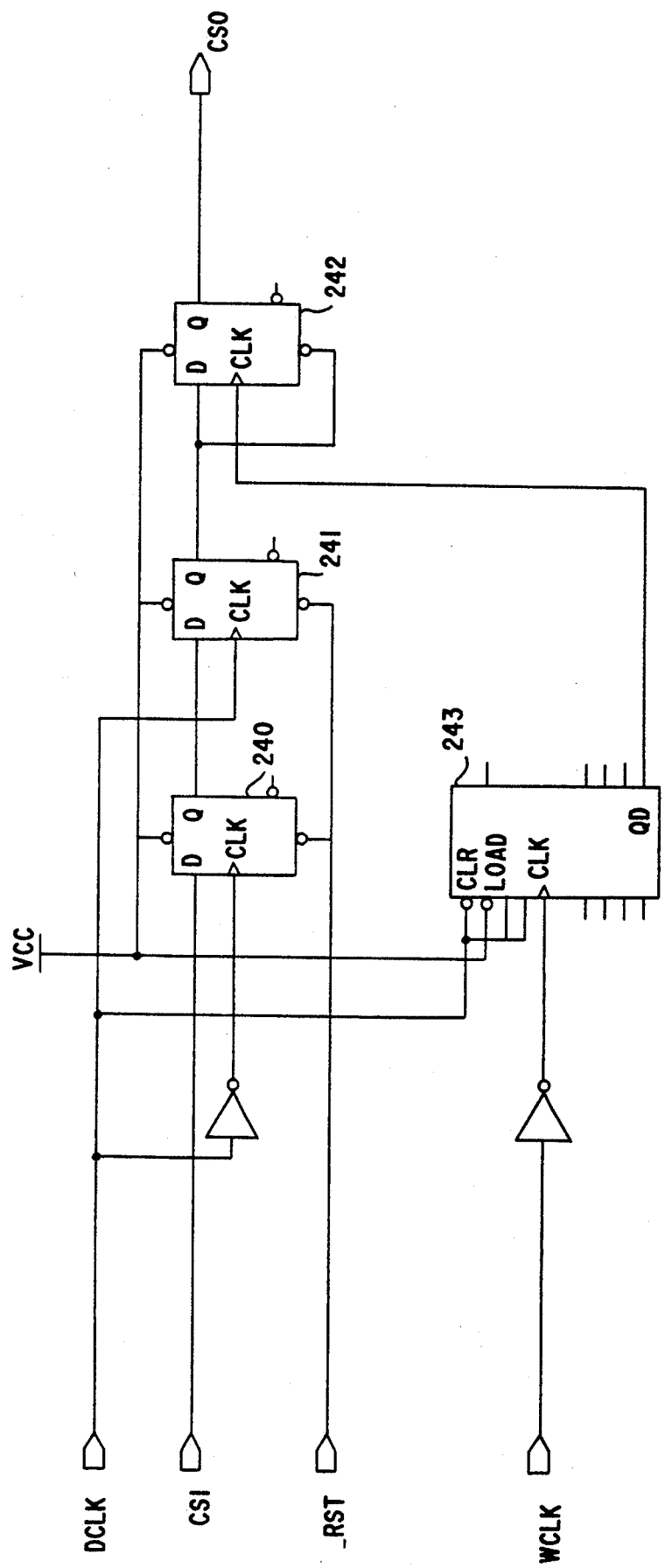
FIG. 14A shows a block diagram of the daisy circuit used in an embodiment of the present invention.

FIG. 14A shows the structure of the input side daisy circuits 173 and 174. 240, 241 and 242 are D-type flip-flops. The data input to the D terminal is selected by the write of the DCLK signal and the output Q is turned to the state "1". The first flip-flop 240 sets the CSI signal at the fall of DCLK and in the next light of DCLK, the output signal is set in the second flipflop 241. The output of the second flip-flop is applied to the D terminal of the third flip-flop 242. The clock signal for setting the input is output from 4 bit counter 243. Counter 243 is triggered at the fall of WCLK and cleared at the fall of DCLK. Therefore, at the fall of DCLK, counter 243 becomes all 0. The fall of WCLK is input 8 times and thereafter the QD signal of the upper bit becomes high, thereby enabling a high signal to be output as a CSO from flip-flop 242. The output of flip-flop 241 becomes 0, thereby clearing CSO. In accordance with such operation, the daisy operation is conducted, in which CSO is output at a predetermined time corresponding to 8 pulses of WCLK after CSI falls.

Figure 14B:
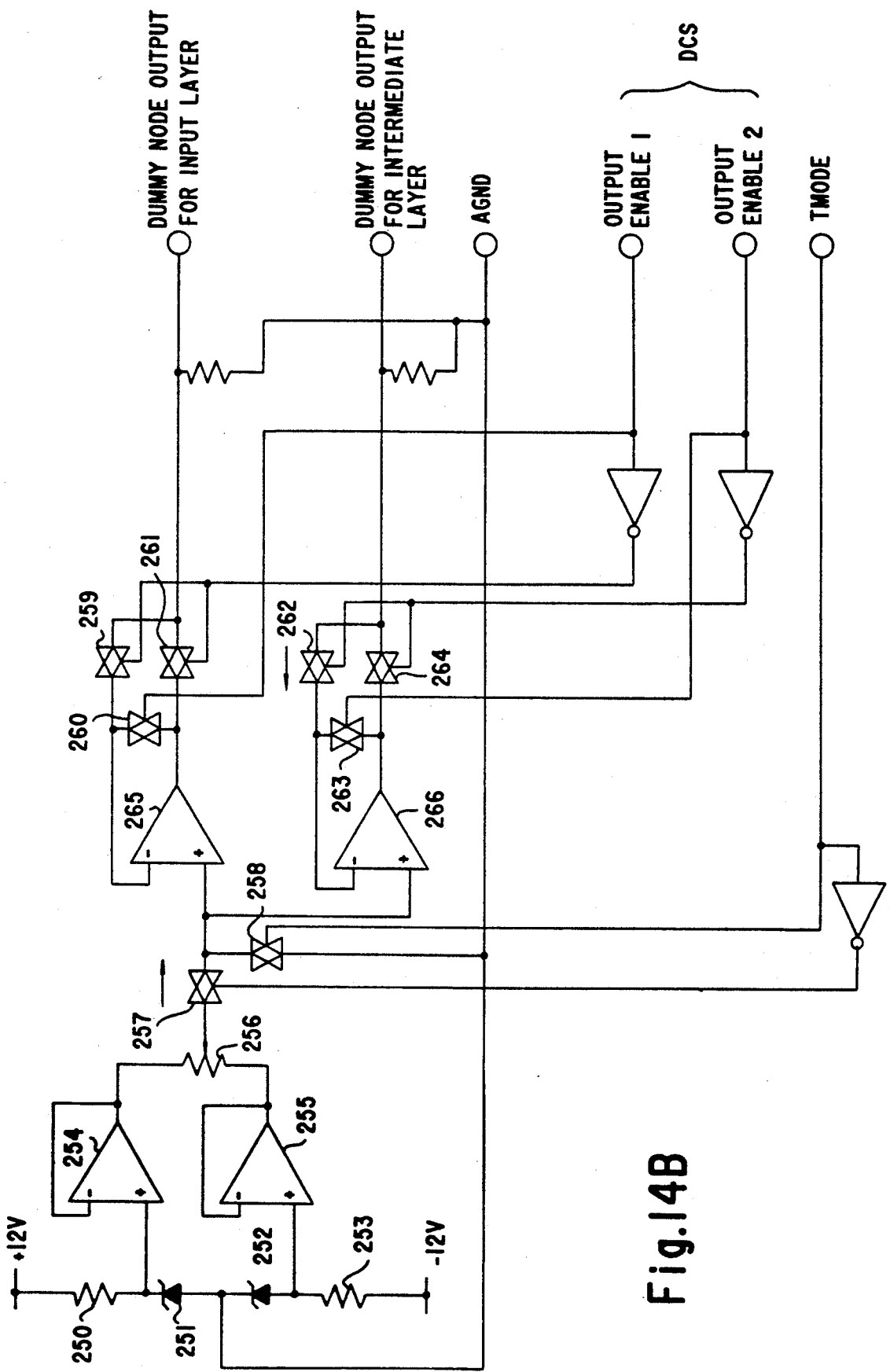
FIG. 14B shows a block diagram of a max. value node circuit used in the present invention.

FIG. 14B shows max. value node circuit 187 forming a neuron of the dummy node. Register diodes 251 and 252, resistor 253, and voltage followers 254 and 255, form a circuit for providing a constant voltage. When a current flows between 12 volts and −12 volts through resistors 250 and 253 and Zener diodes 251 and 252, then +7 volts and −7 volts are respectively formed at the input of voltage followers 254 and 255. This voltage is output to output resistor 256, forming voltage followers 254 and 255. The operation is controlled by using analog switches 257 through 264 such that two constant voltages are output in a time divisional manner. When the T-mode signal is 0, a constant voltage is supplied to the next voltage follower 265 through analog switch 257 when the T-mode is "1". Namely, in T mode, the output of analog switch 257 is suppressed so that the analog ground and "0" volts is input to voltage follower 265. In the test mode, the offset on the bus is notified to the MPU. Voltage follower 265 is enabled by the switch control at the output portion. When the output enable is turned to "1", analog switch 260 is turned on and operated as the voltage follower and produces the output. However, at this time the dummy node does not produce an output. Conversely, when the output enable is 0, an output is produced at the dummy node. Analog switch 260 and the switch control of the output are controlled by output enables 1 or 2 and is "0" enable. When output enable 1 or 2 is 0, a constant voltage is output at a dummy node. The upper dummy node output is for the input layer and the lower dummy node output is for the intermediate layer. The output voltages of these dummy nodes are fixed to the appropriate value and can be used as threshold voltages. Zener diodes 251 and 252 produce constant voltages during the reversed prior state. These constant voltages can be changed from +7 volts to −7 volts. The enable states of output enables 1 and 2 are determined by dummy node control signal DCS from master control block 181 to avoid a collision between the output voltages from this and other ANPs connected to the analog bus.

Figure 15:
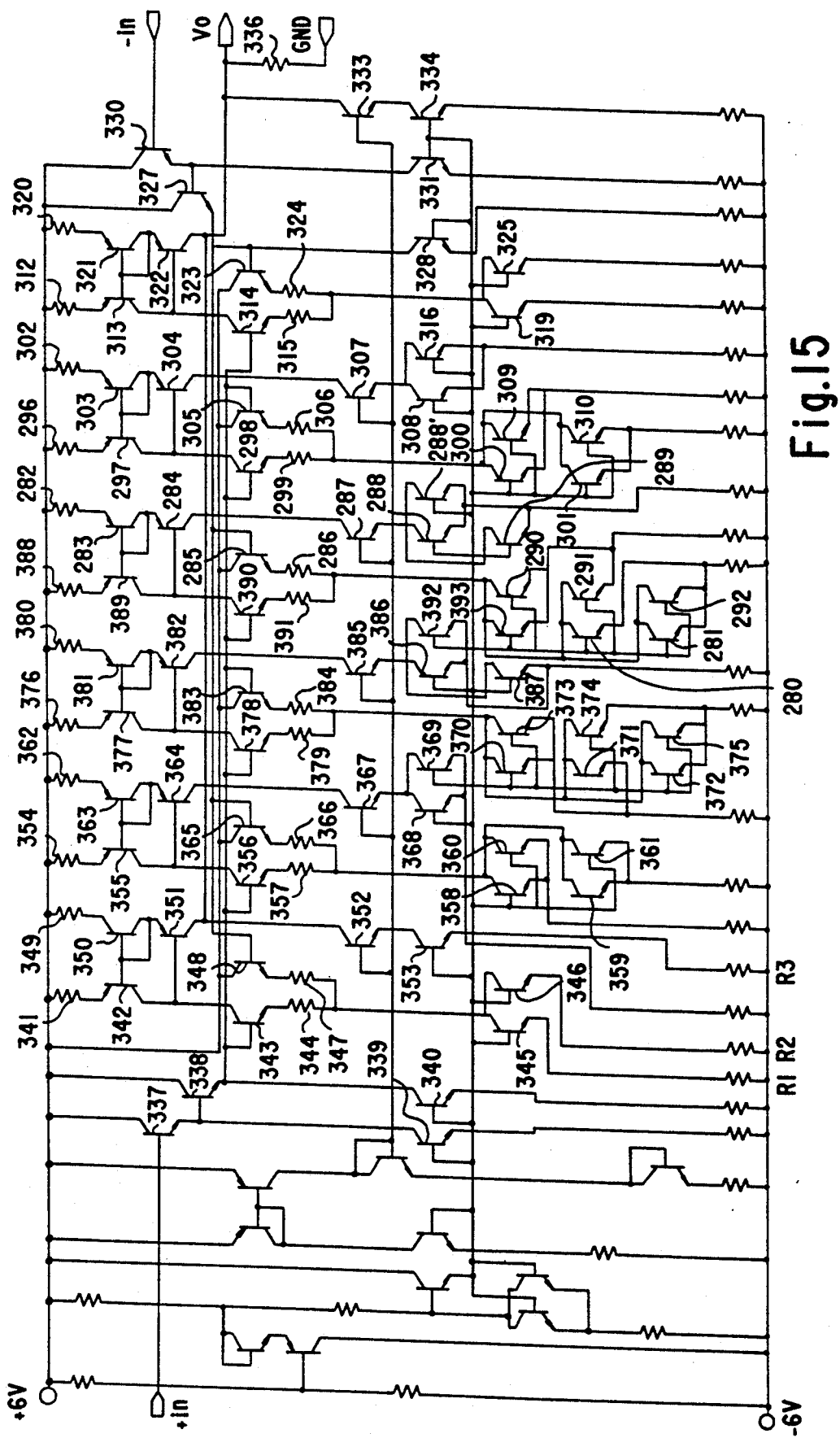
FIG. 15 shows a detailed circuit diagram of the sigmoid function realizing circuit used in the basic unit of the ANP of the present invention.
Figure 16:
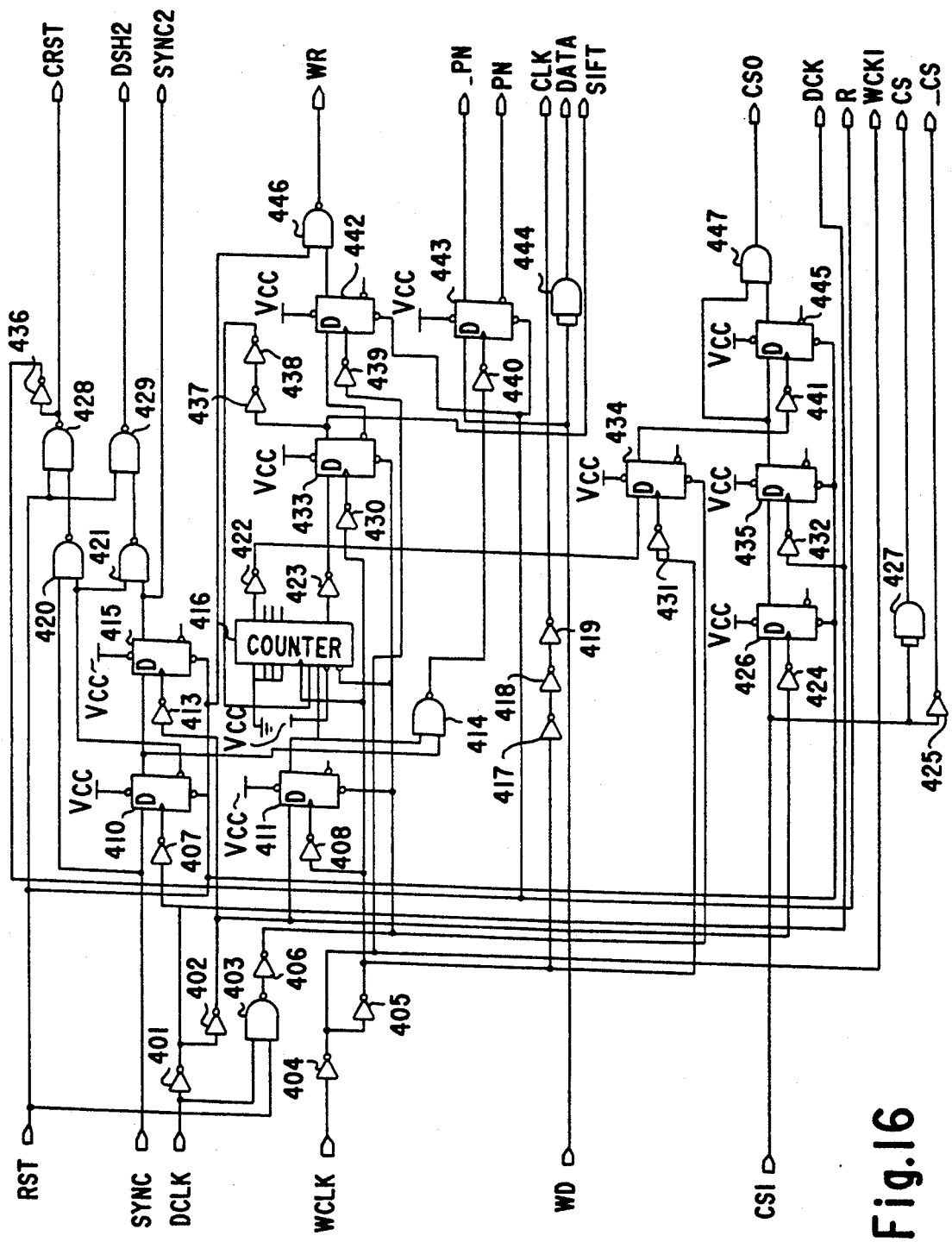
FIG. 16 is a detailed circuit diagram of the sequence generator used in the present invention.
Figure 17:
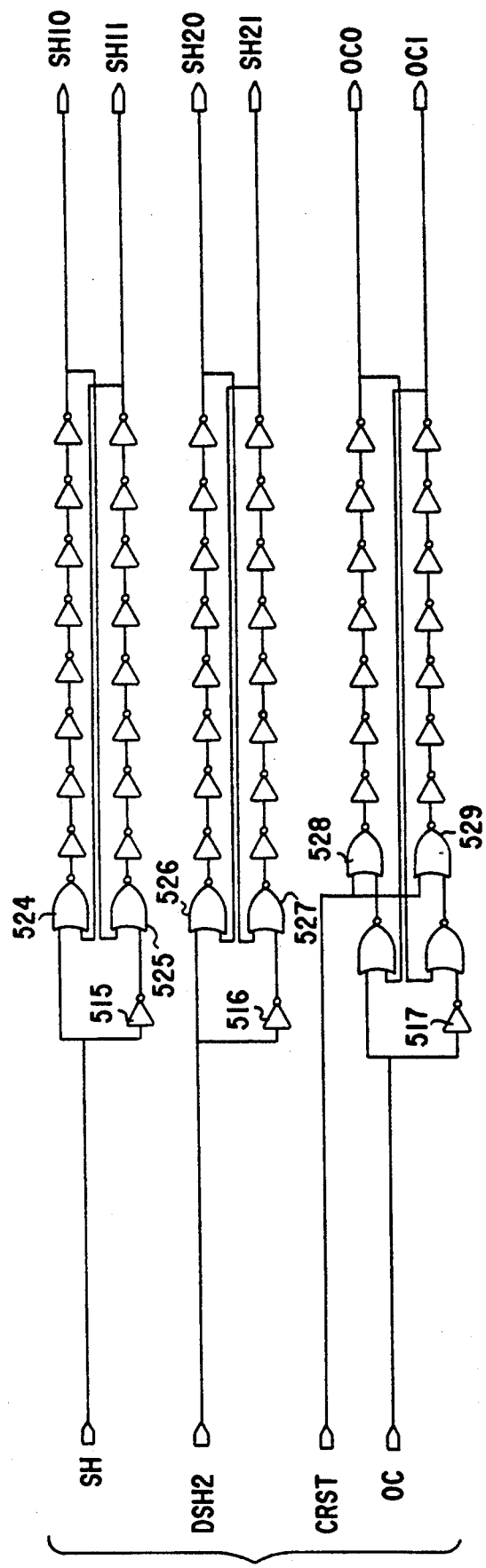
FIG. 17 shows a detailed circuit diagram of the phase control circuit used in the present invention.
Figure 18:
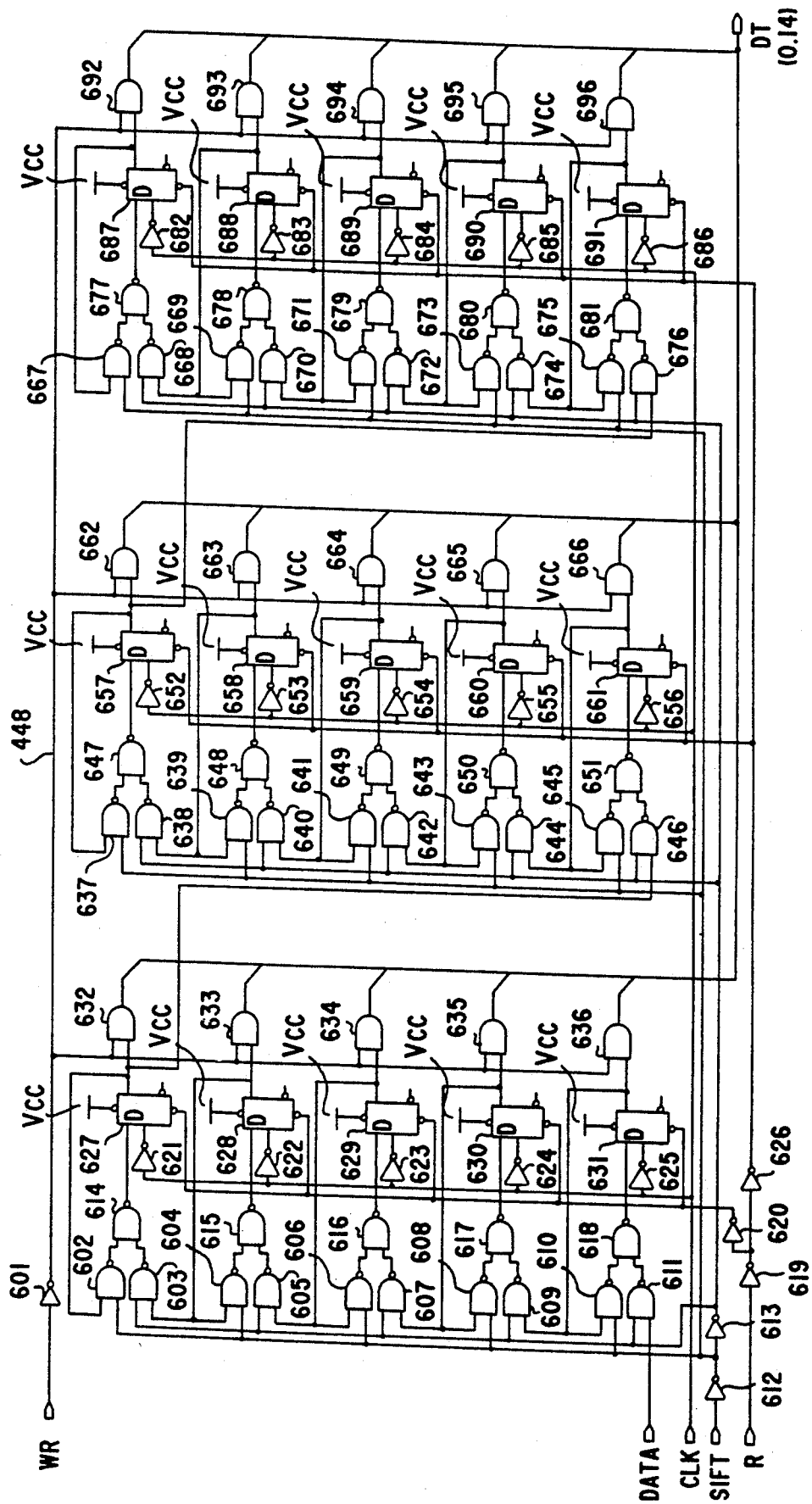
FIG. 18 shows, a detailed circuit diagram of the shift register used in the present invention.

FIG. 15 shows a non-linear function generating circuit and FIGS. 16, 17 and 18 show hardwares on the digital logic side of the ANP.

FIG. 15 shows a transistor circuit for realizing a sigmoid function. The sigmoid function represents a monotonously decreasing function but does not exclude a linear function. Transistors 343, 356, 378, 390, 298 and 314 and transistors paired with them form differential amplifiers and the transistors connected to the collector side of the differential amplifiers constitute current mirror circuits. The collector current flowing through the collector of the transistor on the left side of the differential amplifier is the output current. The current mirror circuit changes the direction of the current and outputs it. The current enters resistor 336 connected to the output V0, which changes the voltage into current. As the driving capability is lacking, an operational amplifier with a high impedence is provided at the output. The circuit provided on the input side of transisters 337 and 339 constitute a bias-circuit. A division linear method is used to realize a sigmoid function. Slope of respective divisions of the sigmoid function are determined by the ratio of emitter resistor 344 connected to the emitter of the differential amplifier to output resistor 336. In this instance, the emitter resistors of transisters 343 are also included. The gains of respective differential amplifiers are different. The break point relating to a variation in respective division lines utilizes such saturation characteristics of the transistor. The saturation characteristics of all the transistors are different. The saturation characteristics of respective amplifiers are changed so that the value of the sum of the currents output from respective operational amplifiers forms a sigmoid function at the output point V0. Transistor 345 and resistor R1 constitute a current source. Transistor 346, resistor R2, transistor 353 and resistor R3 are the current source for supplying the same currents. Namely, the resistor is determined so that the current value of the current source becomes the same. The collectors of transistors 345 and 346 are connected to each other and the sum of their currents flows through the crossing point of resistors 344 and 347. The collector currents of transistor 343 and 348 become the same when the current is balanced. Transistor 351 is provided to improve the characteristic of the current mirror. Transistor 350 is diode connected. The change in the current means that drawing the current from the output is changed to delivering the current to the output and vice versa. As shown in FIG. 15, the current flows from the collector of transistor 351 of the current mirror circuit to the output. The transistors whose emitters and collectors are connected to the same point formed a single transistor. For example, transistors 358 and 360 form a single transistor which is the same as transistor 345. Transistors 359 and 361 from a single transistor and corresponds to transistor 346. Transistors 348 and 369 form a single transistor and correspond to transistor 353. The same relationship is applied to the other transistor shown in the lower part of the circuit. Therefore, there are provided 6 circuits in which an operational amplifier with a constant current source and driven by the same current, changes the direction of the current in accordance with the polarities of the output voltages. Transistors 337 and 338 form a level shift and transistors 330 and 327 also form a level shift circuit. The level shift circuit makes the scope of the operation the same between the positive and negative area of the sigmoid function. Transistor 352 is for a correction such that the collector current of transistor 351 becomes the same as the collector current of transistor 353. The operations of the transistors 367, 385, 287 and 307 are the same.

FIG. 16 shows a detailed circuit of a sequence generator 28 (FIG. 3C) for forming a pulse signal applied to the neuron chip. Inverters 401, 402, 404 and 405 form a clock signal. The clock signals are separately formed for a rise of a latch signal of flip-flop FF and a fall of a latch signal of flip-flop FF. The flip-flop in FIG. 16 performs a latching at a rise of a clock and the inverter and flip-flop FF. Thus, the inverter and flip-flop form a flip-flop circuit for a latching. For example, when DCLK passes one inverter 401, it forms a clock signal for performing a latching of the data at the fall of DCLK. When DCLK also passes inverter 402, it forms a clock signal for performing a latching at a rise of DCLK. Similarly, the output of inverter 404 forms a fall of WCLK and inverter 405 forms a rise of WCLK. Flip-flop 410 latches the SYNC signal at the fall of DCLK. Flip-flops 410 and 415 delay SYNC signal by one cycle of DCLK to form SYNC2. Therefore, SYNC signal and the signal delayed by one clock from SYNC signal form a pulse of one $\tau$. After a rise of SYNC signal, the pulse of 1 $\tau$ (one period of DCLK) enables the integration capacitor in the differential amplifier to perform a discharge. Namely, CRST is a reset signal for the capacitor. Signal DSS2 is formed by obtaining a pulse of 1$\tau$ of the DCLK period from the fall of the SYNC signal and is for forming a sample hold signal of the capacitor within the AND circuit.

In flip-flop 411, WCLK is the clock and DCLK is data. Thus, flip-flop 411 performs a latch of the DCLK signal at WCLK. Thereafter, the SYNC signal becomes high at NAND gate 414 and WCLK, coming immediately after DCLK becomes high, is used as a trigger signal to form a clock of flip-flop 443. Flip-flop 443 receives a sign bit of the digital weight data WD at the first WCLK after the SYNC signal becomes high. The sign bit is MMB of serial digital weight data. Flip-flop 443 latches the sine bit at a timing of flip-flops 411, 414 and 440. Binary counter 426 counts the number of WCLK. As the 16-bit digital weight data is received, the digital weight data is counted 16 times upon a completion of a counting operation. Thus, the output becomes high and is entered into inverter 423. The input to inverter 423 designates that the count of the 16 bits is completed. Thus, this signal controls that the weight data input serially to the ANP is transmitted into shift register 27 (FIG. 3C). The LSB bit of counter 416 is input to inverter 422. The output of inverter 422 forms a CSO signal. CSO is a control signal of the daisy chain circuit. It comprises a delay circuit for carring out a daisy operation such that the next CS is produced after the CS of the previous timing falls to prevent a competition of signals outputted from two ANPs in the previous stage. The delay time for the delay circuit is formed by counting WCLK and the value of the counter. When counter 416 completes the count, the designation signal for notifying a completion of the count to flip-flop 433 is latched to inverter 423 at 7 WCLK. The latch signal is returned to counter 416 and to inverters 437 and 438, thereby preventing counter 416 from executing an incrementing operation. When the output of inverter 438 becomes low the output Q of flip-flop 433 is input to flip-flop 442, thereby forming a gate signal for the output of shift register 408. Shift register 408 sequentially shifts 16 digital weight data and when the numerals of 15 bits (excepting the sign bit) are arranged in parallel, they are output. The gate signal WR prevents an output during the period of shifting and produces one upon receiving all the 15 bits. The content of the shift register 408 is applied to a multiplier in the ANP. The signal output from flip-flop 433 is divided to be used for the enable signal and for the shift register.

A daisy chain circuit is shown in the lower part of FIG. 16. The output of counter 416 is delayed by flip-flop 434 and flip-flop 445 triggers the delayed signal. Therefore, DCLK is shifted by 1$\tau$ with the head portion of the DCLK pulse cut, namely, the CSI signal itself sometimes does not have the same period as that of DCLK. Then, in order to form CSO from CSI, the beginning part, for example, the waveform corresponding to two micro seconds, is cut. The waveform is then delayed by that amount and thereafter the DCLK signal is formed. Gates 425 and 427 form a buffer gate of the CSI and respectively operate as positive and inverter buffers.

FIG. 17 shows the phase control circuit 29 shown in FIG. 3C for forming a sample/hold S/H signal and an OC signal. The S/H signal is divided to be input to inverter 515 and gate 524. The OC signal is similarly divided. When the S/H signal is input to gate 525 through inverter 515, 8 inverter stages are provided. One signal with the same phase as the S/H signal and another signal with the opposite phase are formed. Several stages of inverters are connected in cascade and the output of one cascade line is input to the other cascade line, thereby avoiding a situation in which the outputs from both the first and second lines of the cascade are simultaneously "1". That is, the sample/hold S/H signal forms two signals comprising S/H0 and S/H1 to avoid the situation in which both become "1". Thus, the inverter chain is a delay circuit for avoiding a concurrent ON state of both S/H signals. The delay time is determined by the length of the inverter chain and the output of one inverter chain turns on several stages after the other is turned on. The same process is applied to SHD0 and SHD1. The circuit relating to the OC signal operates in basically the same manner as recited above, and the CRST signal is input to gates 528 and 529 and in the case of CRST=1, both outputs from the two chains are compulsorily turned to "1". The situation in which both OC0 and OC1 are simultaneously turned to "1" is avoided, but only when CRST is "1", do both OC0 and OC1 turn to "1". Therefore, the reset function for charging a capacitor of an integrator through a control of the analog switch is realized.

FIG. 18 provides shift register 27 (FIG. 2) of 15 bits. Gates 602, 603 and 614 and flip-flop 627 correspond to one bit and are used for the following explanation. As the output from flip-flop 627 at the previous timing is input to gate 603, this is the input from the previous bit and becomes a data signal for shifting. The other signal input to gate 603 is SHFT, namely, an inverted signal of the shift signal. This is a shift control signal and if it is varied, a shift instruction is carried out. The output of flip-flop 627 is input to gate 602. Thus, the output of flip-flop 627 is fed back to the input of gate 602. The inverted SHFT signal is applied to the other input of gate 602 and this phase is different from that of the signal input to gate 603. Therefore, if the shift is invalid, the present output is maintained. The clock signal is entered independently from a shifting. The shifting operation is not carried out even if the clock is received. The previous bit is shifted and inputted through gate 603 only when a period of the shift signal SHFT is effective, thereby performing a shift operation. A WR signal is input to AND gates 632 and 633, and forms a selection signal to determine whether the outputs for respective bits are produced and forms a control signal to determine whether or not the data stored in the shift register is transmitted to the multiplier. Inverter 620 provides a reset signal to 5 out of 15 flip-flops and gate 626 provides a reset signal to 10 flip-flops. Shift register 608 has a function of a shift enable SHFT and output enable WR.

Next, the neuron computer of the present invention is explained by referring to a feed-back type network.

Figure 19A:
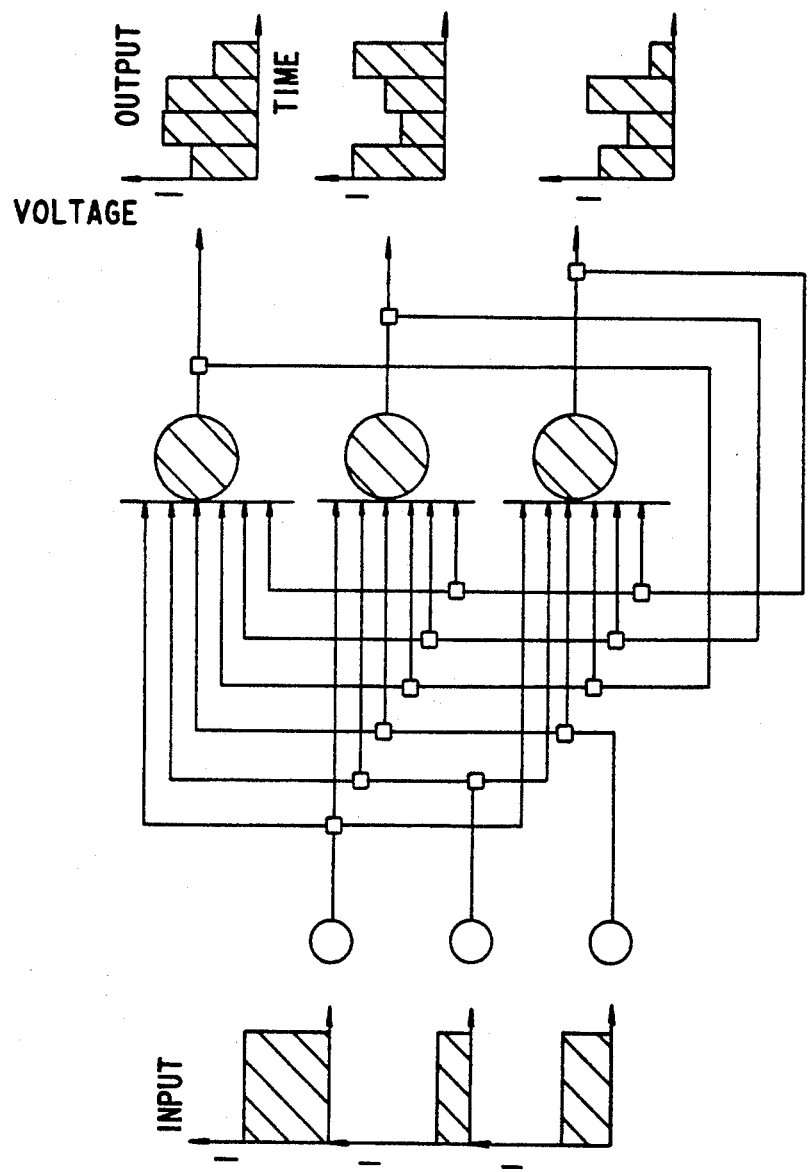
FIG. 19A is a conceptual view for explaining a feedback type network.

FIG. 19A is a conceptual view of a feedback type network. In this type of network input exists basically and the feedback path through which the signal is output from the self part is returned. The feedback type apparatus is used for the first case in which one layer in the layered type neural network is used in a time divisional multiplexed manner or for the second case in which a so-called Hopfield type neural network is used.

In the first case, the input and output signals of the ANP are provided in a time divisional manner and the output data of the same ANP are sequentially output at every constant sequence cycle at the output of respective ANPs and one of the sequence cycles operates sequentially as the input layer, the intermediate layer and the output layer. In the second case, the output voltage is fed back to the input until the output of the ANP reaches a predetermined value, that is, becomes stable. When the fed-back result is output, the cycle is repeated until the fed-back result complies with the previous data, namely, the data output by itself previously, and the state is converged if a stable solution is reached.

Figure 19B:
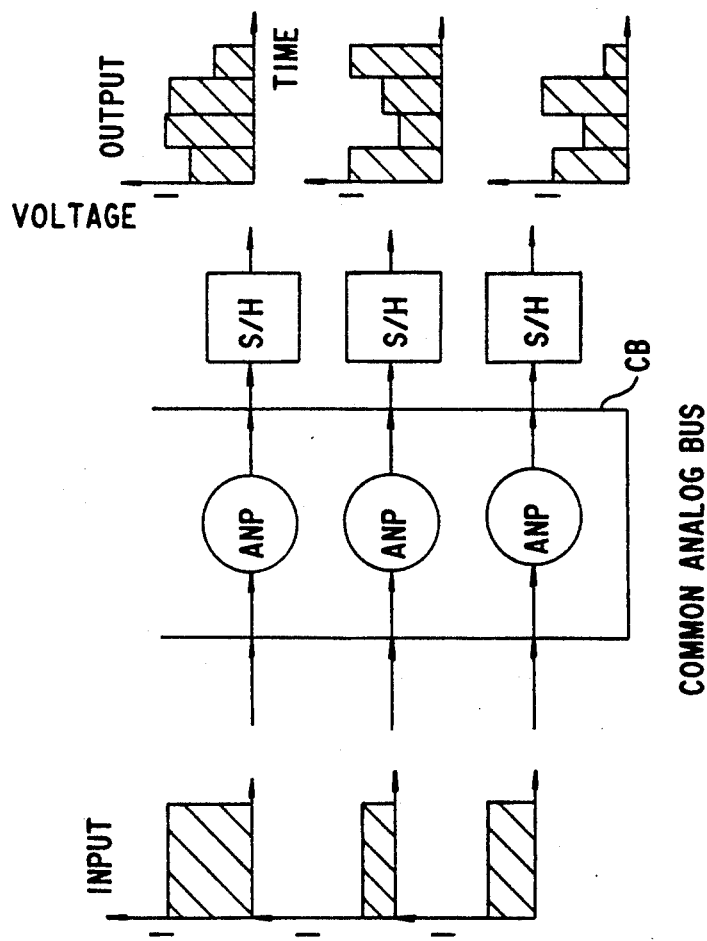
FIG. 19B shows an example in which a feedback type network can be realized by the neuron computer of the present invention.

According to the embodiment of the present invention, as shown in FIG. 19B, the feedback type is realized by the common analog bus CB, thereby forming a feedback path. The output obtained by the calculation of the self ANP is fed back to respective ANPs through the feedback path, and this feedback operation is repeated.

Figure 20:
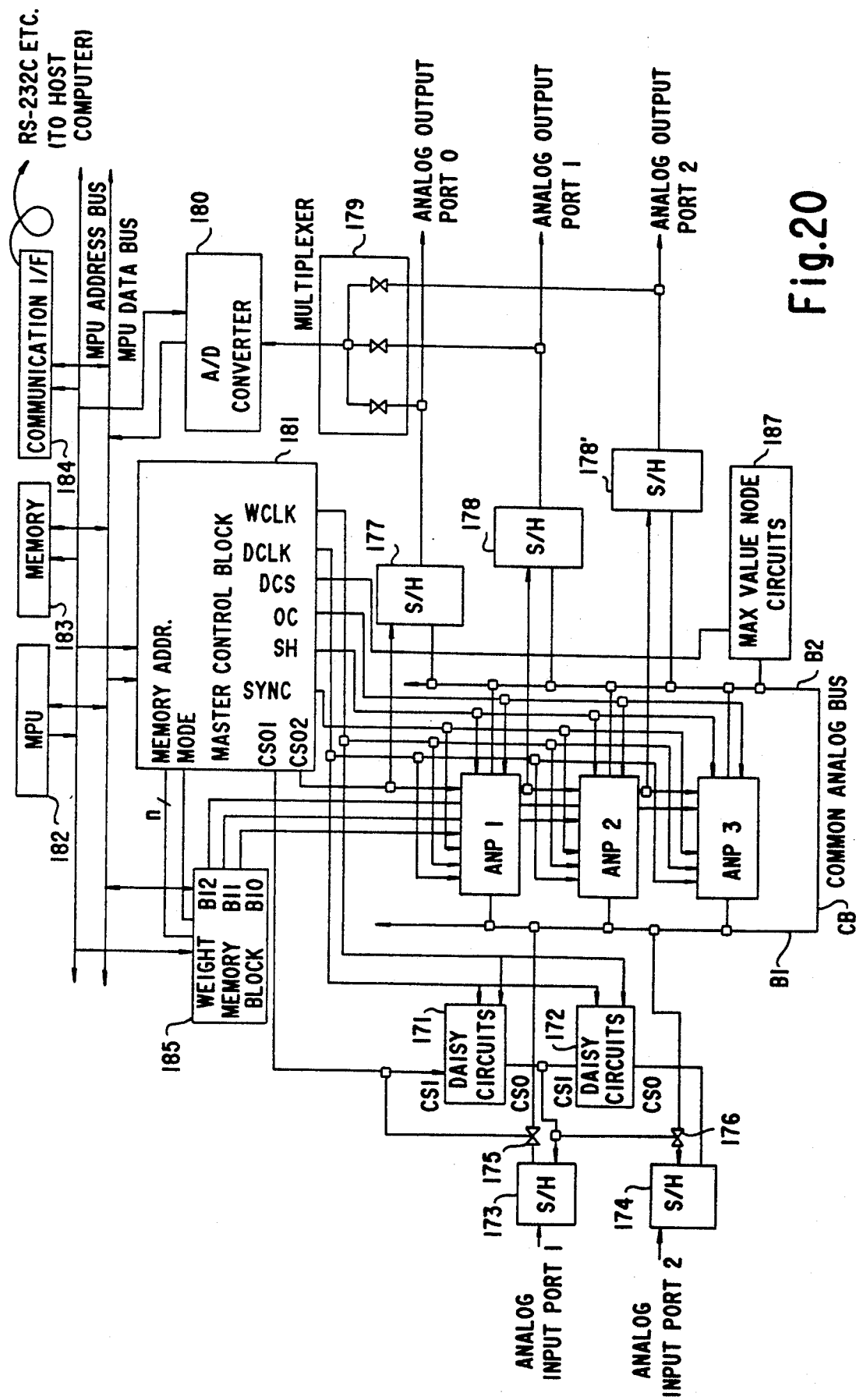
FIG. 20 shows a detailed block diagram of one embodiment for forming a first feedback type network in accordance with a neuron computer of the present invention.

FIG. 20 shows an embodiment of a neuron computer of the present invention which is realized by a feedback type network which operates as a layered type network. The sum-of-the-products operation is carried out for the time divisional analog input signal from analog input ports 1 and 2 in ANPs 1, 2 and 3 and ANPs 1 and 2, and operates as the intermediate layer. Output is produced in a time divisional manner from ANPs 1, 2 and 3 to analog bus B2. The output signal is fed back to analog bus B1 through analog common bus CB of a feedback part and again the sum-of-the-products operation is applied to the feedback signal at ANPs 1, 2 and 3. ANPs 1, 2 and 3 are made to operate as the output layer, thereby realizing a layered type network. Max. value node circuit 187 receives DCS output of the master control block and produces a dummy signal to analog bus B2. DCLK and WCLK are respectively input to daisy circuit 171 and the master control block to define the timing of the rise and fall of the CSI signal.

Figure 21A:
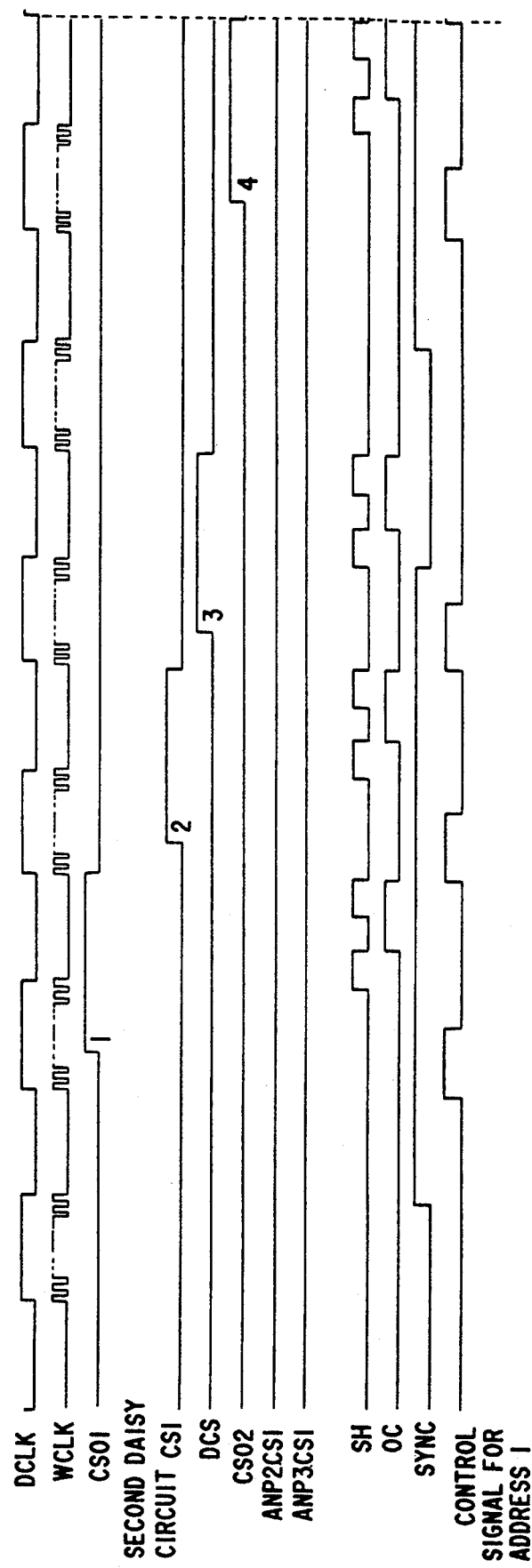
FIGS. 21A and 21B show a timing chart for signal processing in the embodiment shown in FIG. 20.
Figure 21B:
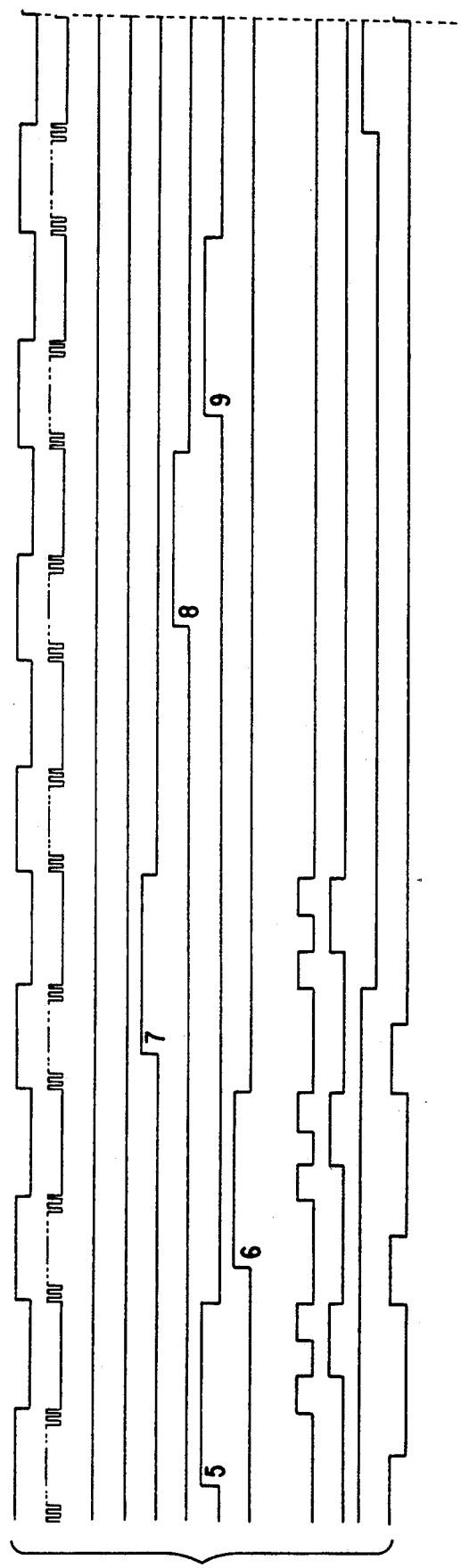

FIG. 21A shows a timing chart of the feedback type layered network. WCLK is produced only during the rise of DCLK. After the rise of DCLK, the analog signal is made constant and the weight data is input serially. CS01 from master control block 181 is input to daisy circuit 171 at a timing before they are arranged in parallel and, as shown by 1, the signal rises. At this time the analog signal held in the sample hold (S/H) circuit after the analog signal is input from analog input port 1, appears on the analog bus B1 through analog switch 175 and the sum-of-the-products operation is conducted at ANPs 1, 2 and 3. Upon the input of the next DCLK, the CSI to daisy circuit 171 rises as shown by time ②. The signal from the sample/hold S/H circuit for holding the input signal from the analog input port appears on the analog bus B1 through the analog switch and the second sum-of-the-products operation is conducted at ANPs 1, 2 and 3. Further, after DCLK is input in the next timing, the dummy signal DCS is produced from the master control block shown by time ③ and the third sum-of-the-products operation for the fixed voltage is carried out at ANPs 1, 2 and 3. While the next SYNC signal rises, the sum-of-the-products operation is carried out by ANPs 1, 2 and 3 for the output layer. Only during the high period of the address count inhibiting signal applied to the address 1 of the weight memory, WCLK for counting the address counter is enable and the count of the address counter is prohibited at times other than those recited above. Next, when CS02 is applied to ANP1 from the master control block, ANP1 produces the result of the previous sum-of-the-products to the analog bus B2 and the result is fed back to the analog bus B1 through analog common bus CB. Then, as shown in time ④, the sum-of-the-products operation is again carried out at ANPs 1, 2 and 3. After CS02 is delayed by a predetermined period in a daisy chain circuit in the ANP, the input signal CSI is applied to ANP2 as shown by time ⑤, and this time the output signal from the ANP is applied to ANP1 again through analog bus B2, common bus CB and analog buses A1 and B1, thereby performing the sum-of-the-products operation. Similarly, after CSO from ANP2 is delayed by the predetermined period, the delayed CSO becomes a CSI signal of ANP3. When the CSI signal rises as shown by time ⑥, the output signal of ANP3 is again fed back to ANPs 1, 2 and 3 through analog bus B2, common bus CB and analog bus B1, thereby performing the sum-of-the-products operation. Similarly, as shown by time ⑦, when the signal DCS from the dummy node rises, the sum-of-the-products operation is carried out for the fixed voltage in ANPs 1, 2 and 3. Upon the following rise of the CS02 signal, the output is produced from ANPs 1 and 2 through the S/H circuit as shown by times 8 and 9. Analog input port 2 does not produce the signal.

ANPs 1, 2 and 3 operate as the intermediate layer in and ①, ② and ③ and as the output layer in times ④, ⑤ and ⑥. Accordingly, only one layer of ANPs 1, 2 and 3 form a layered type network.

Figure 22:
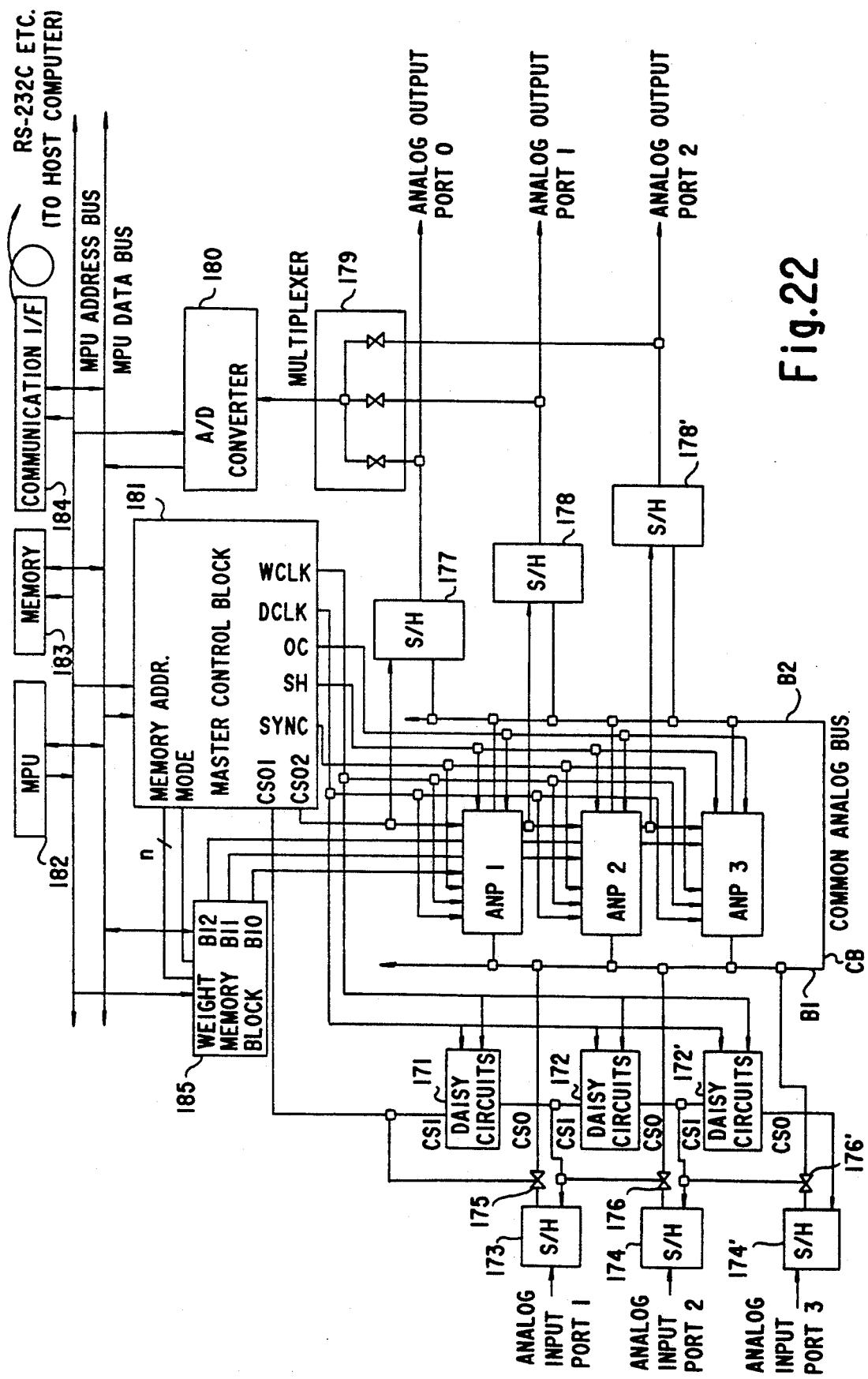
FIG. 22 shows a detailed block diagram of the second feedback type network formed by the neuron computer according to the present invention.

FIG. 22 shows an embodiment in which an analog neuron computer is formed by a Hopfield type feedback network.

Figure 23A:
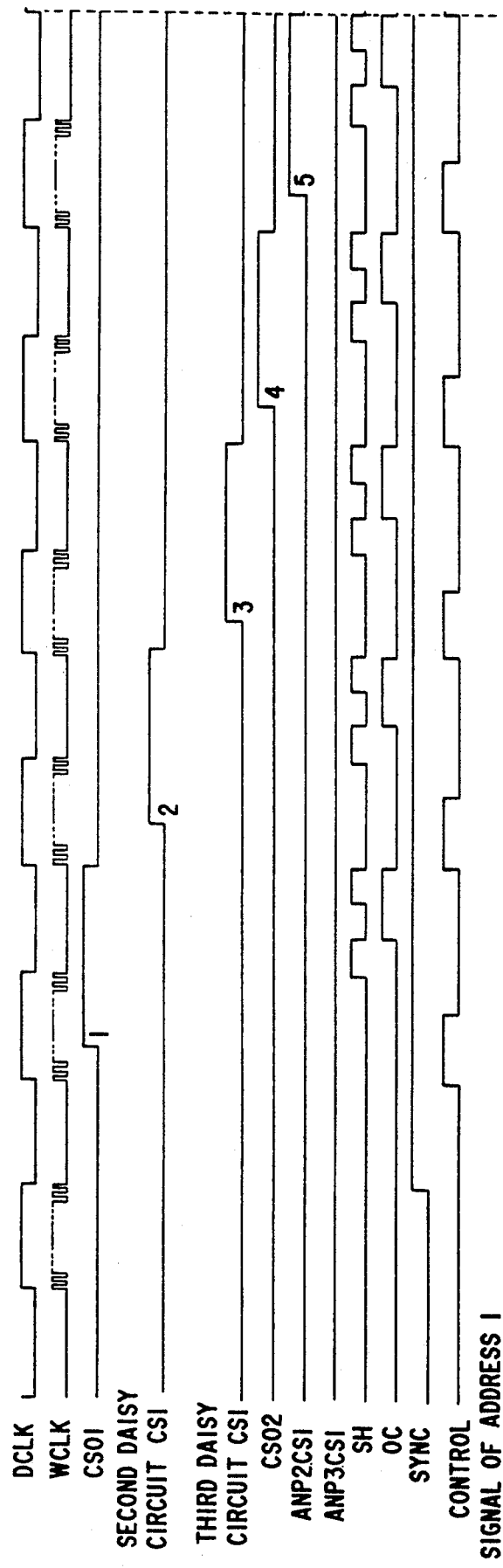
FIGS. 23A and 23B show a timing chart for signal processing in the embodiment of FIG. 22.
Figure 23B:
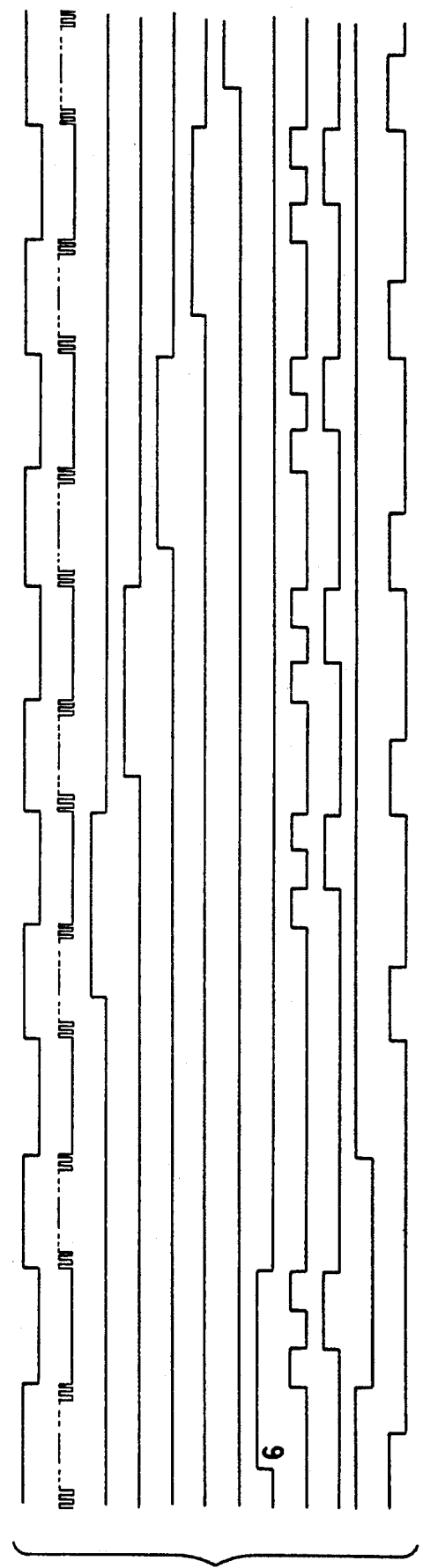

FIGS. 23A and 23B show a timing chart of the embodiment shown in FIG. 22. The output from the memory address terminal and mode terminal of master control block 181 is added to weight memory block 185 and B10 of the data output from weight memory block 185, which is connected to ANP1. B11 is connected to ANP2 and B12 is connected to ANP3. The output signal from the terminal for CS01 of master control block 181 is applied to daisy chain circuit 171 and analog switch 175. The output from sample/hold circuit 173 from the analog input port 1 is provided to analog bus B1. This signal is then delayed for a predetermined period by daisy chain circuit 171 and CSO output is produced. This output is applied to daisy chain circuit 172 as CSI. The signal of sample/hold circuit 174 connected to analog input port 2 is provided on analog bus B1 through switch 176. The output signal CSO of daisy chain circuit 172' simultaneously opens the output switch 176' of sample hold circuit 174', which is connected to analog input port 3, and the signal output from the output switch 176' is provided on analog bus B1. ANP1 performs a single product and sum operation during the period of a DCLK signal and when the DCLK signal is high, the weight clock is driven and the digital weight data is inputted in synchronization with the weight clock, which is multiplied by the analog input signal. When the latter part of the DCLK is low, the sample/hold signal S/H becomes high, enabling a capacitor integrator to perform a summing operation. During period 1, when CS01, namely, the CSI of daisy chain circuit 171, is high, ANPs 1, 2, and 3 perform a product and sum operation on the analog signal on bus B1. When the OC signal from the master control block 181 becomes high, ANPs 1, 2, and 3 perform an offset cancellation and a sample hold operation. This results in a completion of one cycle of the product and a sum operation. Next, when input signal CSI reaches the second daisy chain circuit 172, it becomes high as shown by 2, and ANPs 1, 2 and 3 perform a product and sum operation on the input signal from the analog input port. When the product and sum operation period is completed, the CSI signal is input to daisy chain circuit 172' and the output signal is produced from sample/hold circuit 174' and, as shown by 3, the third product and sum operation cycle is cut.

Figure 34A:
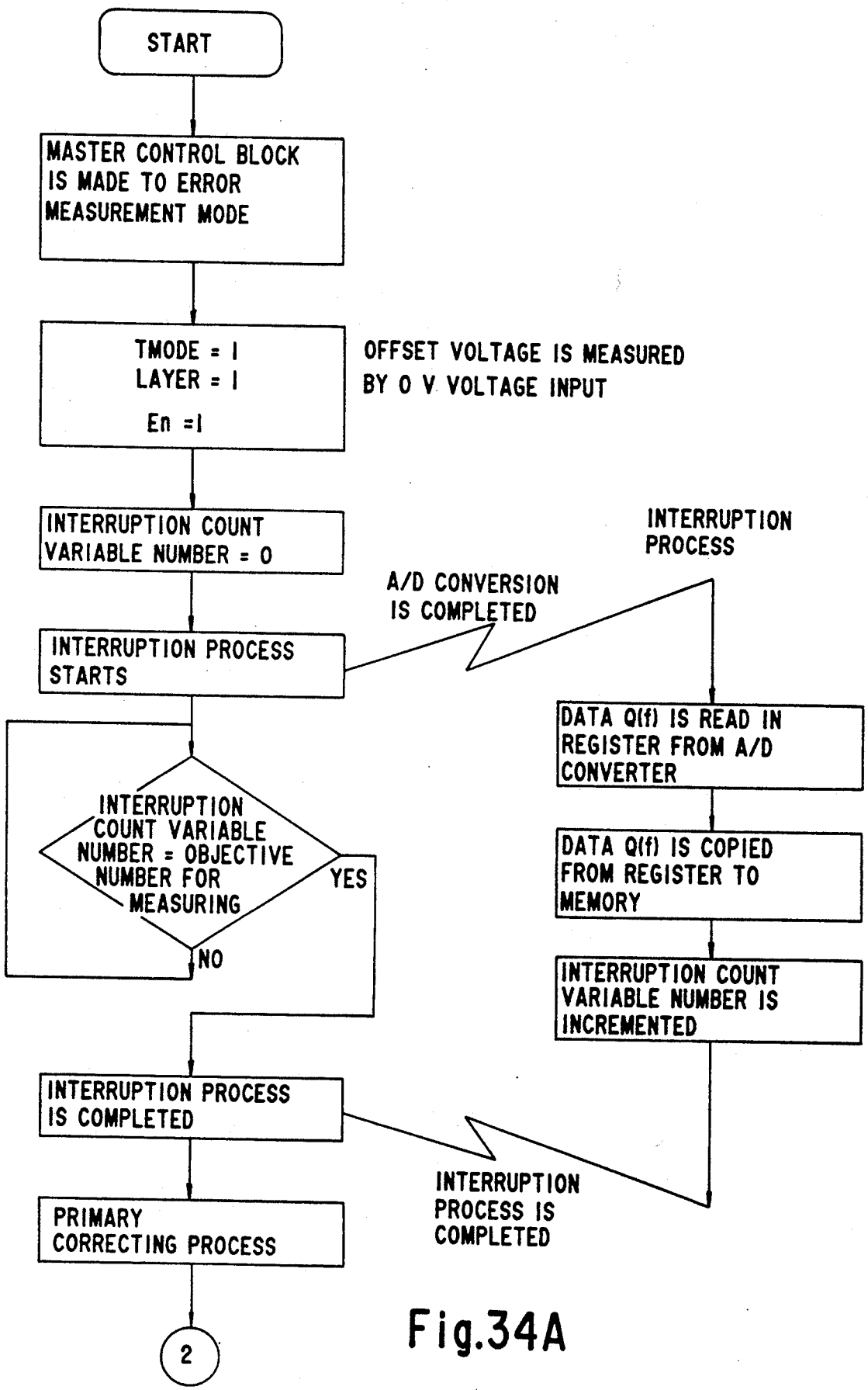
FIGS. 34A and 34B show a flowchart for correcting the weight data in case of the feedback type network.
Figure 34B:
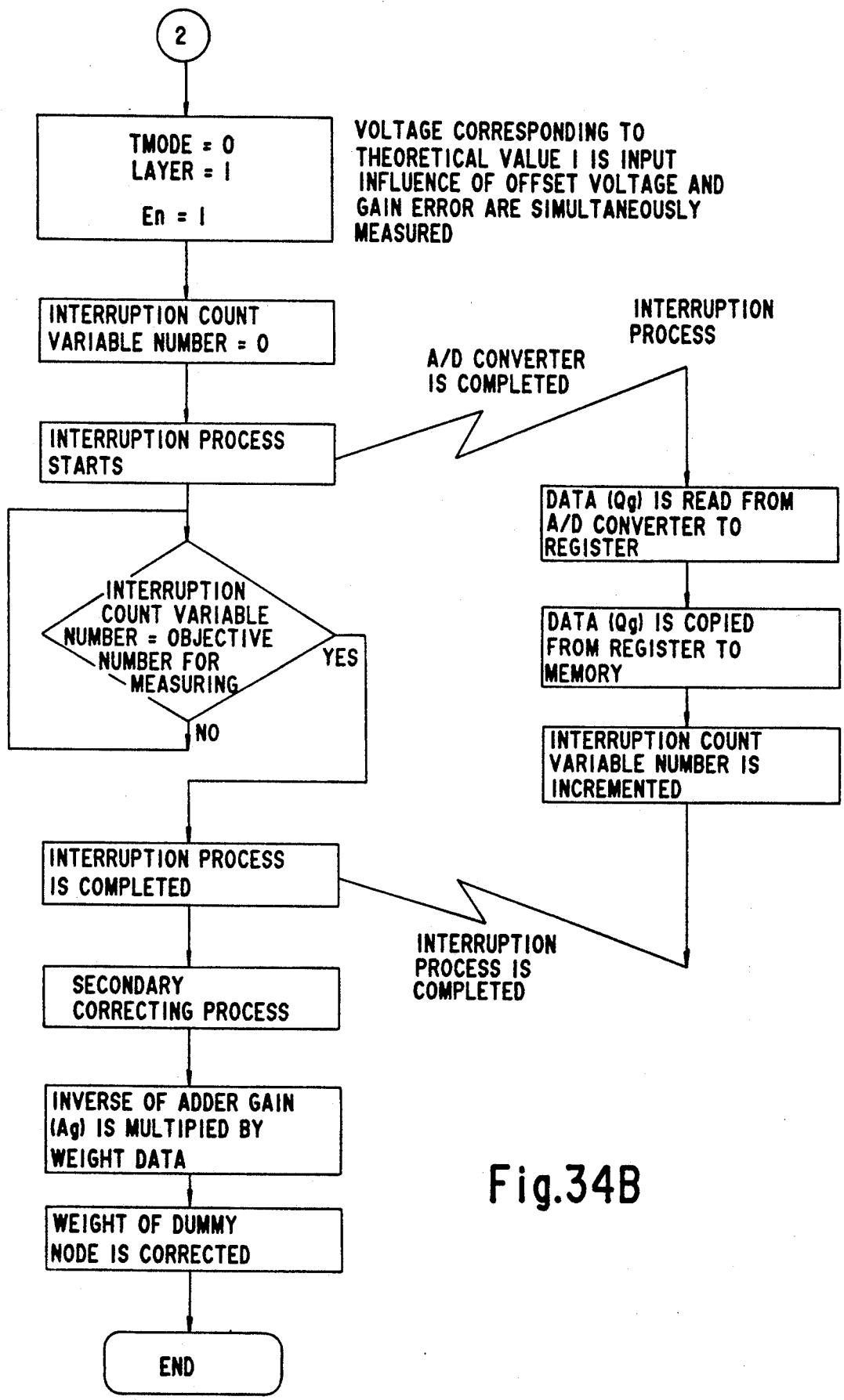

Next, CS02 signal 4 is produced from master control block 181 and the signal formed in the previous product and sum cycle from ANP1 is fed back to analog bus CB. The product and sum operations are simultaneously conducted by ANPs 1, 2 and 3 for the feedback signal. Next, after being delayed for a predetermined period, the CSO output signal from ANP1 is applied to ANP2 as shown by ⑤. The signals stored in the timing of the product and sum cycle of the previous timing are outputted from ANP2 in a daisy-chain-like manner. The signal is fed back to ANPs 1, 2 and 3 through analog bus CB and the product sum operation is facilitated as shown by ⑤. Simultaneously, after delaying the signal period for a predetermined period, the CSO of ANP2 is added to ANP3 as shown by 6, and the output from ANP3 is fed back to ANPs1, 2 and 3 through the analog bus CB to perform a product and sum operation at ⑥. As shown in FIGS. 34A and 34B, the feedback type network and the outputs from 3ANPs, perform six product and sum operations which are output to analog output ports 0, 1, 2, and 3 through sample/hold circuits 177, 178 and 178'. The output signals from sample/hold circuits 177, 178 and 178' are selectively output by multi-analog multiplexer 179 and supplied to the digital control circuit comprising MPU182, memory 183, a nd communication interface 184 through A/D converter 180. MPU 182 determines whether the neuron output state at the present time is the same as the neuron output state of the previous time. If they are in the same time status, the system can be considered to become stable. Therefore, the operation is carried out by using a single common analog bus CB through the feedback operation and is repeated to reach a stable resolution which is deemed as a final output.

Figure 24:
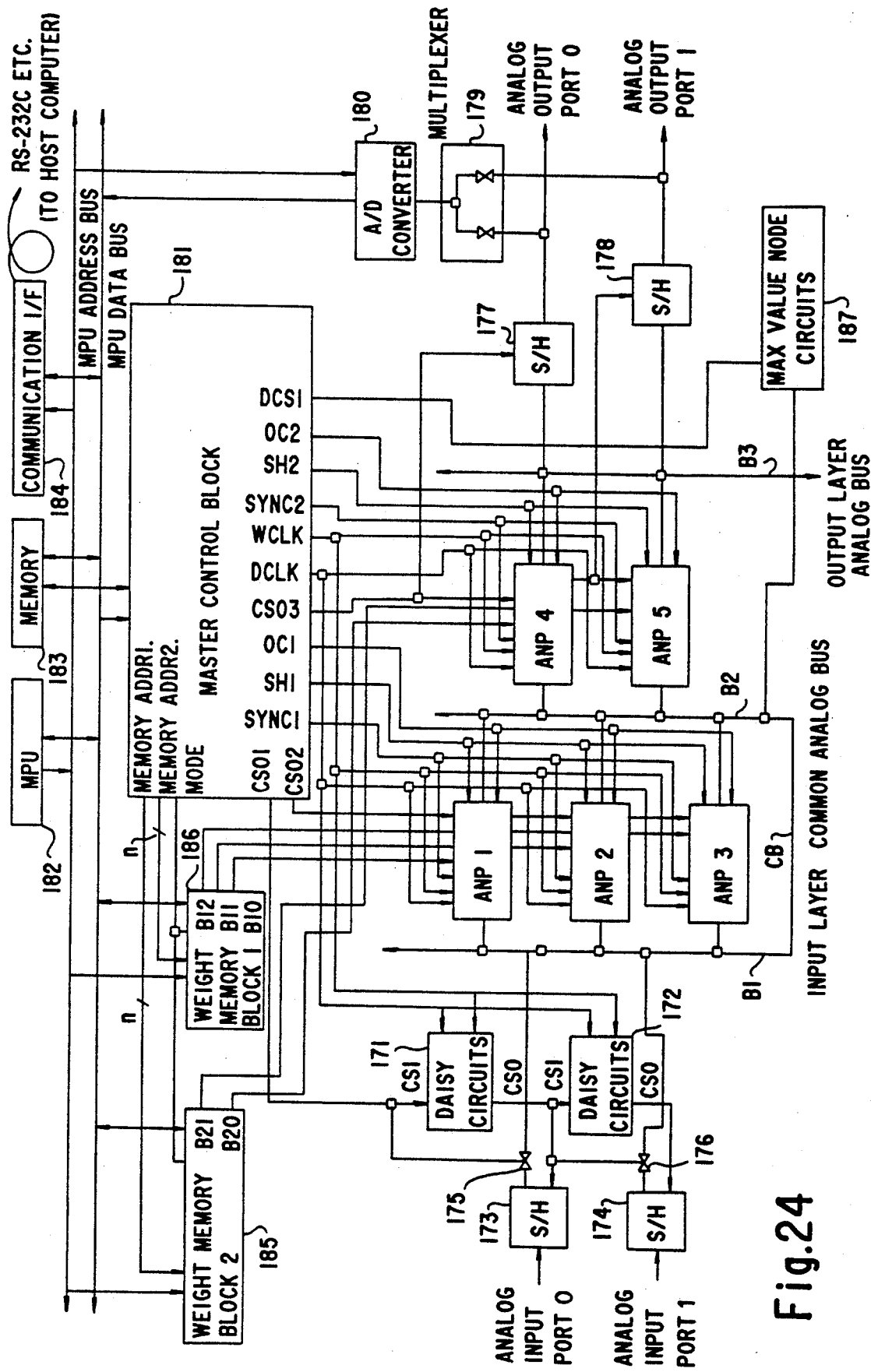
FIG. 24 is another detailed block diagram of another embodiment in which a layered type neuron computer is combined with a feedback type neuron computer.
Figure 25A:
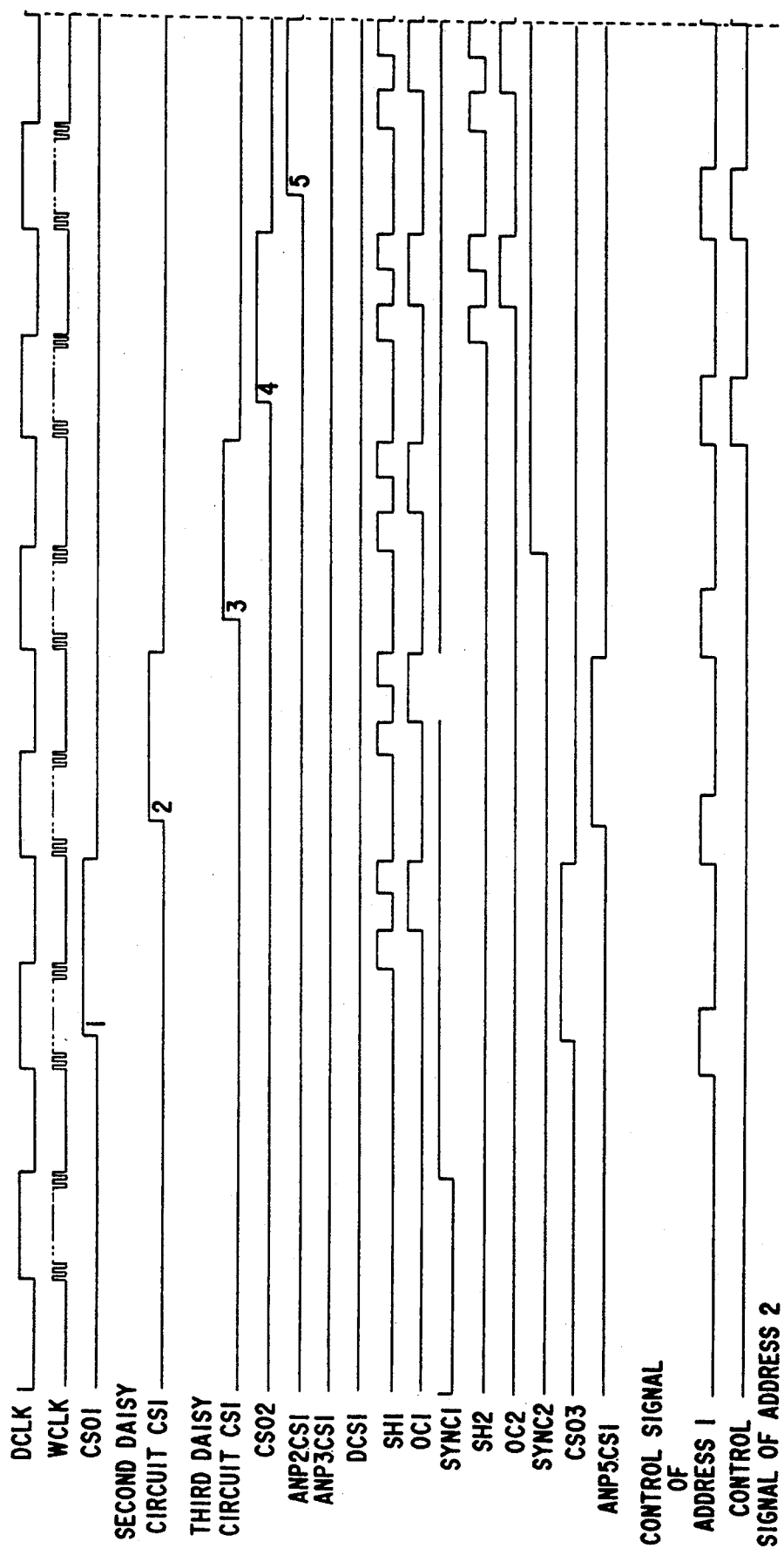
FIGS. 25A and 25B show a timing chart for processing a signal in the embodiment of FIG. 24, FIGS. 26A and 26B show conceptual views of a mechanism in which an error is produced in an actual ANP.
Figure 25B:
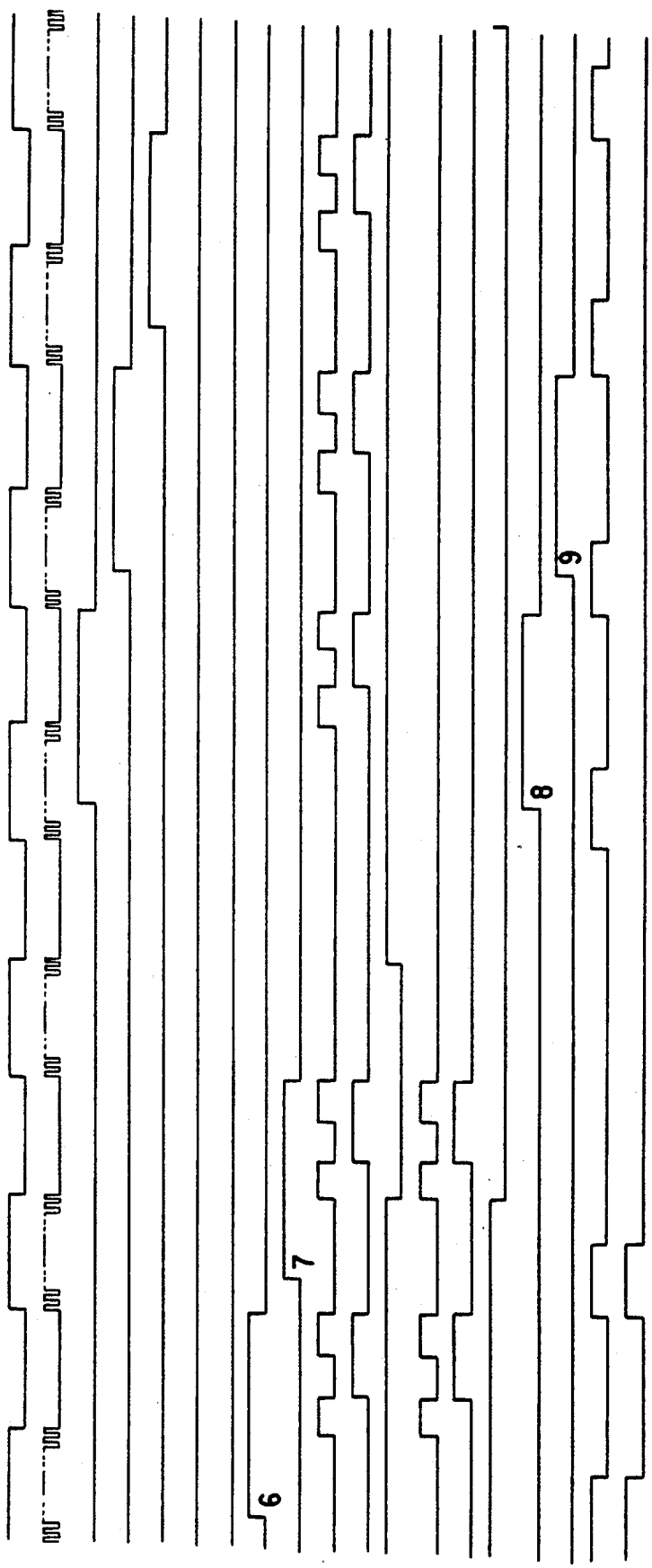

FIG. 24 shows an embodiment in which a feed-back type network is combined with a layered network. A daisy circuit is provided as an input layer, ANPs 1, 2 and 3 are provided in the intermediate layer and ANPs 4 and 5 are provided at the output layer. The outputs from ANPs 1, 2 and 3 in the intermediate layer are fed back to analog bus B1 through analog bus B2 and common analog bus CB. Max. value node circuit 187 is connected to analog buses B1 and B2 as a dummy node. The outputs of ANPs 4 and 5 forming the output layer are from analog output ports 0 and 1 through sample/hold circuits 177 and 178, respectively. P3 is the output layer analog bus. An operation of the neural network shown in FIG. 24 is explained by referring to FIGS. 25A and 25(B).

DCLK and WCLK are input to daisy circuit 171 and ANPs 1, 2, 3, 4 and 5 through master control block 181. Master control block 181 inputs CS01 to first daisy circuit 171 as a CSI, as shown by time ①. Then the signal from analog input for 0 appears on analog bus B1 through sample/hold circuit 173 and switch 175 and a sum-of-the-products operation is conducted in ANPs 1, 2 and 3 under the control of SH1 and CS1. Next, a predetermined time after the fall of CS01, the CSI signal to be input to the second daisy circuit 172 rises as shown by time ②. Then the signal is input from analog input port 1 to sample/hold circuit 174 and switch 176 and the sum-of-the-products operation is carried out in ANPs 1, 2 and 3 in analog bus B2, as shown in SH1. Similarly, a predetermined time after fall of the CSO signal the CSI signal to be input to the third daisy circuit rises as shown by time ③. Then the sum-of-the-products operation is carried out at ANPs 1, 2 and 3 and the intermediate layer. The output of ANPs 1, 2 and 3 in the intermediate layer rises to be output to analog bus B2 when CS02 rises, as shown by time ④, and is applied to ANP1. The output of ANP1 is fed back to analog bus B1 through the common analog bus CB. Thus, ANPs 1, 2 and 3 perform the sum-of-the-products operation again under control of SH1 and OC1. The output of ANP1 appears on the analog bus B2. The sum-of-the-products operation is carried out in ANPs 4 and 5 under the control of SH2 and OC2, respectively. Therefore, in this embodiment ANPs 1, 2 and 3 in the intermediate layer and ANPs 4 and 5 in the output layer perform the sum-of-the-products operation simultaneously. Next, a predetermined time after the fall of CS02, the CSI signal is input to ANP2 in the intermediate layer, as shown by time ⑤, and the output signal of ANP2 is fed back to analog bus B1 through ANP2 common bus CB. Therefore, the sum-of-the-products operation can be conducted again in ANPs1, 2 and 3. The sum-of-the-products operation can be carried out at the same time.

Further, as shown in ⑥, when the CSI signal is input to ANP3, ANP3 produces an output signal on the address bus B1, thus enabling a sum-of-the-products operation to be carried out simultaneously in ANPs 1, 2 and 3 in the intermediate layer and in ANPs 4 and 5 in the output layer.

Next, when dummy signal DSCI is input to max. value node 187 at time ⑦, a fixed voltage is input to analog bus B at time ⑦. This output voltage is fed back through common bus CB and analog bus B1 and ANPs 1, 2 and 3 perform the sum-of-the-products operation on it. Sum-of-the-products operations can also be conducted in output layer ANPs 4 and 5.

SYNC1 is high during the period in which the sum-of-the-products operation is carried out in the intermediate layer and during the period in which the sum-of-the-products operation is performed in the intermediate layer and in the output layer. SYNC2 is high during the period in which the sum-of-the-products operation is performed in the intermediate layer and in the output layer. When CS03 is output, ANP4 produces an output at time ⑧. A predetermined time after a fall of CS03 signal, ANP5 produces the output at time ⑨. WCLK is prevented during the period in which address 1 and the enable signal are made low. According to the present invention, to the pre-stage layer comprises n neuron chips and the post stage layer comprises m neuron chips, and thus the number of wirings, as in the conventional art, is nm. However, this number can be greatly decreased as a single analog bus is used in this embodiment. When the analog signal is input to a layer comprising n neuron chips, data can be simultaneously input through the analog port as in a broadcast method. In a neuron chip, one layer can be operated in parallel. Further, a pipeline process can be performed in respective layers, thereby increasing operation speed.

As the neuron chip is manufactured by using an analog circuit, it can be made small, thereby decreasing its power and enabling the neuron computer to be composed of many neuron chips. Further, the number of neuron chips can be easily increased by changing the control pattern stored in the control pattern memory in the master control block.

Figure 26A:
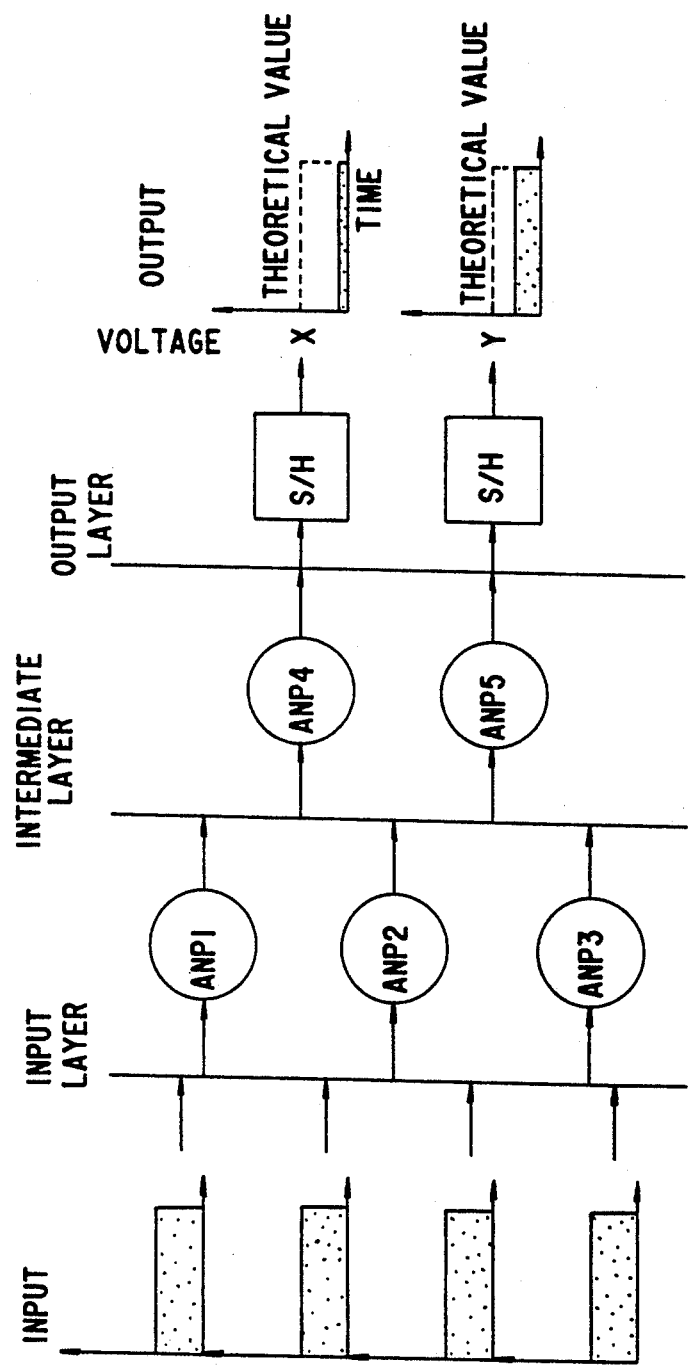
Figure 26B:
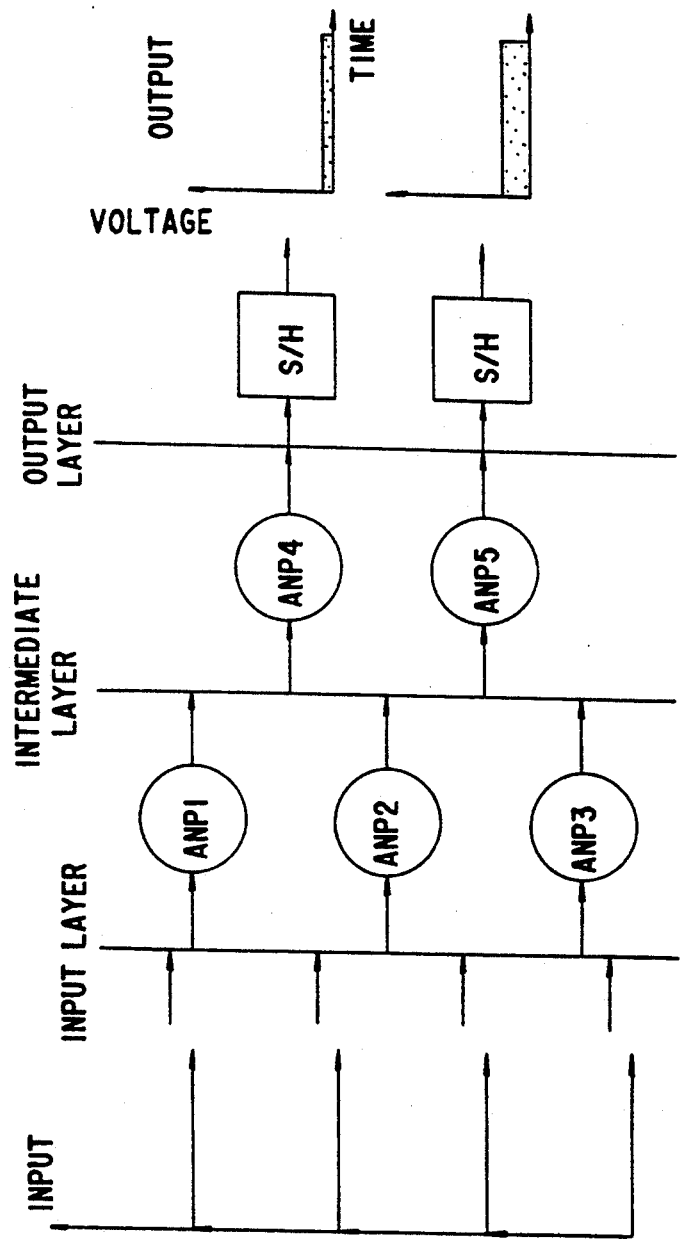

FIGS. 26A and 26B show conceptual views of a mechanism by which an error in an actual ANP is produced. As shown in FIG. 26A, where the input voltage has no predetermined value, the output voltage of the neuron network has the theoretical value shown by the dotted line. The output values of ANPs 1 to 5 are shifted from the theoretical value shown by the dotted line because the integration gain varies. FIG. 26B shows a case where the input voltage is 0 volts. In this case, the output voltage is produced as an offset voltage. Therefore, the method of measuring the error voltage in the output is important.

Figure 27:
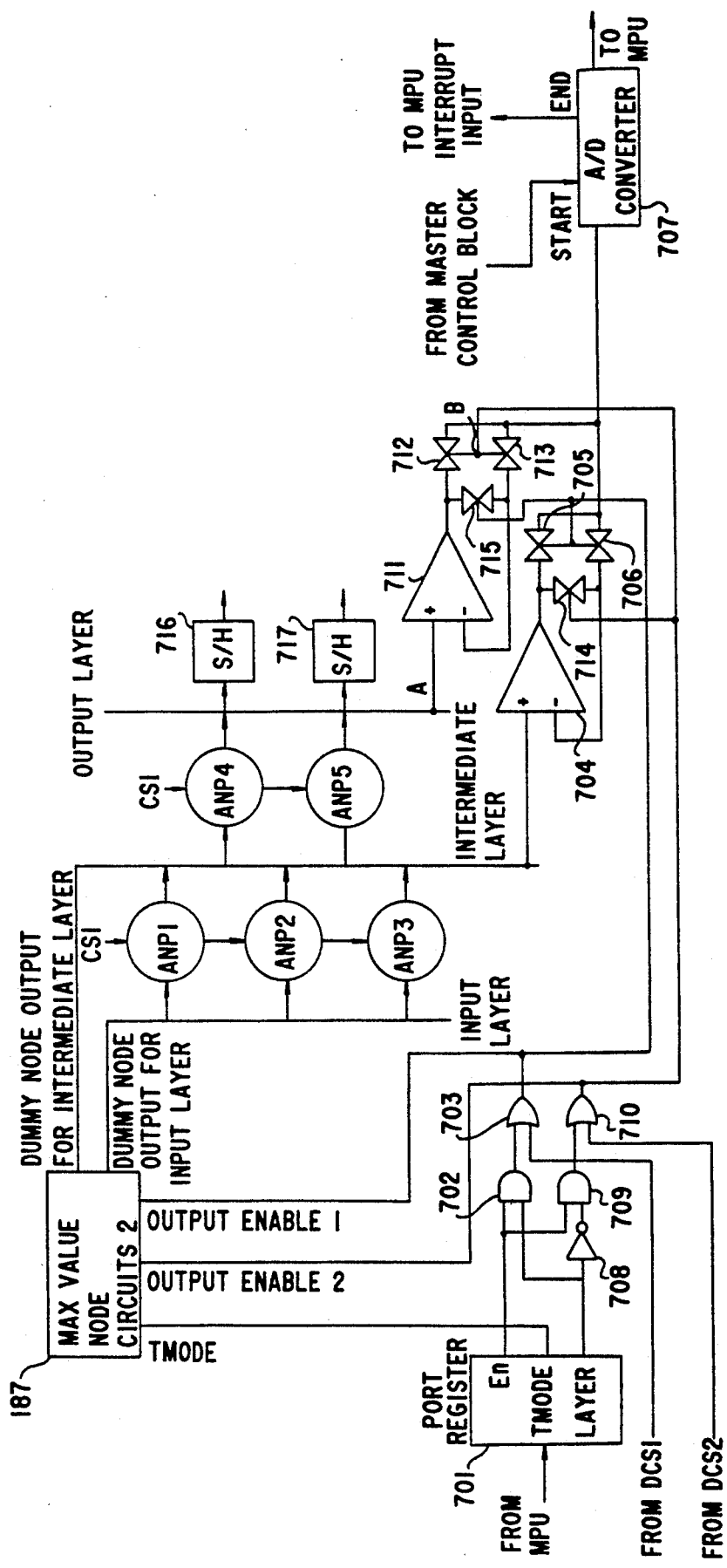
FIG. 27 shows an error measuring circuit of a one-layered type neural network for measuring a pulsed error voltage.
Figure 28:
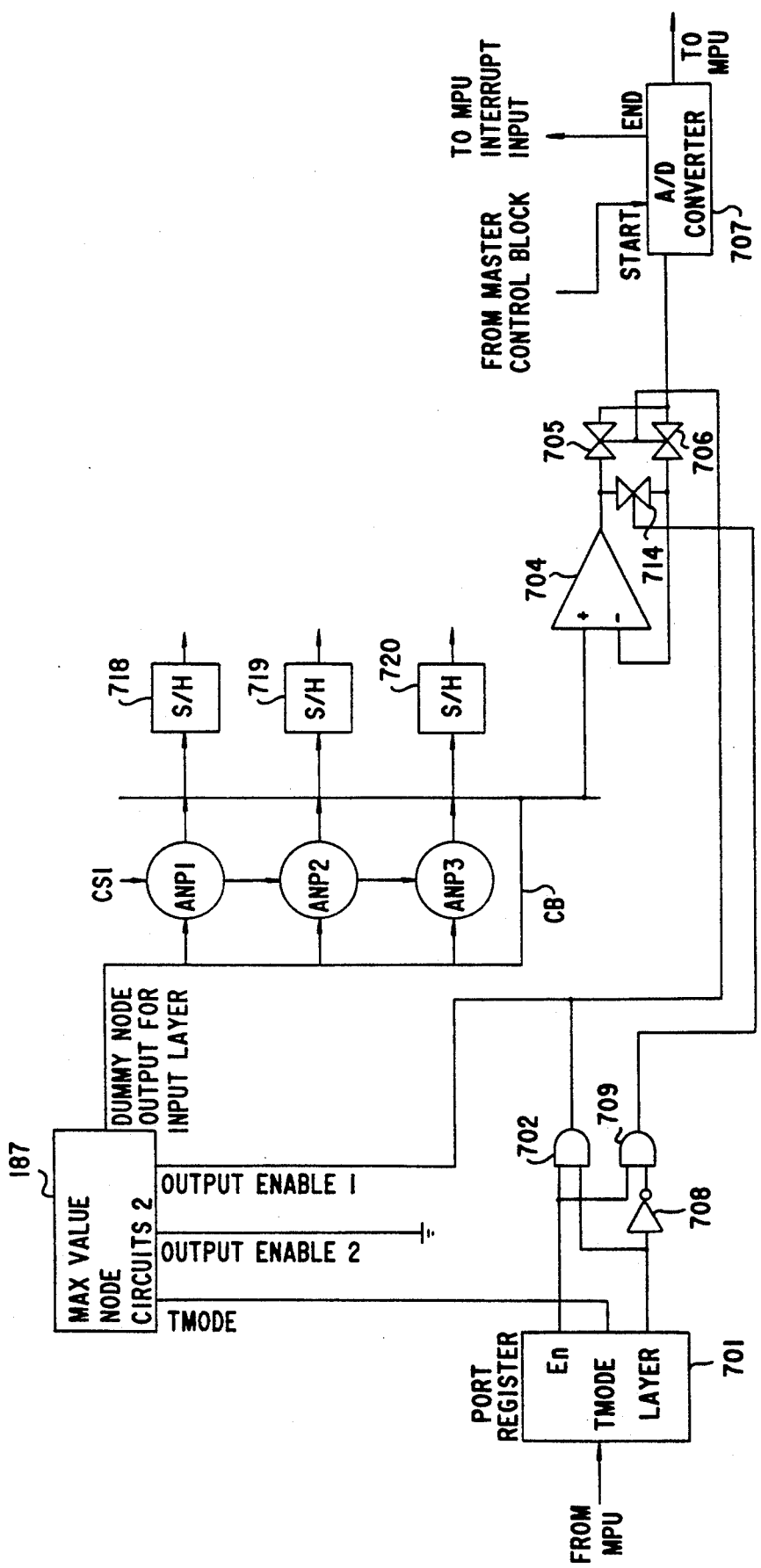
FIG. 28 shows an error measuring circuit of a feedback type neural network for measuring pulsed error voltage.

FIGS. 27 and 28, respectively, show error measuring circuits in the layered type and feedback type neural networks for measuring pulsed error voltage. The output of the max. value node circuit 187 is connected to the analog bus. Data provided by the MPU is set in the port register and respective bits for control signal En, and T mode and layer mode are provided to max. value node circuit 187. The enable signal applied to max.value node circuit 187 is simultaneously utilized for controlling the switch of the output operation amplifier. For example, upon receiving the output enable signal 1, the voltage in the intermediate layer is applied to the MPU through A/D converter 707, thereby enabling an error measurement. By using T mode (a test mode), the voltage of the analog buses of the intermediate layer and output layer in response to 0 input can be measured by the MPU through the A/D converter. For example, upon receiving a T mode equal to 1, the layered type neural network is expected to produce an offset voltage as a response to the "0" input signal. Upon receiving "0" input, the voltage sensed through the A/D converter is monitored. In order to monitor the voltage for respective layers the analog bus voltage connected to the intermediate layer and the output layer are transmitted in turn to the MPU. When the T mode is made low, on the other hand, a high voltage is always output. DCS1 and DCS2 are input to the OR circuit and are made low when En output from the port resistor 701 is high. This T mode is set to 0 by the port resistor 701, a layer is set to 1 and En is set to high. Thus, it becomes possible to monitor the output by making only the input layer low. The result is stored. Next time, if the layer is made low, the offset on the analog bus in the intermediate layer can be sensed and selection can be conducted by the port registor 701. For the feedback type shown in FIG. 28, the number of buses is basically one and the error can be obtained through one measurement. When, in both cases, the sum-of-the-products operation is not carried out, the offset voltage and the gain error cannot be measured. As described later, the weight for the dummy node is changed and the output voltage at that time is measured. In this case, respective CSI and CSO are controlled and the output state of respective layers can be sensed in T mode. The sensed data is provided to the MPU through the A/D converter.

Figure 29A:
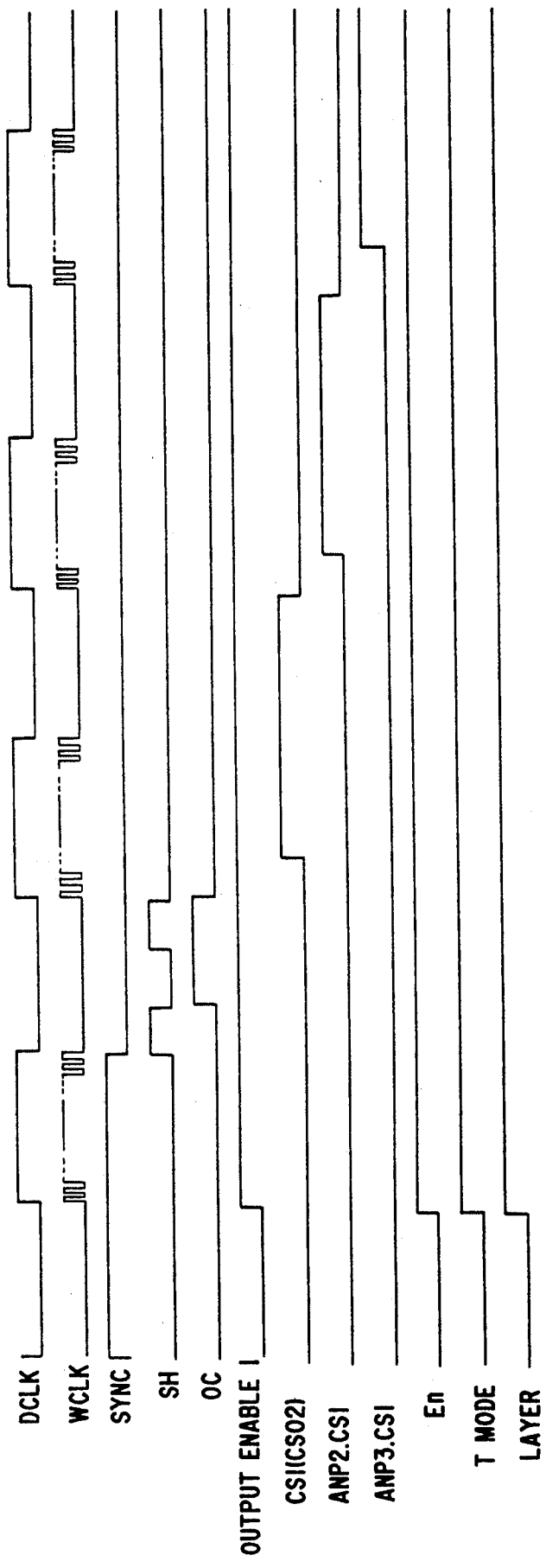
FIG. 29A shows a control sequence for offset voltage measuring in the intermediate layer in the layered type neuron network.
Figure 29B:
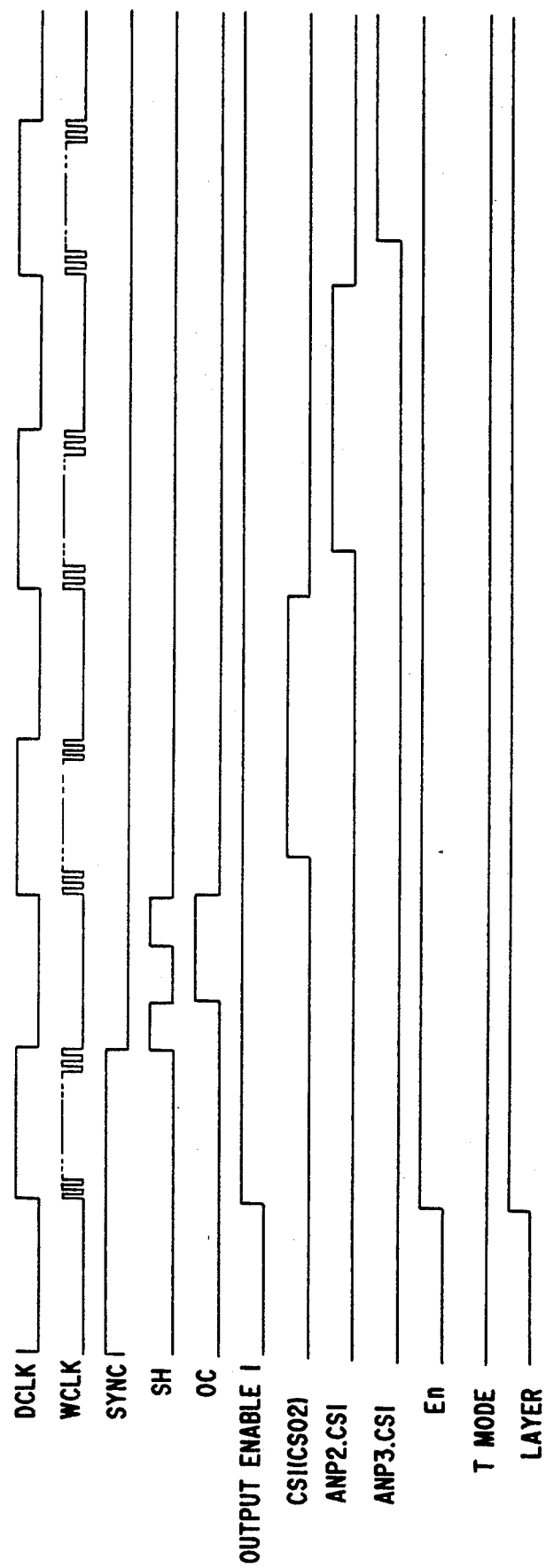
FIG. 29B shows a control sequence for measuring a gain error in the intermediate layer in the layered type neuron network.

The error measurement circuit shown in FIG. 27 is explained in more detail by referring to the operational timing chart shown in FIGS. 29A and 29B. One sum-of-the-products operation cycle is carried out in one DCLK period, as shown in FIG. 29A. When the first half of a DCLK period is high, at least 6 weight clocks WCLK are input. A weight clock WCLK is for storing 16 serial data in the shift register. The SYNC signal determines the operational timing of one ANP and rises at a half cycle before DCLK and falls at a half portion of the period DCLK. SH indicates a sample/hold signal. After WCLK is input, namely, after the multiplication of the input analog data by the digital weight data is performed, the product signal is charged in a capacitor by the sample/hold signal. When the first high signal of the sample/hold signal falls, offset cancel signal OC rises, thereby reversing the polarity of the capacitor. At that time, the input signal to the capacitor is cut to 0 and a capacitor is charged in the next high signal of the sample/hold signal. Then, a voltage equal to the offset voltage upon receipt of the input signal 0 is charged in the capacitor. Therefore, the signal which is decreased by an amount corresponding to the offset, that is, the signal in which the offset component is cancelled is stored in the capacitor. However, when the offset remains, the error absorbing system of the present invention is utilized.

In FIG. 27, an instruction signal for designating the test mode is input to port register 701 from the MPU, En output rises to a high level and test mode 1 or 0 is put in an enable state. When the layer rises from low to high, the intermediate layer performs a test. When the T mode is "1", the error signal of an offset operation is detected. When the layer is high and the $E_n$ signal is high, the output enable through gates 702 and 703 becomes high. The fixed voltage input to the intermediate layer from the max.value node circuit is made 0 volts or is put into a high state, thereby putting the circuit into an enable state. When the output enable rises to a high level, its high state is maintained until the intermediate layer test is finished, namely, until an error of the offset can be detected a t the intermediate layer. DCLK becomes high and, as stated above, the sum-of-the-products operation is conducted for one cycle. Thereafter, CSI (CS02) becomes high and the output from ANP1 is provided on the analog bus in the intermediate layer.

Next, the CSI signal is applied to ANP2 in a daisy chain after a predetermined time passes. Thus, the analog output signal is similarly produced from ANP 2 and is provided on the output bus in the intermediate layer. After a predetermined time, the CSI signal of ANP3 rises to a high level and its analog output signal is output on the analog bus of the output in the intermediate layer. Respective analog signals output to the intermediate layer are applied to operational amplifier 704, analog switches 705 and 706, and A/D converter 707. The output $Q_f$ of A/D converter 707 is transmitted to the MPU and temporarily maintained in a main memory. As shown in the timing chart of FIG. 29B, the output voltage of the dummy node is made high when the T mode is made 0 and the output voltages $Q_g$ of respective ANPs are detected by MPU. The MPU obtains the adder gain Ag obtained from $Q_f$ and $Q_g$.

When the output of the layer of port register 701 is 0, a high signal is applied to the output enable through inverter 708 and gates 709 and 710. The output signal is then produced from the second output terminal of the max.value node circuit to detect the offset of ANPs 4 and 5 in the output layer. The output is applied to A/D converter 707 through operational amplifier 711 and analog switches 712 and 713 in the same manner as recited above. Analog switches 714 and 715 protect the voltage by the voltage follower. When the voltage is not output to A/D converter 707, outputs from ANPs 4 and 5 are temporarily maintained in sample/hold circuits 715 and 716 to be as analog output signals. Where the T mode equals 1, respective 0 input signals are applied to ANPs 1, 2, 3, 4 and 5 and the offset voltages of the operational amplifiers in ANPs 1 to 5 are output to the ANP from A/D converter 707.

As shown in FIG. 29B, when T mode equals 0, the dummy node output to the input layer and the dummy node output to the intermediate layer produce a high level analog signal and the output voltage $Q_g$ (later described) of the operational amplifier forming ANPs 1 to 5 is output from A/D converter 707.

Figure 30A:
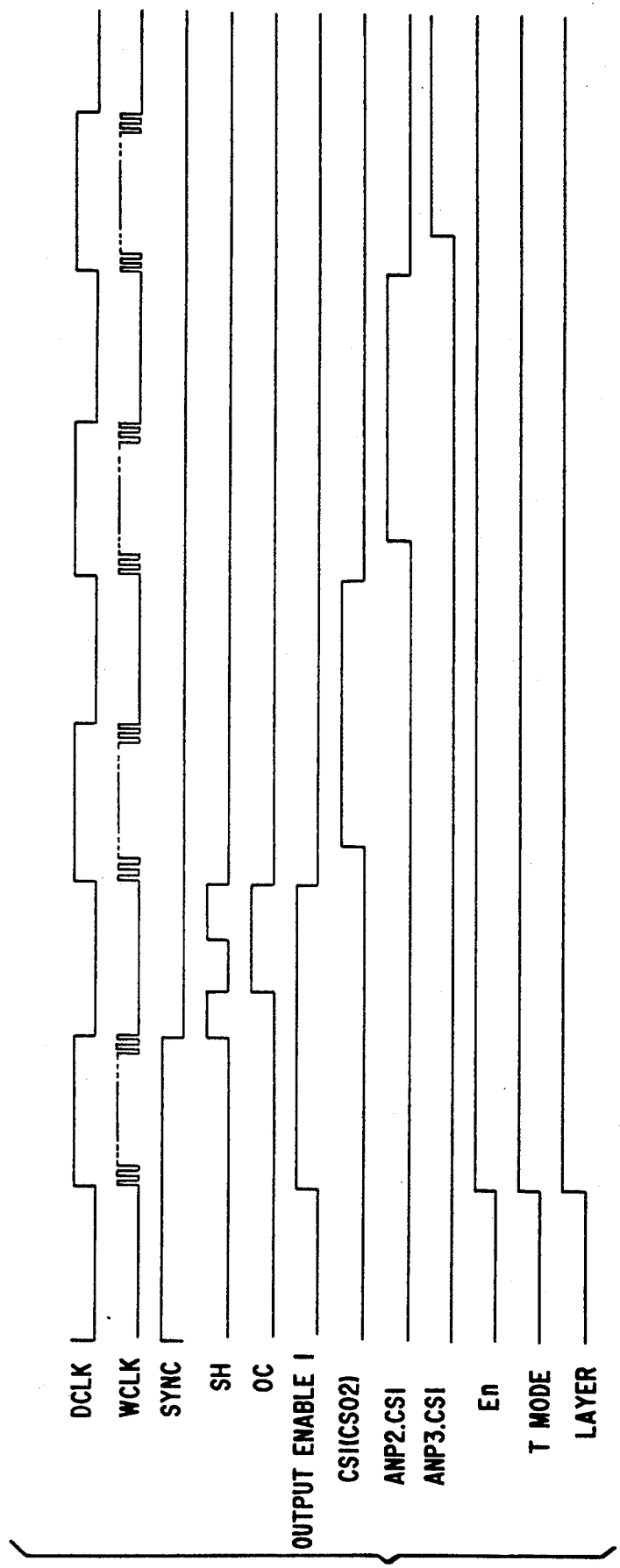
FIG. 30A shows a control sequence for measuring an offset voltage in the feedback type network.
Figure 30B:
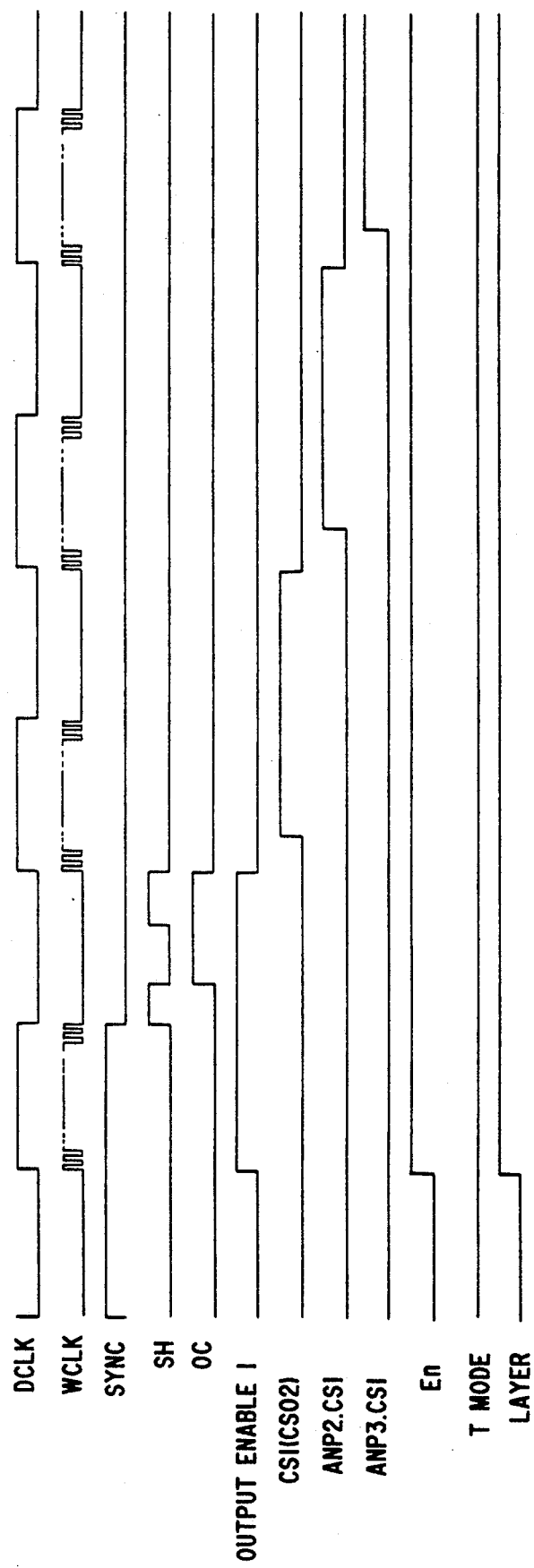
FIG. 30B shows a control sequence for measuring a gain error in a feedback type network.

FIG. 28 shows an error measuring circuit in a feedback type neural network. FIGS. 30A and 30B show the operational timing period. Max.value node circuit 187 only produces the output signal designating the dummy node output for the input layer and ANPs 1, 2 and 3 feed back the output through common bus CB to the analog bus on the input side. Port register 701, gates 702 and 703, operational amplifier 704, analog switches 705 and 706, A/D converter 707, gates 708, 709 and 710, and analog switch 714, operate in the same way as in FIG. 27. The output layer is also formed by the previously recited layer which is used commonly by the present and previous layers. Thus, the output layer, as used in the layered type is not employed. Therefore, the dummy node does not produce the output at the output layer. The second output enable terminal for providing a dummy node output to the output layer is grounded. The output signals from ANPs 1, 2 and 3 are output through sample/hold circuits 718, 719 and 720.

The error measurement circuit shown in FIG. 28 is explained by referring to the operational timing chart shown in more detail in FIGS. 30A and 30B. One cycle of the sum-of-the-products is carried out in one period of DLCK in FIG. 30A. When the former part of the one period DCLK is high, at least 16 weight clocks WCLK are input. The weight clocks WCLK are for storing 16 serial data in the shift register. A SYNC signal defines an operational timing of one ANP.

In FIG. 28, an instruction signal for designating the test mode is input to port, registor 701 from the MPU, En output rises to a high level and test mode 1 or 0 is put in an enable state. When the layer rises from low to high, one layer performs a test. When the T mode is "1", the error signal of an offset operation is detected. When the layer is high and the En signal is high, the output enable through gates 702 and 703 becomes high. The fixed voltage input to the intermediate layer from the max.value node circuit is made 0 volts or is put into a high state, thereby putting the circuit into an enable state. Namely, an error of the offset can be detected at one layer. DCLK becomes high and, as stated above, the sum-of-the-products operation is conducted for one cycle. In the feedback type network, the output enable signal falls soon and thus, the bus on the input side is disenabled. However, while the output enable is high, the offset voltage of all the ANP is sampled/held in the ANP. Thereafter, CSI (CS02) becomes high and the output from ANP1 is provided on the analog bus in the intermediate layer.

Next, the CSI signal is applied to ANP2 in a daisy chain after a predetermined time passes. Thus, the analog output signal held and corresponding to the offset amount is similarly produced from ANP 2 and is provided on the output bus in the layer. After a predetermined time, the CSI signal of ANP3 rises to a high level and its analog output signal is output on the analog bus of the output in the layer. Respective analog signals output to the layer are applied to operational amplifier 704, analog switches 705 and 706, and A/D converter 707. The output $Q_f$ of A/D converter 707 is transmitted to the MPU and temporarily maintained in a main memory. As shown in the timing chart of FIG. 30B, the output voltage of the dummy node is made high when the T mode is made 0 and the output voltages $Q_g$ of respective ANPs are detected by the MPU. The MPU obtains the adder gain Ag obtained from $Q_f$ and $Q_g$.

As shown in FIG. 30B, when T mode equals 0, the dummy node output to the input layer produces a high level analog signal and the output voltage $Q_g$ (later described) of the operational amplifier forming ANPs 1 to 5 is output from A/D converter 707.

Figure 31A:
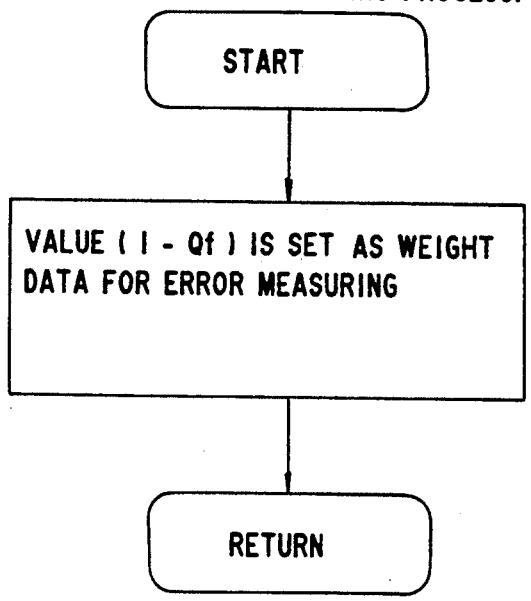
FIGS. 31A and 31B show flowcharts for respectively explaining primary and secondary correction processes used in error measurement processing in the present invention.
Figure 31B:
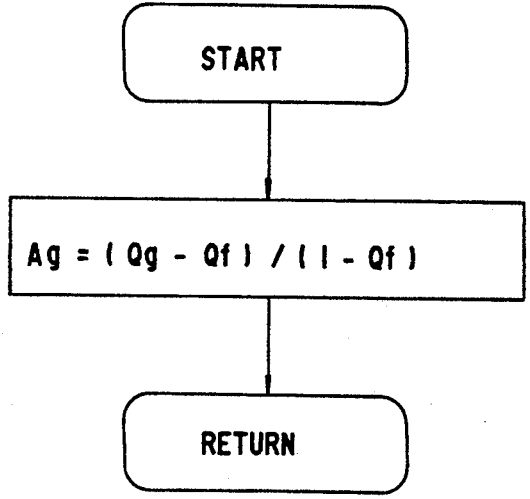

Next, a model for producing an operational error in an analog neuron processor and a method of correcting the weight utilizing a dummy node is explained. FIG. 31 shows a conceptual view of the algorithm of primary correction and secondary correction processes. The primary correction process is to set a measurement condition for presuming an amplifier gain and for processing a measurement of offset voltage. When the flowchart starts, the fixed voltage of the dummy node is made 0, and 1-$Q_f$ of the error measurement weight data is set again as the weight for the dummy node. According to the secondary correction process, offset voltage $Q_f$ is obtained for 0 volts output from the dummy node, and 1-$Q_f$ is considered as a temporary weight for 1 volt dummy node and 1-$Q_f$ is multiplied by 1 volt and also by the amplifier gain. The offset voltage is further added to the result of the multiplication, thereby outputting a mixed error output $Q_g$. Then using two data $Q_f$ and $Q_g$, the correct amplifier gain Ag is obtained as Ag=($Q_g$-$Q_f$)/(1-$Q_f$).

In the weight correction method, the error voltage is absorbed by controlling the weight (called dummy node weight hereinafter) of respective neuron chips for a fixed voltage produced by the dummy node. Total error comprises offset error and gain error. According to the present invention, the dummy node is utilized. Namely, the max. value node circuit produces a fixed voltage "1", for example, to the analog bus and absorbs the error by arranging the dummy node weight. When 0 volts are inputted to the ANP, the error produced by each route will be explained by referring to the drawing.

Figure 32:
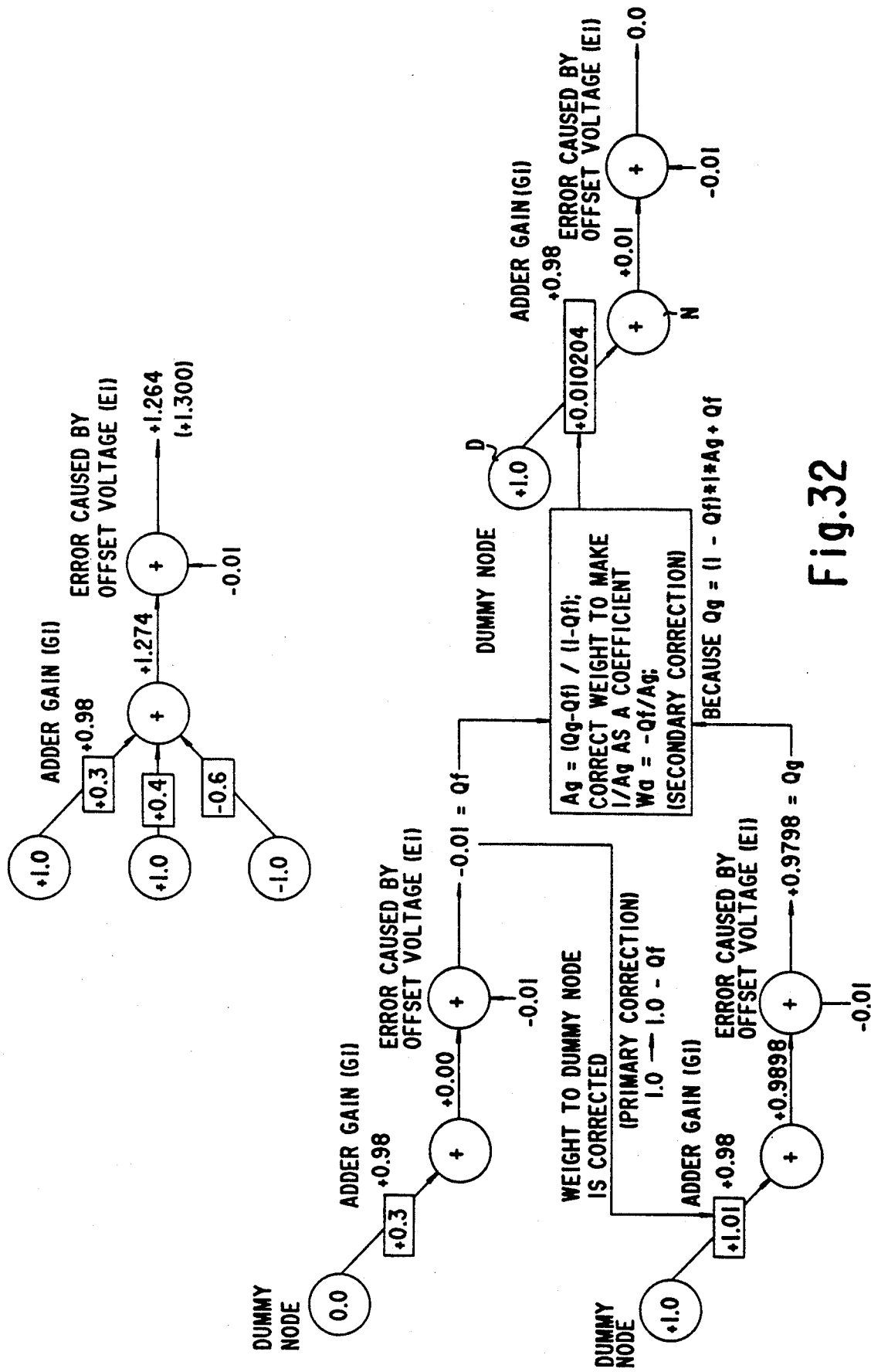
FIG. 32 shows a weight correction system using an operational error producing model and dummy node in the ANP of the present invention.
Figure 33A:
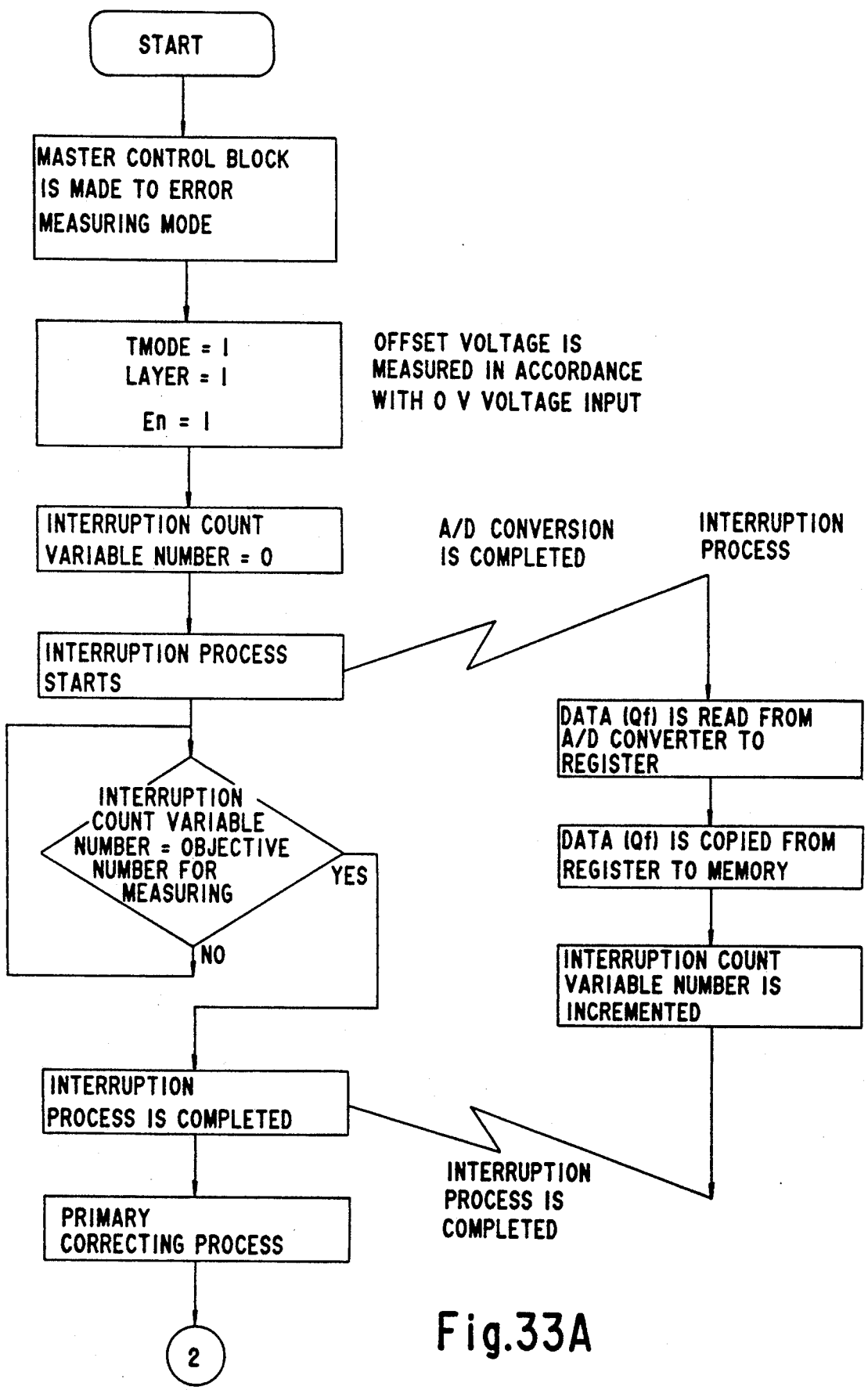
FIGS. 33A to 33D show a flowchart for correcting weight data in a layered type network.
Figure 33B:
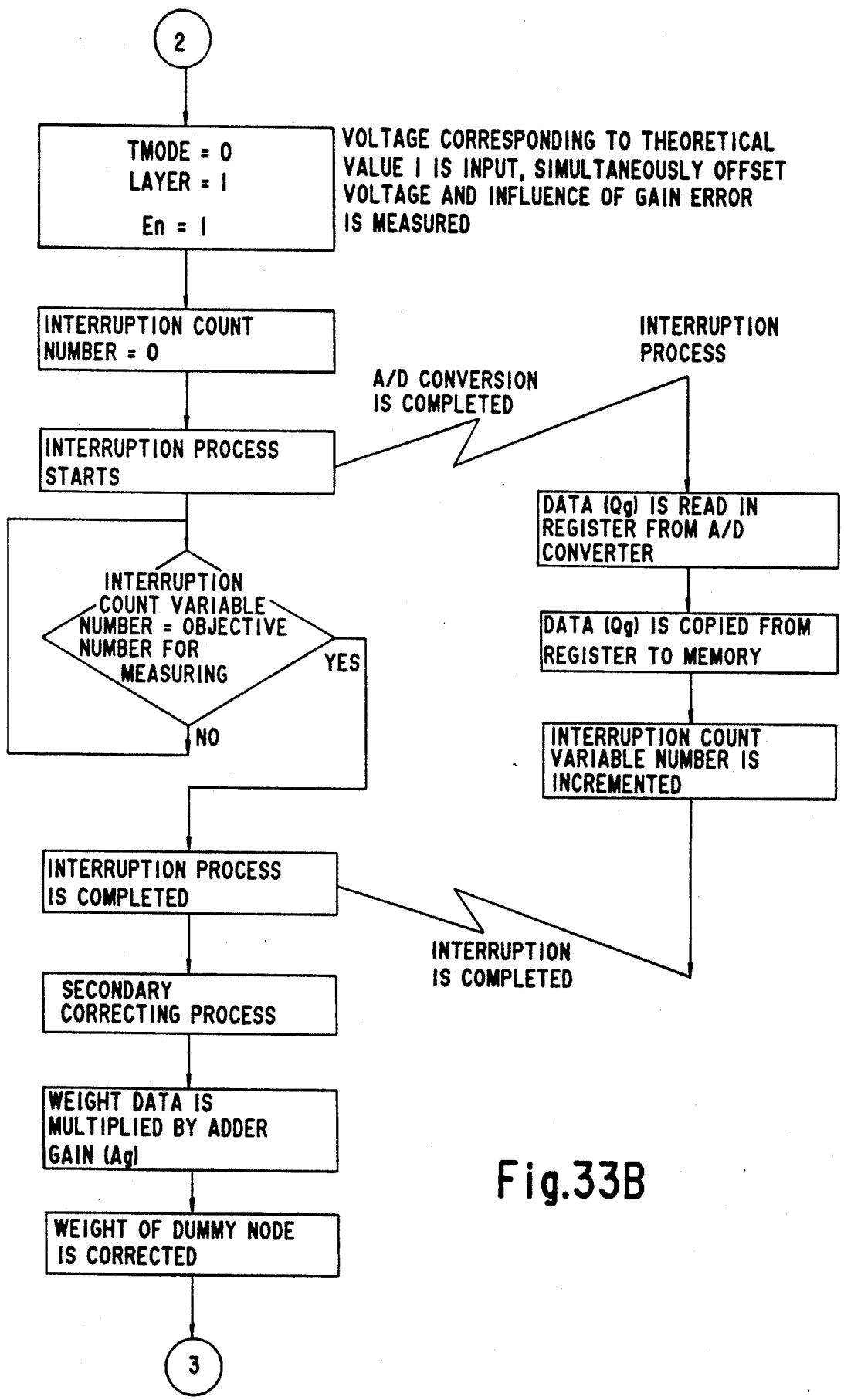
Figure 33C:
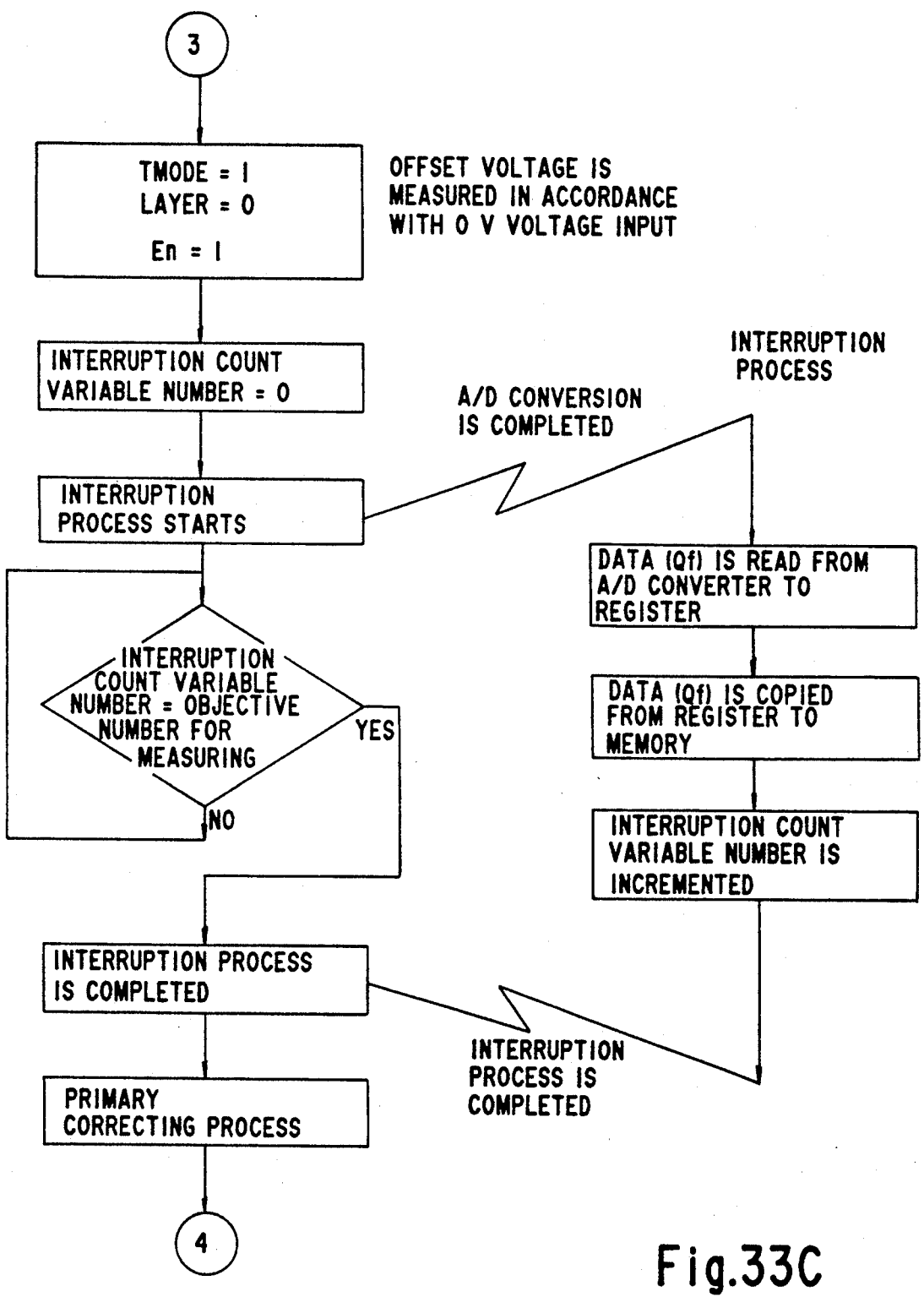
Figure 33D:
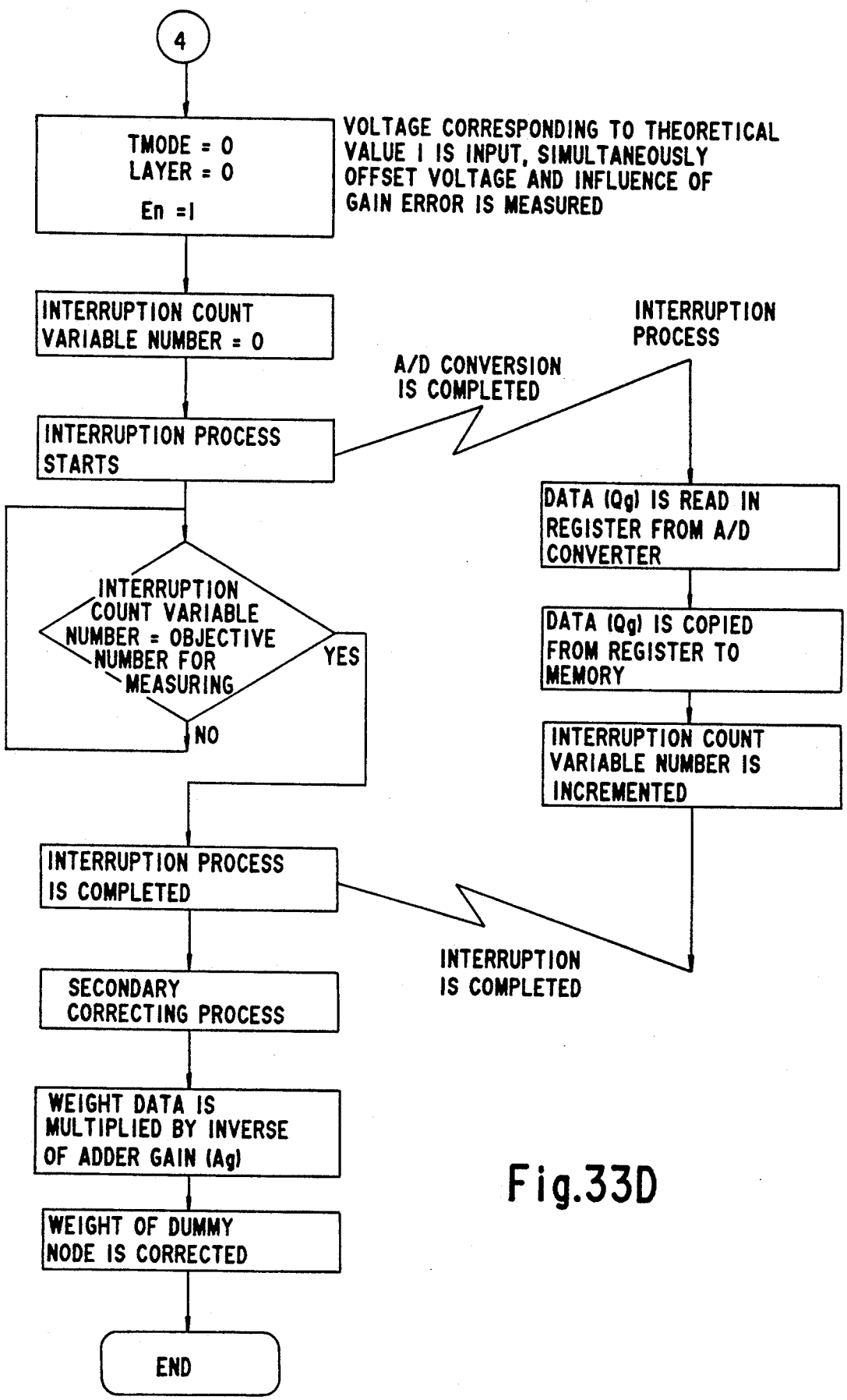

FIG. 32 is a schematic view for explaining a weight correcting method utilizing an operational error model and the dummy node in the analog neuron processor. For example, if the weight is 0.3 and the input is 0, the output is theoretically 0. When the adder gain is 0.98, the 0 input is multiplied by 0.98, providing the product 0, which is useless. On the other hand, when the input is 1 volt, 1×0.3 is the original value of the product. Where the adder gain is 0.98, the product is obtained by multiplying 0.98 by 0.3. Similarly, for the second node of 1 volt, the product is 1×0.4 and for the third node of −1.0 volt, the product is (−1.0)×(−0.6). The three products are multiplied by 0.98 and summed, thereby providing 1.274 volts. Further, −0.01 volts is added to 1.274 volts as an offset voltage of the operational amplifier, resulting in an output of 1.264 volts. The actual value should be 1.3 volts (1×0.3+1×0.4+(−1.0)×(−0.6)). Therefore, although the actual value should be 1.3 volts, it becomes 1.264 volts because of the gain error and the offset error. This is an operational error production model.

The portion shown below the drawing designates a weight correction process. In order to correct the error, −0.01 volts of the offset voltage is produced in the operational error generating model. First, the dummy node voltage is determined as 0.0 volts. The adder gain is 0.98 but the output is 0.0 volts. When the offset voltage is applied, the offset voltage $Q_f$ equals 0.01 volts. Therefore, in order to cancel the offset $Q_f$, the dummy node weight is changed from 1 to 1.01. This is a primary correction and generally provides the value of 1.0−$Q_f$. The adder gain should be 1.0 but is 0.98. Thus, a voltage of 1.01×0.98=0.9898 volts results. The offset voltage of the operational amplifier is −0.01 volts. This is added to the 0.9898 volts, yielding 0.9798 volts. This value is called mixture error output value $Q_g$. Based on two pieces of information comprising the offset voltage of −0.1 volts and mixture error output voltage $Q_g$ of 0.9798 obtained by the primary correction, a secondary correction is performed to calculate an adder gain Ag. The secondary correction is performed in accordance with the following equation as shown in FIG. 32.

$$A_9 = (Q_9 - Q_f) \times (1 - Q_t)$$

Therefore, in the above example, Ag=0.98. Thus, at the first step of the secondary correction, Ag is obtained. The fixed voltage of 1 volt is multiplied by the primary correction amount (1−$Q_f$) and the product is further multiplied by the adder gain Ag to provide the product to which offset voltage $Q_f$ is added, by providing $Q_g$.

$$Q_g = (1 - Q_f) \times 1 \times A_9 + Q.$$

(where, Wa is a weight between dummy node D and node N, Ag is an adder gain in node N and $Q_f$ is the offset voltage of mode N.)

Therefore, the weight Wa must satisfy the voltage of node N.) following equation.

$$W_a = -Q_f/A_g$$

This forms the second step of the secondary correction. This is because, when all the output signals from all the ANPs in the previous layer are 0, the output signals from respective ANPs in the following layer should be 0 even if the ANPs include an offset voltage. Namely, as the output of the dummy node is always 1, the weight given by the dummy node to the input signal of respective ANPs in the following layer may be determined such that the ANPs in the following layer, which receive the output from the dummy node, produce 0 output signal. This Wa, equal to 0.010204, is multiplied by the 1 volt from the dummy node as Wa is considered as a weight subjected to a secondary correction. The product is further multiplied by the adder gain Ag, equal to 0.98, thereby providing 0.00999999, or almost 0.01 volts. Then the offset voltage −0.01 is added to this value of almost 0.01 volts, resulting in 0 volts.

As described above, the gain is related to the offset. Thus, the offset and gain could be corrected simultaneously and independently. However, this is difficult to achieve, so the value in which offset and gain are mixed is corrected as described above. When the fixed voltage of 1 volt is produced from the dummy node, the offset voltage, which is produced when the input to the ANP is 0 volts, is cancelled. As a result, the output can be corrected to 0 volts. A correction process is carried out by making the correction enable block "En" "1".

In the error measurement circuit in the layered type neural network shown in FIG. 27, T mode is set to 1 and the fixed voltage produced by the max.value node circuit is then compulsorily made 0. Then the analog buses to which the outputs of the input layer dummy node and the intermediate layer dummy node are applied are compulsorily made 0 volts. For example, the analog bus of the input layer is made 0 volts and the outputs of respective ANPs 1, 2, and 3 and the intermediate layer are output as offset voltages. These voltages are input to the MPU side through A/D converter 707. The offset voltage is stored as $Q_f$ on the MPU side. The MPU performs a primary correction by using this $Q_f$. When $Q_f$ is provided, the dummy node weight is calculated by using it to correct the weight. In the latter half of the primary correction, the fixed voltage from the dummy node is made 1 volt. For example, with regard to the first ANP1 in the intermediate layer, the weight data for the dummy node voltage is controlled to provide the value 1.01. If the adder gain of the ANP in the intermediate layer is 0.98, the output of the adder is 0.9898. The offset voltage, $-0.01$ volts, is added to the output of the adder, and 0.9798 volts, which is $Q_g$, is thereby output. This is again transmitted to the MPU as $Q_g$ information through the A/D converter in the error measurement circuit connected to the analog bus of the intermediate layer. Then, the MPU calculates Ag and also calculates Wa from 1/Ag. As a result, Wa is weight data for the dummy node for producing 1 volt as a secondary correction amount, thereby producing the value 0.010204. Then, the adder gain within the ANP is 0.98 and the adder output is 0.01 volts. Thus, it becomes 0 volts when the offset voltage is applied. If this is detected by the MPU, it is found that the dummy node weight has a right value of 0.010204 and thus, the MPU stores Wa in the weight memory.

The above operation will be applied to all the ANPs. FIGS. 33A to 33D show a weight data correction algorithm for a layered network. The master control block circuit is put in the error measuring mode. At the test mode, namely, T mode equals 1, the layer is 1, i.e., the intermediate layer, and En is also 1. The fixed voltage of the dummy node for the input layer is made 0 volts and the offset voltage of respective ANPs in the intermediate layer can be measured. The MPU starts an interruption process to perform a primary correction and thereafter performs primary and secondary corrections. At first, the counter variable number for counting the number of interruptions required to calculate the number of ANPs which are now being processed in the intermediate layer, is made 0. This starts the interruption process. Then when the ANP outputs the output voltage corresponding to 0 input voltage, as $Q_f$, the data $Q_f$ is read into a register through the A/D converter of the measurement circuit by the MPU and transmitted to a main memory from the register. The interruption counter variable number increments and determines whether the number of the interruption counter is equal to the objective number of measurement subjects, namely, the number of ANPs. If these numbers are not equal, the process is kept waiting while the number of the counter is being sensed. If the number of variable counters is equal to the objective number of measurement subjects, the interruption process routine is completed and a primary correction process for the ANP in the intermediate layer starts as shown by ②. The voltage of the dummy node for respective ANPs is made 1 volt and the value $1.0 - Q_f$, subjected to the primary correction, is first determined as a weight and then stored in the main memory as the weight for all the ANPs. Namely, T mode is set to 0. When T mode equals 0, the dummy node produces a fixed voltage of 1 volt. Thus, it simultaneously calculates the offset voltage and gain errors, thereby performing a pre-processing for the secondary correction.

The interruption number counter variable number is again made 0 to re-start the interruption process. In other words, $Q_g$ is measured through the A/D converter of the measurement circuit. The voltage of the dummy node is 1.0 and the weight corresponding the ANP, for example, becomes 1.01 as a result of the primary correction. Thus, the output is 0.9898 for the adder gain 0.98. The offset voltage of $-0.01$ volts is added to the output of the adder, thereby providing 0.9798 volts, which is Qg. This Qg is read by the MPU from the A/D converter to a register and is moved to the memory through the register. This is applied to all the ANPs of the intermediate layer by incrementing the count variable. Then it is determined whether the incrementing number complies with the objective number of the measurement subjects and if not, measurement continues to be executed. When the counter number equals the objective number of the subject to be measured, the interruption process is completed and is entered into the secondary correction process. Wa is obtained for respective ANPs by multiplying the inverse of Ag by $-Q_f$. This Wa is given as a weight data to the dummy node to produce 1 volt. Therefore, the process enters the routine for correcting the dummy node weight, for example, the weight data for ANP is determined as 0.010204. This weight is then stored in the weight memory.

The above operation is also applied to all the ANPs in the output layer. When the process proceeds to ③, T mode is 1 and the layer is 0, i.e., the output layer mode, and further En=1. Thus, a similar process is started. Namely, the interruption number counter is made 0 and is entered into the interruption process routine. The offset voltage $Q_f$ for the dummy node of 0 volts is obtained by the error measurement circuit for the ANP in the output layer and the data is stored in the memory. The process is repeated for each of the subjects to be measured, namely, the number of ANPs in the output layer, and then the process goes out from the interruption process routine and the primary correction process is performed. Namely, the weight data is determined for the fixed voltage of 1 volt of the dummy node. The process then proceeds to ④, When T mode is 0 and the layer is 0, En is 1. The process enters the pre-process for the secondary correction to calculate $Q_g$. Namely, a fixed voltage of 1 volt is produced from the dummy node and the influences of the offset voltage and gain errors are simultaneously measured. Then, the interruption count variable number is made 0 to start the interruption process and $Q_g$ is read through the A/D converter to a register and transferred from the register to the memory. Then the interruption count number is incremented. This process is repeated, the number of the repetitions being equal to the objective number of the ANPs in the output layer. The process then exits from the interruption process routine. Then Wa for the secondary correction is calculated and stored in the weight memory as a dummy node weight. In case of the layered type, Wa obtained by the secondary correction should be added to the weight given to the dummy node. It is necessary to multiply all the weights by 1/Ag.

The weight data correction algorithm for the feedback type network, is shown in FIGS. 34A and 34B. The process is carried out in the same way as the above. The feedback type network comprises one layer. The master control block is set to an error measurement mode and T mode is 1, a layer is 1 and EN is 1. Then the offset voltage is calculated when the output of the dummy node is 0 volts. The interruption count variable number is set to 0 and the process enters into the interruption routine. $Q_f$ is read through the A/D converter provided on the output side of the measurement circuit and $Q_f$ is moved into the memory. The process is repeated by the number of ANPs and the interruption process routine is completed, thereby entering the primary correction process as shown in ②. The feedback type network comprises one layer. Thus, the primary correction and the secondary correction is performed once. Next, in order to perform the secondary correction, T mode is 0, layer is 0 and En is 1. Then the fixed voltage of 1 volt of the dummy node is input and the influence of the offset voltage and gain errors are measured simultaneously. The interruption counter variable number is made 0 to start the interruption process. $Q_g$ is read for every ANP through an A/D converter of the measurement circuit. Namely, the weight data determined by the primary correction for 1 volt of the dummy node is provided and then multiplied by the adder gain 0.98 in the ANP. Further, the offset voltage is added to the output of the adder, thereby outputting $Q_g$. This process is conducted for all the ANPs in one layer and $Q_f$ and $Q_g$ information corresponding to respective ANPs are written into the memory to complete the interruption process routine. The MPU performs the secondary correction process. That is, it calculates Wa from the inverse of Ag. Wa is then stored in the weight memory as a weight correction quantity.

Next, the weight correction method using a plurality of dummy nodes is explained.

In the fixed decimal point method, the MSB is determined as a sign bit. The decimal point is placed next to the MSB so it can express positive numbers from 0 to 1.

Accordingly, if the weight data is expressed by the 16-bit fixed decimal point system, numbers greater than 1 cannot be expressed.

For the layered type network, let's suppose that a dummy node is provided to each layer. In the upper part of FIG. 35A, the amplifier gain is 0.98, although it should be 1. Further, the offset output is 1.264, although it should be 1.3. These errors are caused by the offset voltage of 0.01. The weight data, obtained by adding the offset and gain error weight data to the threshold weight data, is applied to the dummy node. It is then stored in the weight memory. Namely, as shown in left portion of FIG. 35A, in the dummy node and 2 nodes for representing the outputs of the ANPs in the input layer, the weight applied to the 1 volt of the dummy node is assumed to be the sum of the weights for the threshold and for the error correction, namely, 0.316324. This value can be expressed by the fixed decimal point method and may be divided into two weight data. The weight for an ordinary ANP is determined as 0.4082 and the weight for another ANP is determined as −0.6122. The output of the ANP then becomes +1.30. Further, a case exists in which the weight data for the dummy node cannot be expressed by the fixed decimal point method. In this case, the weight data can be expressed by the sum of more than 2 weight data and respective weight data of less than 1 and can be expressed by the digital quantity obtained from the corresponding fixed decimal point method.

Figure 35A:
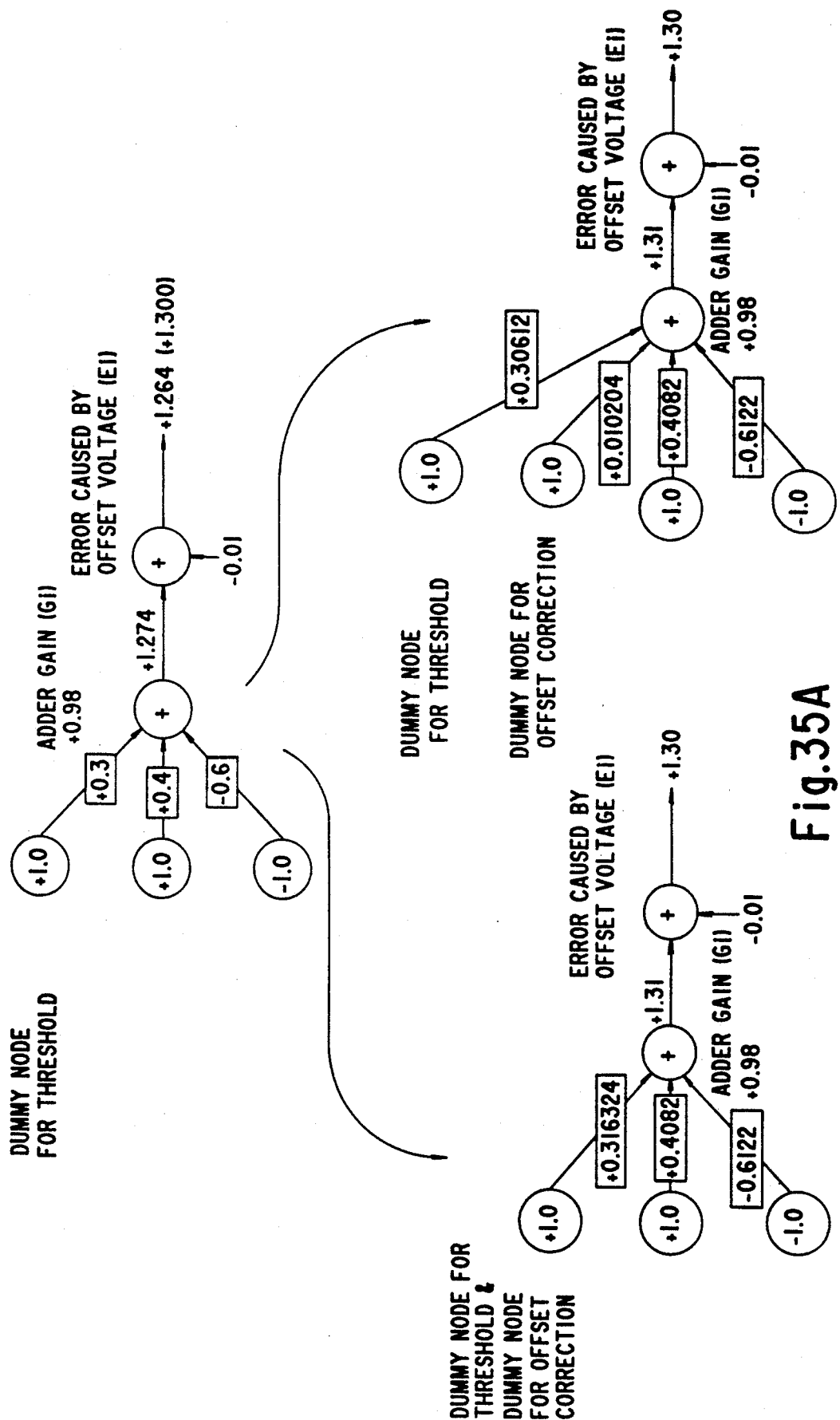
FIGS. 35A and 35B show a weight correcting system for utilizing an operation error in the operation model in the dummy node in the ANP of the present invention.
Figure 35B:
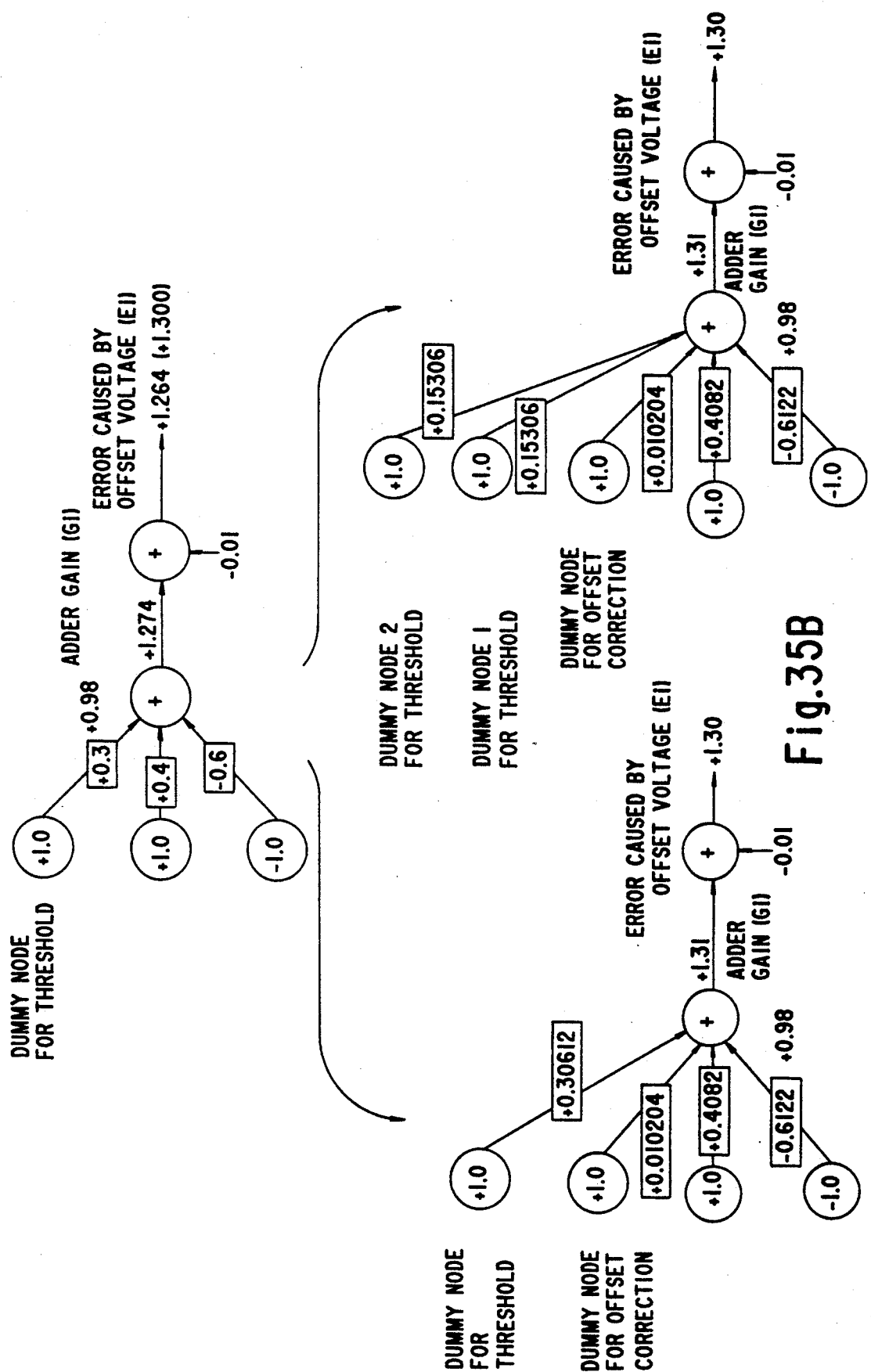
Figure 36A:
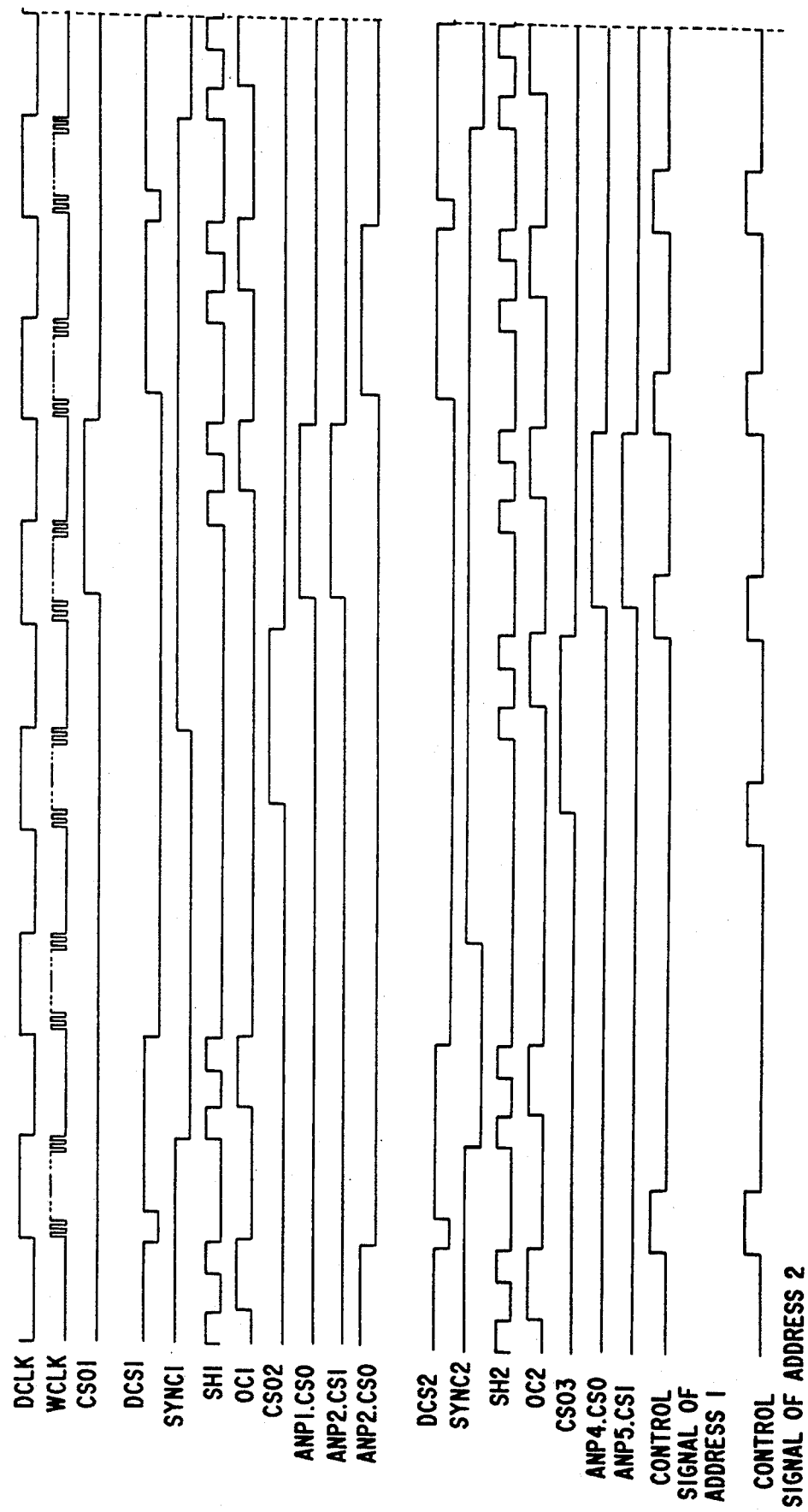
FIGS. 36A and 36B show a control sequence for controlling a layered type network by using an apparatus of the dummy node, FIGS. 37A. and 37B show a control sequence for controlling a feedback type network by using a plurality of dummy nodes.
Figure 36B:
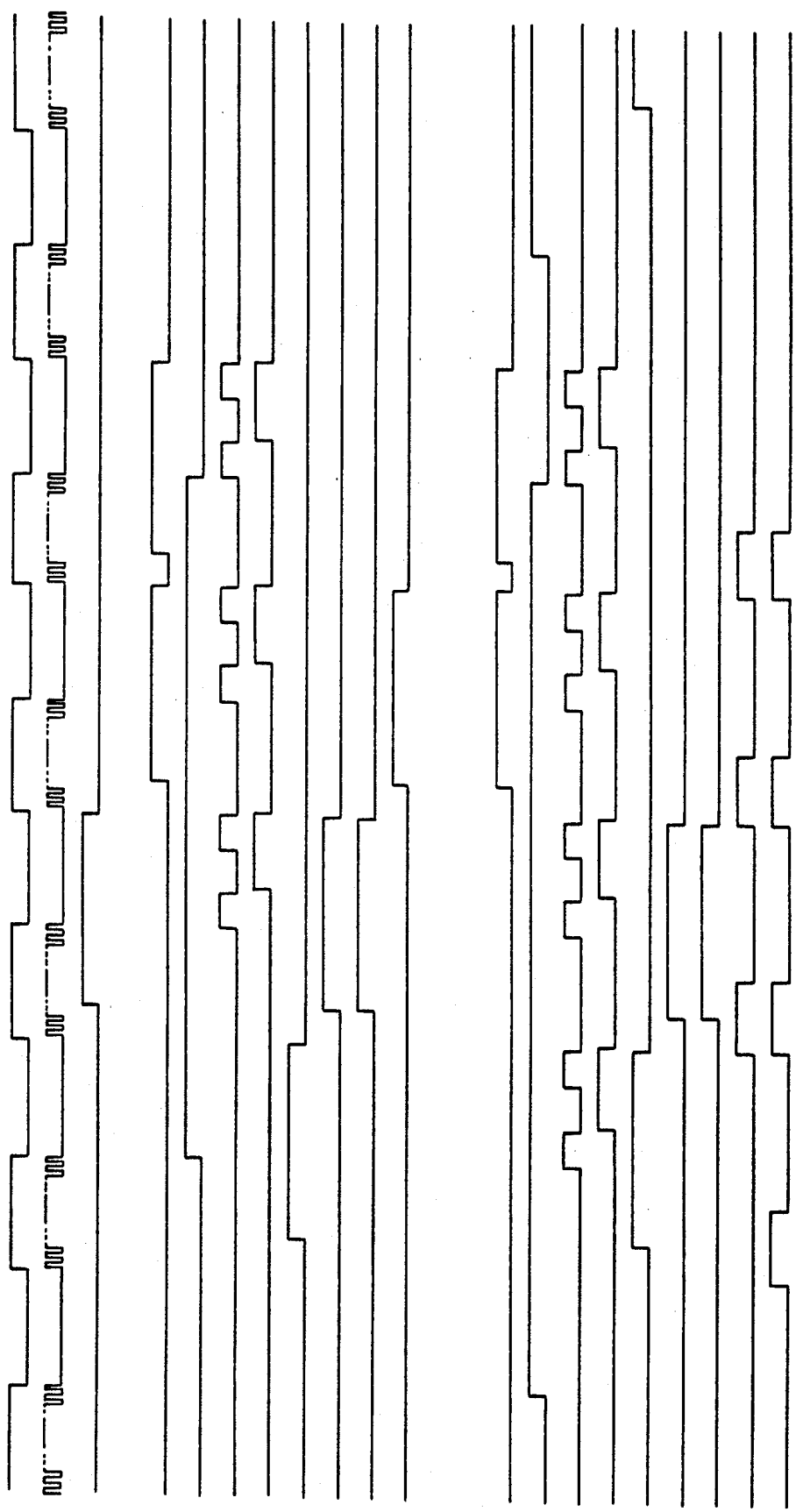

As shown in the right portion of FIG. 35A, one weight data 0.30612 for the threshold dummy node, is 0.30612 and the other, for both offset and correction dummy nodes, is 0.010204. That is, threshold voltage is larger than offset voltage. Therefore, there is a good possibility that a large error will be produced. By separating the threshold dummy node from the offset dummy node, the situation in which the offset value cannot be expressed by the fixed decimal point method can be eliminated. The voltage output by the dummy node is a fixed voltage of 1 volt. Thus, even if the weight is divided into two, the voltage corresponding to (1×0.30612+1×0.010204) volts becomes equal to the product of the fixed voltage and the weight when one weight is used. Respective weight data are stored in separate memory areas in the weight memory for the dummy nodes, and are given as the dummy weight data of a particular ANP in the intermediate layer in a time divisional manner. Further, when the threshold weight data is large, it may be divided into two, and then high pulse portions which correspond to multiple dummy nodes and control two weight data.

Figure 37A:
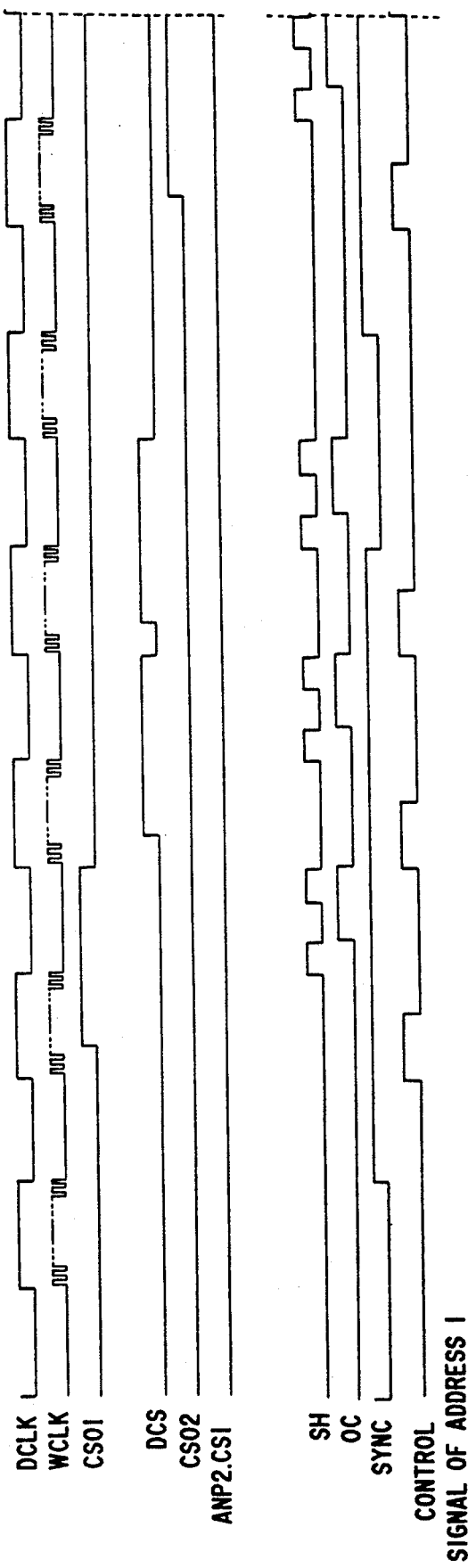
Figure 37B:
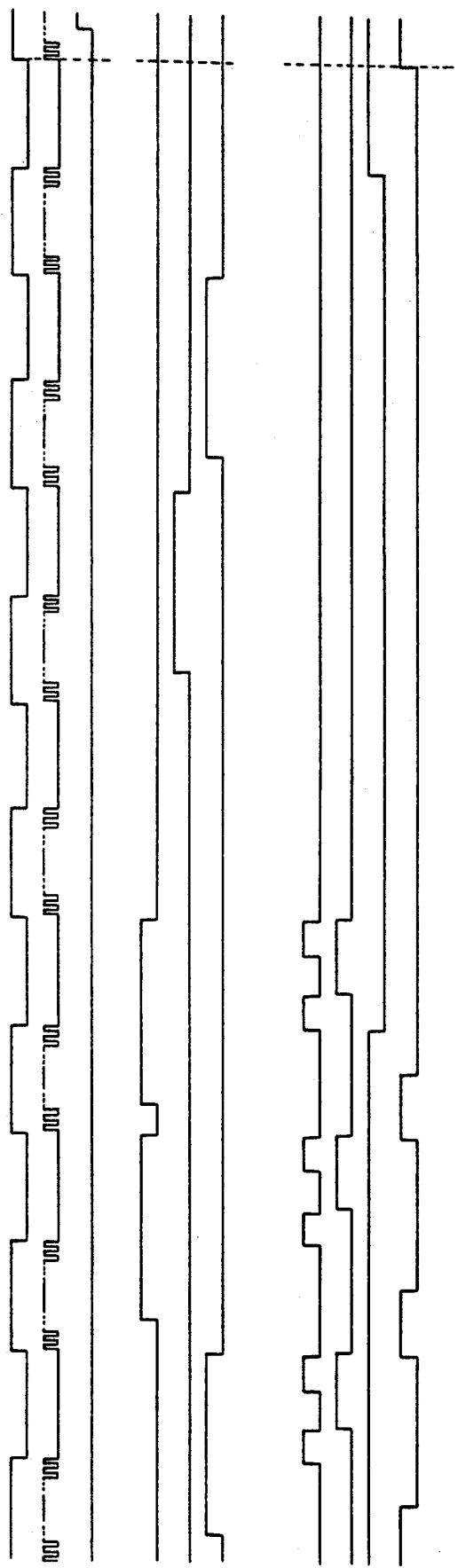

FIGS. 37A and 37B show a timing chart for the case where a plurality of dummy nodes is used to control the feedback type network shown in FIG. 20.

Dummy node output DCS3 has 2 continuous high pulses portions.

Figure 38:
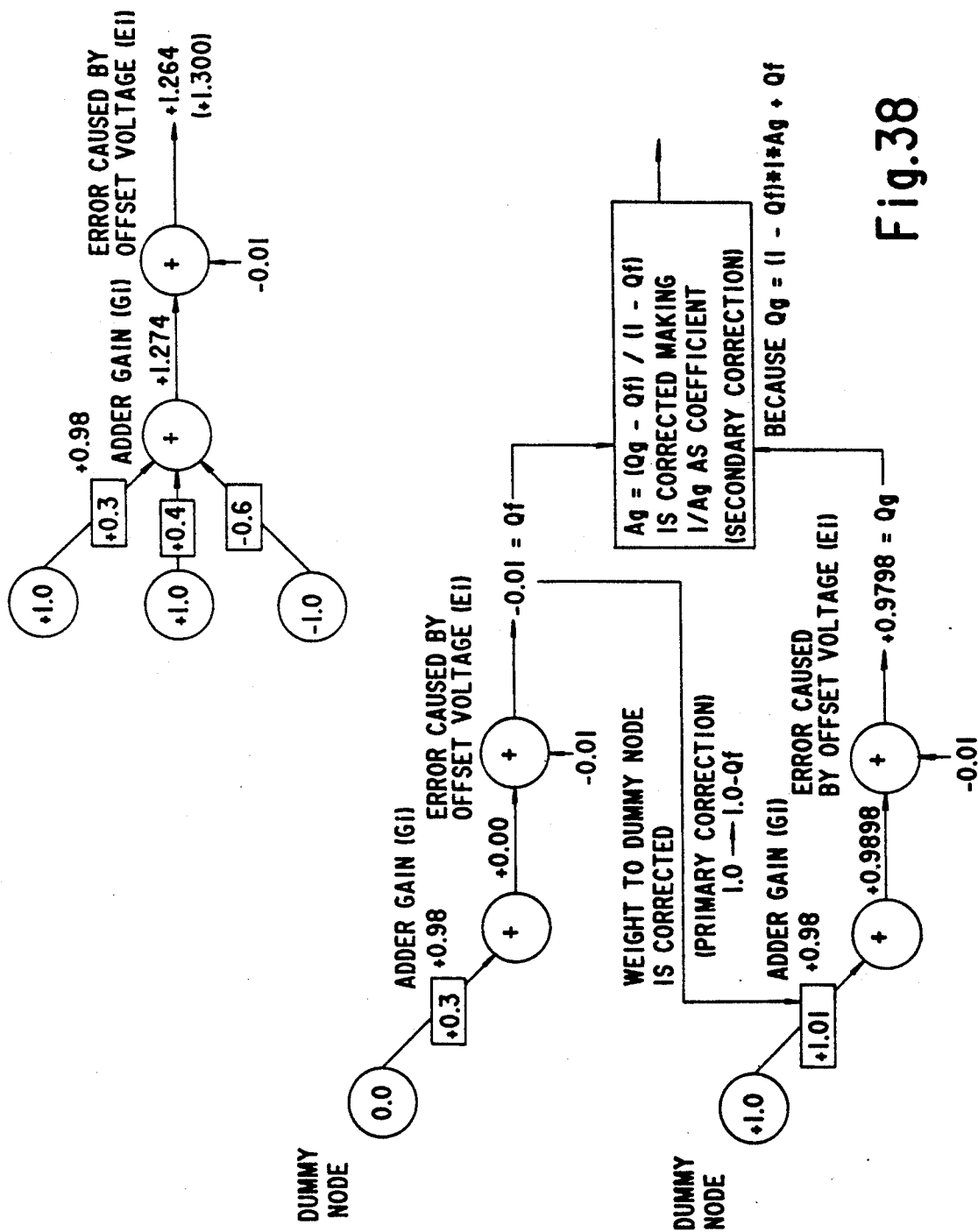
FIG. 38 shows a pattern correction system utilizing an operational error producing model and dummy node in the present invention.

FIG. 38 shows a conceptual view of a control pattern correcting system utilizing an operation error model and a dummy node in an analog neuron processor (ANP).

The upper part of FIG. 38 is the same as that in FIG. 32 and, as recited in the explanation referring to FIG. 32, the output should be 1.3 volts but becomes 1.264 volts due to offset error and gain error in the operational error producing model.

The lower part of FIG. 38 shows a system for correcting a control pattern to correct an error of an offset voltage −0.01 volts produced in the operational error producing model.

In the lower part of FIG. 38, as is recited in FIG. 32, the secondary correction is defined by the following equation.

$$A_g=(Q_g-Q_f)/(1-Q_f)$$

In this example, as the adder gain is equal to 0.98, a first step of the secondary correction is to obtain Ag. A primary correction amount $(1-Q_f)$ is multiplied by a fixed voltage of 1 volt to provide the product, which is further multiplied by an adder gain Ag. This result is added to an offset voltage $Q_f$, thereby providing $Q_g$. Therefore, the following equation is established.

$$Q_g=(1-Q_f)\times 1\times A_g+Q_f$$

MPU calculates the width of the S/H pulse based on a calculation of Ag. The above calculation is conducted for all of the ANPs and then the average of all of the above data is obtained, thereby detecting a width of S/H pulse when, for example, Ag=1, and the pulse width is reflected on the S/H pattern within a control pattern memory.

FIGS. 39A to 39D are to show a control pattern correction algorithm in a layered type network. First, a master control block is put in an error measurement mode. This error measurement mode is operated in the same manner as in that shown in FIGS. 33A to 33D, so the detailed explanation is not repeated. However, FIGS. 39A to 39D differ from FIGS. 33A to 33D in that after the interruption process routine is completed, the process enters the secondary correction process.

Then the width of the S/H pulse is obtained based on the inverse of the adder gain and the control pattern memory is corrected based on this pulse width of the S/H pattern.

Figure 39A:
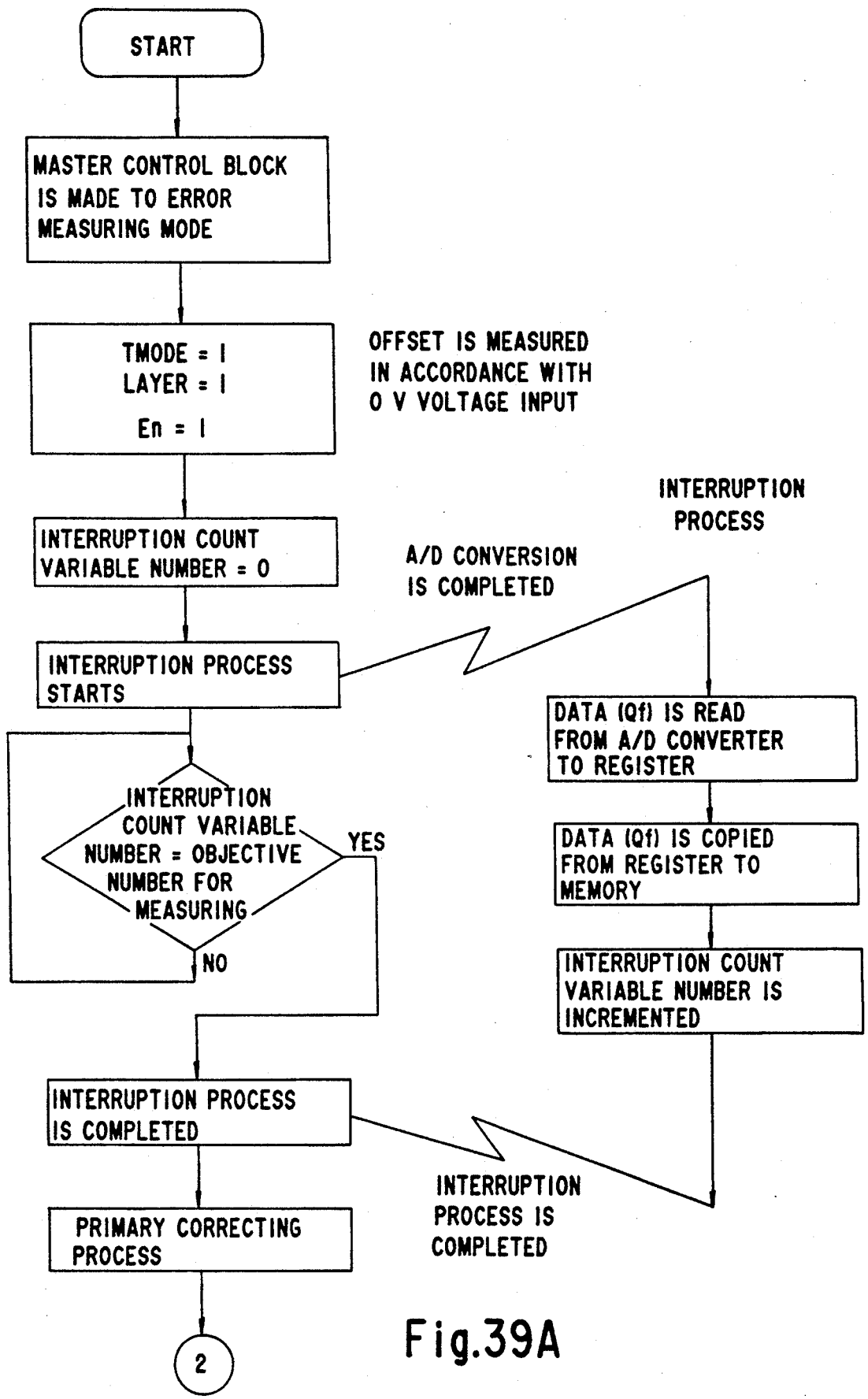
FIGS. 39A to 39D show a flowchart designating an algorithm for correcting the control pattern in case of a layered type network.
Figure 39B:
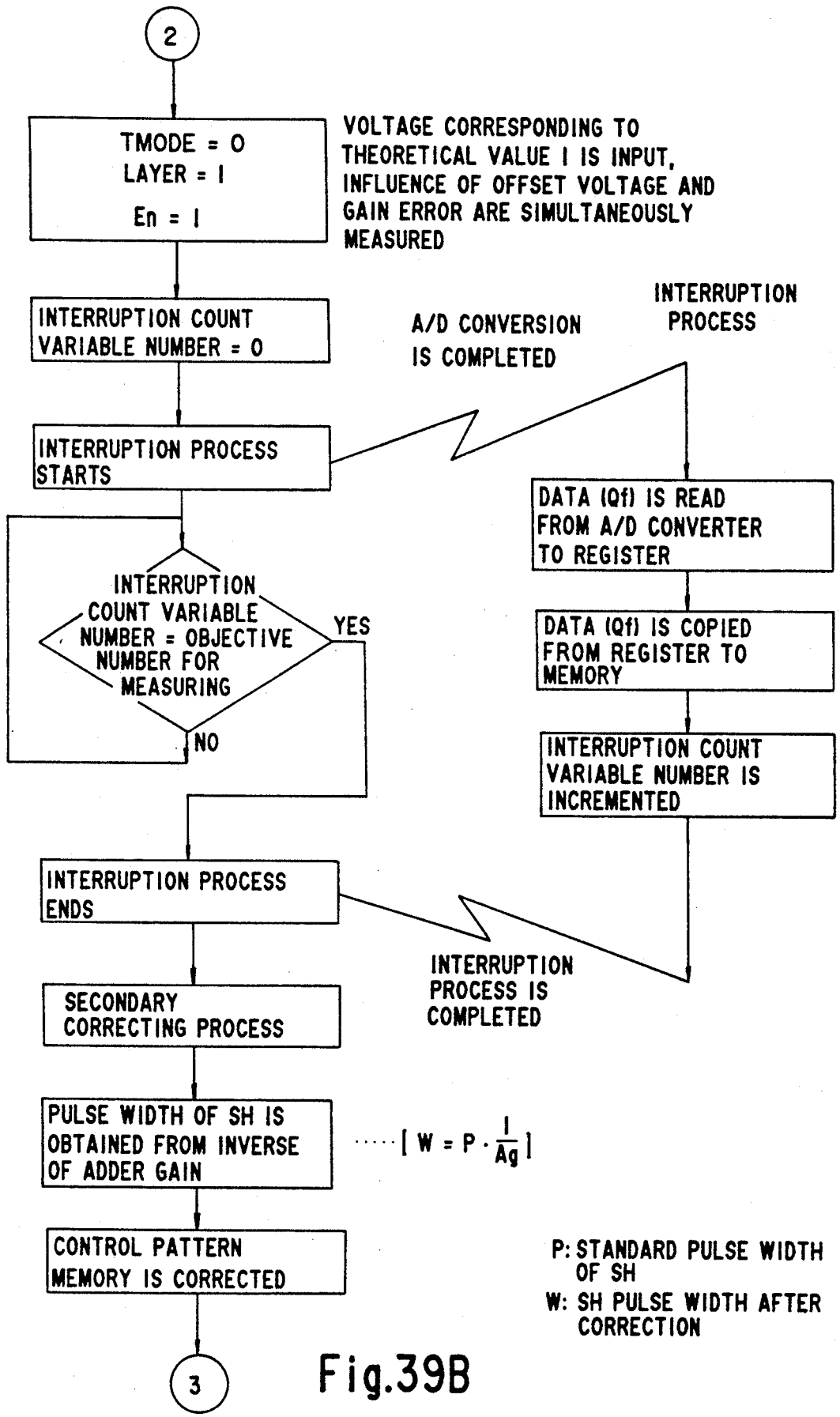
Figure 39C:
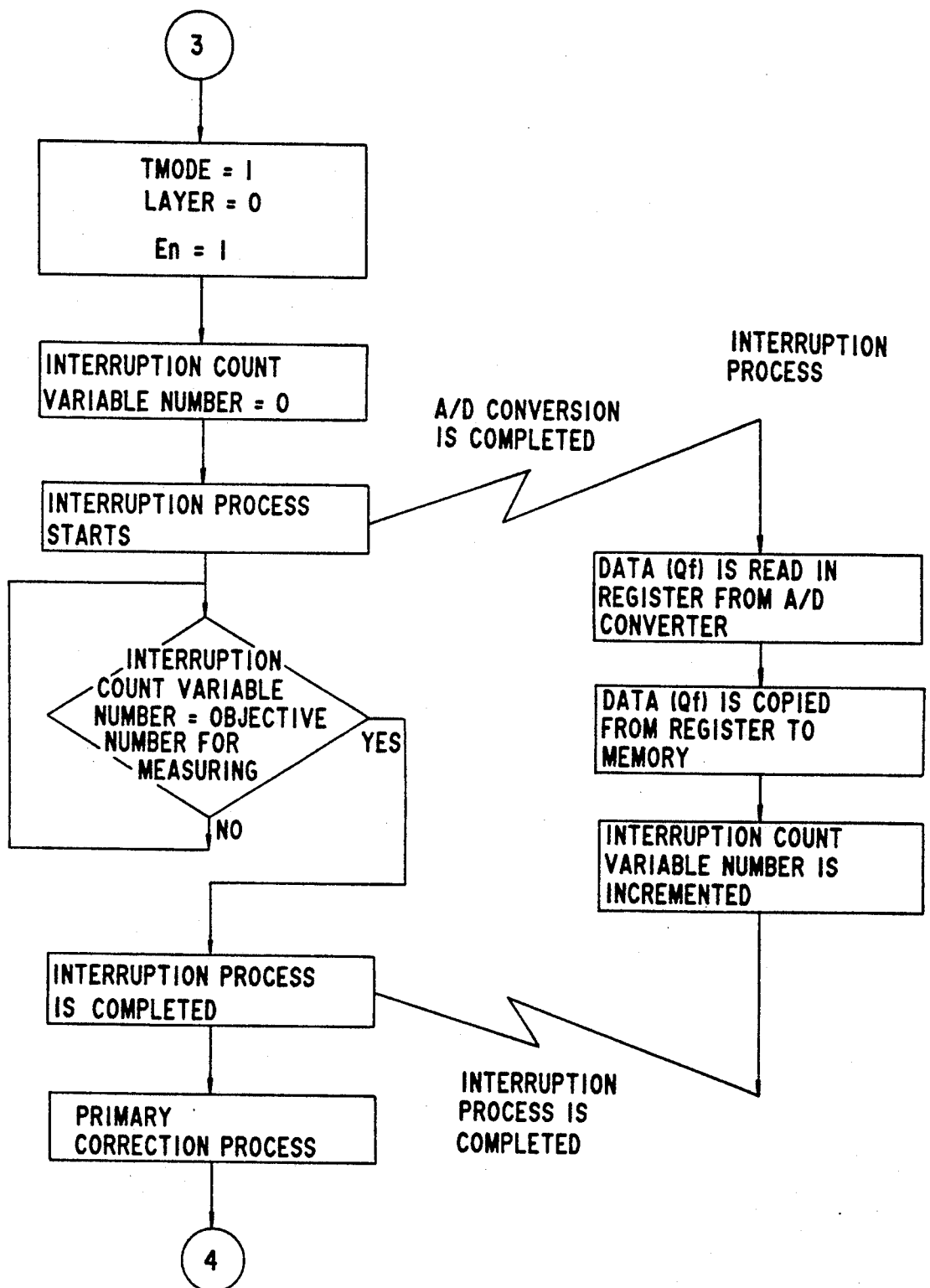
Figure 39D:
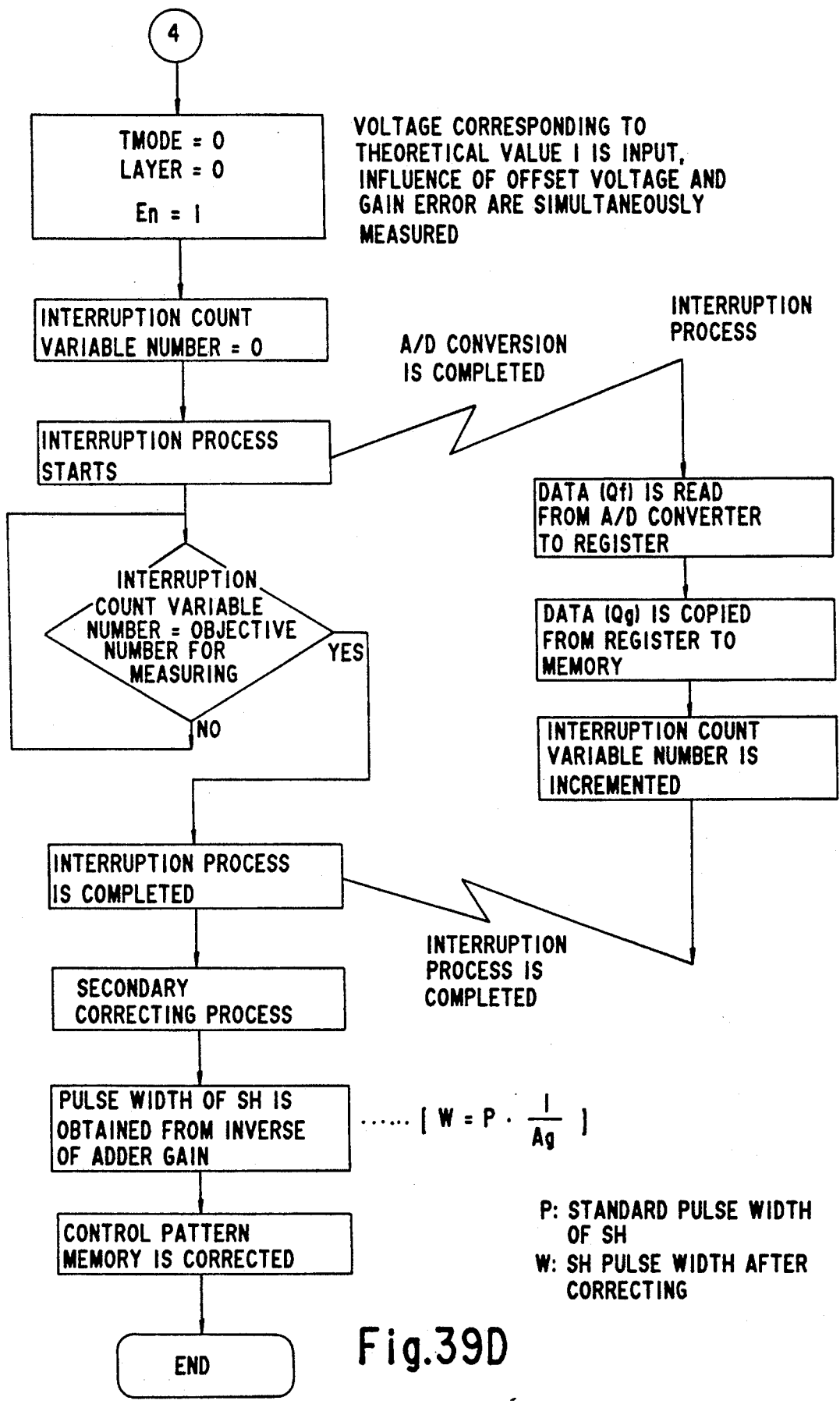

The above operation is applied to all of the ANPs in the output layer. The process proceeds to ② as shown in FIG. 39B. Then, T mode equals to 0, layer equals 1 designating the intermediate layer mode and En equals 1. After the interruption process routine is ended, the Ag for the correction is calculated. Namely, based on the inverse of the adder gain Ag, the pulse width W of the S/H pulse is obtained to correct the control pattern memory content in accordance with the equation $W = P\, 1/Ag$, where P represents the standard pulse width of the S/H pattern. Then, as shown in FIG. 6, the pulse width P is corrected to the pulse width W to avoid saturating the capacitor provided in ANP. Next, the process moves and ③ 4 ④. Then, T mode equals 1, layer equals 0 (designating the output layer mode) and En equals 1. After the interruption process routine is ended, the Ag for the correction is calculated. Namely, based on the inverse of the adder gain Ag, the pulse width of S/H pulse is obtained to correct the control pattern memory content as recited above.

Figure 40A:
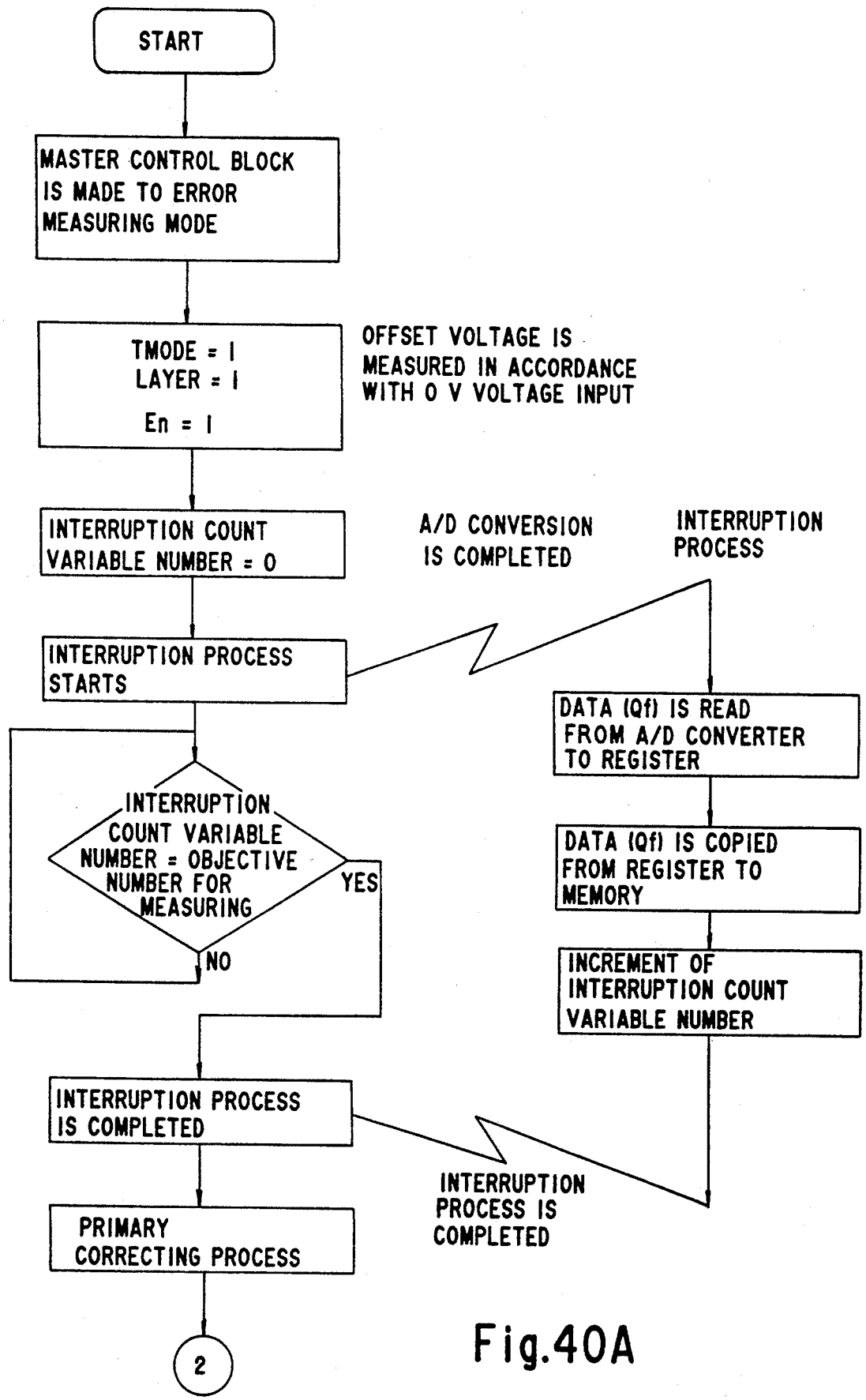
FIGS. 40A and 40B show a flowchart designating an algorithm for correcting a control pattern in a feedback type network.
Figure 40B:
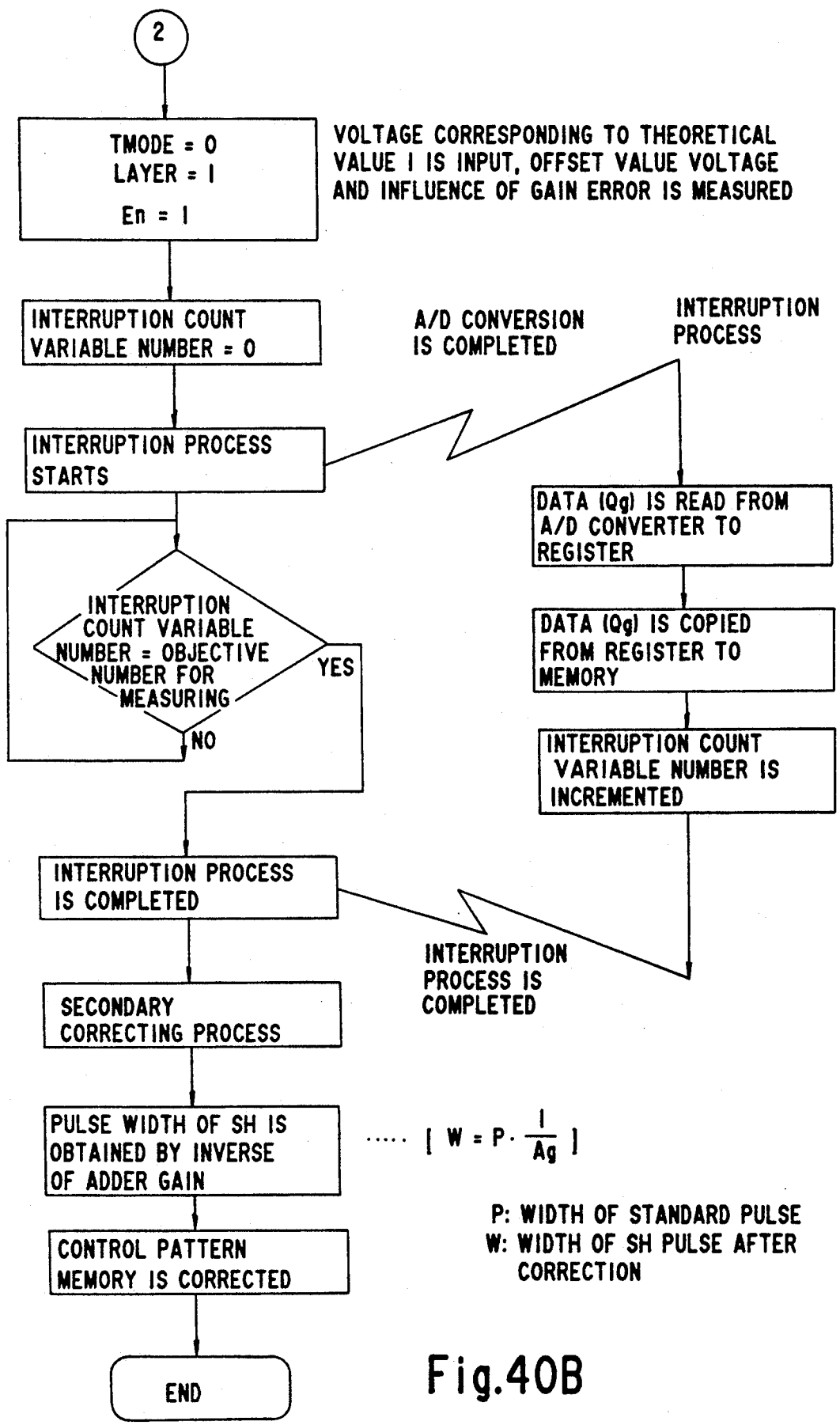

FIG. 40A to FIG. 40B shows an algorithm for correcting a control pattern in case of a feed back type network. This algorithm is similar as that shown in FIG. 34A and FIG. 34B except that, when the interruption routine is ended, the MPU performs a secondary correction process and the MPU changes a pulse width P of the S/H pattern to the pulse width W based on the inverse of the adder gain Ag, namely, 1/Ag, thereby changing the content of the control pattern memory.

According to the present invention, when we consider that a previous stage layer comprising n neuron chips and a following stage layer comprising m neuron chips, in the prior art the number of the wires is $n \times m$. However, in the present invention only a single analog bus is required, thus greatly reducing the number of the wires. When an input analog signal is received by the layers comprising n neuron chips, the input signal is transmitted to all of the n neurons simultaneously, as in the broadcast system. Through an analog bus, n neuron chips in one layer can be operated in parallel. Further, pipeline processing is conducted in respective layers, thus increasing the operation speed. The circuit is realized by the analog neuron chip. Therefore, because the power is made small the error in the circuit may be reduced. This means that a large number of neurons can be used in a neural network. Further, in the present invention the weight for the dummy node is determined such that, the output signal from ANP is made 0, when the input signal to ANP is 0. Therefore, an error of the offset voltage in the neuron computer and also an error of the gain of the adder can be suppressed.

Further, multiple dummy nodes are used and thus, the dynamic range of the weight data can be expanded when the weight data is expressed by the fixed decimal point method.

In the present invention, the sample/hold period for a capacitor which is used for performing the-sum-of-the-products operation in a neuron chip can be varied and the addition value in a capacitor is prevented from suturation regardless of the number of the neurons.

What is claimed is;

1. An error absorbing system for absorbing errors through a weight correction in a neuron computer comprising:

a neural network for receiving an analog input signal through a first analog bus in a time divisional manner, for performing a sum-of-the products operation, and for outputting an analog output signal to a second analog bus;

dummy node means, connected to the first analog bus of said neural network, for producing a fixed voltage to the first analog bus in a test mode;

weight changing means, connected to said neural network and dummy node means, for changing a weight of said dummy node means wherein an error at an output of the neural network in which said sum-of-the-products is performed, is corrected; and a control means, connected to said neural network, dummy node means and weight changing means, for controlling operation of said neural network.

2. The error absorbing system according to claim 1, wherein
said fixed voltage is 0 volts.

3. The error absorbing system according to claim 1, wherein
said control means comprises a control pattern memory from which a control pattern, controlling the operation of the neural network, is read under control of a sequencer.

4. The error absorbing system according to claim 1, wherein
said weight changing means comprises:
a primary correcting means, connected to said dummy node, for obtaining an offset voltage $Q_f$ by making the fixed voltage of said dummy node means 0 and therein obtaining an error measurement weight, $(1 - Q_f)$, and
a secondary correction means, connected to said dummy node means and primary correcting means, for determining said error measurement weight $(1 - Q_f)$ to be a temporary weight for a voltage of 1 volt produced from said dummy node means and for obtaining an adder's gain AG $(Q_g - Q_f)/(1 - Q_f)$ by using a mixed error output $Q_g$ formed by said temporary weight and offset voltage $Q_f$.

5. The error absorbing system according to claim 1, wherein
said dummy node comprises a max. value node circuit, and said max.value node circuit comprises:
means for producing said fixed voltage, and
means for outputting said fixed voltage from said dummy node.

6. The error absorbing system according to claim 5, wherein
said weight changing means comprises:
a port register means for producing an enable signal for enabling said test mode to be effective in accordance with an instruction from an MPU, and utilizes a test mode signal for selecting whether or not an output voltage designated from said max. value node circuit is 0 volts and a layer signal for designating respective layers, and
control means for producing an enable signal for enabling said fixed voltage corresponding to a state of the test mode to be produced form said max. value node circuit to an input analog bus on an input side of a layer corresponding to a state of a layer signal when said enable signal is in an enable state, therein forming a digital circuit means.

7. The error absorbing system according to claim 1, wherein said weight changing means comprises:
a buffer means for receiving a detection output voltage of an output analog bus in respective layers,
a switching means for enabling said detection output voltage when an enable signal output from a digital circuit is in an enable state, and
an A/D converter for connecting said switching means for outputting said detection output voltage through said digital circuit and an MPU as a digital quantity.

8. An error absorbing system according to claim 1 further comprising
error measuring means, connected to said neural network, for compulsorily inputting 0 volts to said first analog bus through said dummy node means at a first state upon said test mode and for detecting an effect voltage produced in the neural network through said second analog bus; and
said weight changing means including
sample/hold pattern forming means, connected to said neural network, in a second state of said test mode, for determining a weight between said dummy node means and said neural network, said weight being multiplied by said fixed voltage produced from said dummy node means, based on an offset voltage of respective neural processors, calculating a gain from a detection output voltage detected from said second analog bus for forming an S/H pattern of a sample/hold control signal for controlling an integration period of an integrator provided in said neural network; and
control pattern memory means, connected to said sample/hold pattern forming means and said neural network, for storing said S/H pattern for sequentially reading out a control pattern for controlling an operation of said neural network under control of a sequencer.

9. The error absorbing system according to claim 8, wherein
said sample/hold pattern forming means comprises:
a primary correction means, connected to said neural network, for obtaining an offset voltage $Q_f$ by making the fixed voltage of said dummy node means 0 and therein obtaining an error measurement weight data $(1-Q_f)$, and
a secondary correction means, connected to said primary correction means, for determining said error measurement weight data $(1-Q_f)$ to be a temporary weight for a voltage of 1 volt produced from said dummy node means and for obtaining adder gain AG $(Q_g-Q_f)/(1-Q_f)$ by using a mixed error output $Q_g$ formed by said temporary weight and said offset voltage $Q_f$.

10. The error absorbing system according to claim 8, wherein
said dummy node means comprises a max. value node circuit, and said max.value node circuit comprises
means for producing said fixed voltage, and
means for outputting said fixed voltage from said dummy node output at a predetermined timing.

11. The error absorbing system according to claim 10, wherein
said sample/hold pattern forming means comprises
a port register means for producing
a) an enable signal for enabling said test mode to be effective in accordance with an instruction from an MPU,
b) a test mode signal for selecting whether or not an output voltage designated from said max. value node circuit is 0 volts,
c) a layer signal for designating respective layers, and
control means for producing an enable signal for enabling said fixed voltage corresponding to a state of the test mode to be produced from said max. value node circuit to an input analog bus on an input side in a layer corresponding to a state of a layer signal when said enable signal is in an enable state, therein forming a digital circuit means.

12. The error absorbing system according to claim 8, wherein
said sample/hold pattern forming means comprises
a buffer means for receiving a detection output voltage of an output analog bus in respective layers,
a switching means for enabling said detection output voltage when an enable signal output from a digital circuit is in an enable state, and
an A/D converter connecting said switching means for outputting said detection output voltage, through said digital circuit including an MPU, as a digital quantity.

13. The error absorbing system according to claim 1 wherein said weight changing means comprises
a control pattern memory, connected to said neural network, for storing control information about said neural network;
a sequencer, connected to said control pattern memory, for generating a signal for obtaining access to an address of said control pattern memory; and
a weight memory, connected to said neural network and said sequencer, said weight memory being controlled by said sequencer for storing weight data, when an output voltage value of an analog bus in respective layers exceeds a predetermined dynamic range, the weight data to be multiplied by the fixed voltage from said dummy node means connected to the analog bus on an input side of a particular layer is expressed in a form of a sum of a plurality of weight data and divided weight data is independently stored in said weight memory.

14. The error absorbing system according to claim 13, wherein, respective divided weight data are independently stored in said weight memory and wherein when the weight data of the dummy node cannot be stored as a fixed decimal point in said weight memory, the weight data is stored as a sum of the weight data.

15. An error absorbing system for absorbing errors through a weight correction in a neural computer comprising:
a neural network means for receiving an analog input signal through a first analog bus in a time divisional manner, for performing a sum-of-the products operation, and for outputting an analog output signal to a second analog bus;
dummy node means for producing a fixed voltage to the first analog bus in a test mode, said dummy node means being connected to the first analog bus of the neural network means;
error measuring means, connected to said neural network means, for inputting a predetermined voltage to said first analog bus through said dummy node means in a first state of a test mode and for detecting an offset voltage produced in an analog neuron processor through said second analog bus;
weight correcting means, connected to said neural network means and said dummy node means, for in a second state of the test mode, determining a temporary weight between said dummy node means and said neuron processor, said temporary weight being multiplied by the fixed voltage produced by said dummy node means, based on an offset voltage of respective neuron processors and said weight correcting means, for calculating a correct weight, using a gain based on detection output voltage output from the second analog bus;

a weight memory, connected to said weight correcting means and said neural network means, for storing the weight corrected by the weight correcting means; and a control means, connected to said neural network means, dummy node means, weight correcting means and weight memory, for controlling an operation of said neural network.

16. The error absorbing system according to claim 15, wherein
said predetermined voltage is 0 volts.

17. The error absorbing system according to claim 15, wherein
said control means comprises a control pattern memory from which a control pattern, controlling the operation of the neural network, is read under control of a sequencer.

18. The error absorbing system according to claim 15, wherein
said weight correcting means comprises:
a primary correcting means, connected to said dummy node means, for obtaining an offset voltage $Q_f$ by making the fixed voltage of said dummy node means zero and therein obtaining an error measurement weight $(1-Q_f)$ and
a secondary correction means, connected to said dummy node means and said primary correcting means, for determining said error measurement weight $(1-Q_f)$ to be a temporary weight for a voltage of 1 volt produced from said dummy node means and for obtaining an adder's gain AG $(Q_g-Q_f)/(1-Q_f)$ by using a mixed error output $Q_g$ formed by said temporary weight and offset voltage $Q_f$.

19. The error absorbing system according to claim 15, wherein
said dummy node means comprises a maximum value node circuit, and said maximum value node circuit comprises:
means for producing said predetermined voltage, and
means for outputting said predetermined voltage from said dummy node means at a predetermined timing.

20. The error absorbing system according to claim 19, wherein
said error measuring means comprises:
a port register means for producing an enable signal for enabling said test mode to be effective in accordance with an instruction from an MPU, and utilizes a test mode signal for selecting whether or not an output voltage designated from said maximum value node circuit is 0 volts and a layer signal for designating respective layers, and
control means for producing an enable signal for enabling said predetermined voltage corresponding to a state of the test mode to be produced from said maximum value node circuit to an input analog bus on an input side of a layer corresponding to a state of a layer signal when said enable signal is in an enable state, therein forming a digital circuit means.

21. The error absorbing system according to claim 15, wherein
said error measuring means comprises:
a buffer means for receiving a detecting output voltage of an output analog bus in respective layers,
a switching means, connected to said buffer means, for enabling said detection output voltage when an enable signal output from a digital circuit is in an enable state, and
an A/D converter for connecting said switching means for outputting said detection output voltage through said digital circuit and an MPU as a digital quantity.

22. A neuron computer comprising:
a neural network means for receiving an analog input signal from a first analog bus in a time divisional manner, for performing a sum-of-the-products operation and for outputting an analog output signal to a second analog bus;
dummy node means, connected to the first analog bus of said neural network, for producing a fixed voltage to the first analog bus in a test mode;
a control pattern memory, connected to said neural network means, for storing control information about said neural network;
a sequencer, connected to said control pattern memory, for generating a signal for obtaining access to an address of said control pattern memory; and
a weight memory, connected to said neural network means and said sequencer, said weight memory being controlled by said sequencer for storing weight data, when an output voltage value of an analog bus in respective layers exceeds a predetermined dynamic range, the weight data, multiplied by said fixed voltage from said dummy node means, is output as a sum of a plurality of weight data and weight data divided for a plurality of dummy nodes is independently stored in said weight memory.

23. The neuron computer according to claim 22, wherein weight data divided for said plurality of dummy nodes are independently stored in said weight memory, when the weight data of the dummy node means cannot be stored as a fixed decimal point, the weight data is stored as a sum of the weight data.

24. An error absorbing system for absorbing errors through a weight correction in a neuron computer comprising:
a neural network means for receiving an analog signal through a first analog bus in a time divisional manner, for performing a sum-of-the-products operation and for outputting an analog signal to a second analog bus;
dummy node means, connected to said neural network means, for producing a fixed voltage to a designated analog bus in a test mode, said dummy node means being connected to an analog bus of the neural network means;
error measuring means, connected to said neural network means, for compulsorily inputting 0 volts to said first analog bus through said dummy node means at a first state of said test mode and for detecting an effect voltage produced in an analog neural processor through said second analog bus;

sample/hold pattern forming means, connected to said neural network means, in a second state of said test mode, for determining a weight between said dummy node means and a respective neuron processor, said weight being multiplied by said fixed voltage produced from said dummy node means, based on an offset voltage of respective neuron processors, calculating a gain from a detection output voltage detected from said second analog bus for forming an S/H pattern of a sample/hold control signal for controlling an integration period of an integrator provided in said analog neuron processor; and control pattern memory means, connected to said sample/hold pattern forming means and said neural network means, for storing said S/H pattern which sequentially reads out a control pattern, said control pattern controlling an operation of said neural network under control of a sequencer.

25. The error absorbing system according to claim 24, wherein said sample/hold pattern forming means being weight correcting means comprises:

a primary correction means, connected to said neural network, for obtaining an offset voltage $Q_f$ by making the fixed voltage of said dummy node means 0 and therein obtaining an error measurement weight data $(1-Q_f)$, and a secondary correction means, connected to said primary correction means, for determining said error measured weight data $(1-Q_f)$ to be a temporary weight for a voltage of 1 volt produced form said dummy node means and for obtaining adder gain AG $(Q_g-Q_f)/(1-Q_f)$ by using a mixed error output $Q_g$ formed by said temporary weight and said offset voltage $Q_f$.

26. The error absorbing system according to claim 24, wherein said dummy node means comprises a maximum value node circuit, and said maximum value node circuit comprises means for producing said fixed voltage, and means for outputting said fixed voltage from said dummy node output at a predetermined timing.

27. The error absorbing system according to claim 24, wherein said sample/hold pattern forming means being an error detecting means which comprises:

a port register means for producing a) an enable signal for enabling said test mode to be effective in accordance with an instruction from an MPU, b) a test mode signal for selecting whether or not an output voltage designated from said maximum value node circuit is 0 volts, c) a layer signal for designating respective layers, and control means for producing an enable signal for enabling said fixed voltage corresponding to a state of the test mode to be produced from said maximum value node circuit to an input analog bus on an input side in a layer corresponding to a state of a layer signal when said enable signal is in an enable state, therein forming a digital circuit means.

28. The error absorbing system according to claim 24, wherein said sample/hold pattern forming means being an error detecting means which comprises:

a buffer means for receiving a detection output voltage of an output analog bus in respective layers, a switching means for enabling said detection output voltage when an enable signal output from a digital circuit is in an enable state, and an A/D converter connecting said switching means for outputting said detection output voltage, through said digital circuit including an MPU, as a digital quantity.

* * * * *